US012788657B2

(12) United States Patent
Hight et al.

(10) Patent No.: US 12,788,657 B2
(45) Date of Patent: Nov. 10, 2026

(54) TABLE TOP SUPPORT BRACKET FOR SPINE SURGERY TABLE

(71) Applicant: Allen Medical Systems, Inc., Batesville, IN (US)

(72) Inventors: Joshua C. Hight, Littleton, MA (US); Christopher B. Dubois, Marlborough, MA (US); Jeffrey C. Marrion, Acton, MA (US); Ben Hertz, Acton, MA (US); Jesse S. Drake, Westborough, MA (US); Joshua A Williams, West Harrison, IN (US); Andrew Sennett, Hanover, MA (US); Kyle S. McKenney, Maynard, MA (US); Jason S. Bernotsky, Dunmore, PA (US)

(73) Assignee: Allen Medical Systems, Inc., Batesville, IN (US)

( * ) Notice: Subject to any disclaimer, the term of this patent is extended or adjusted under 35 U.S.C. 154(b) by 99 days.

(21) Appl. No.: 18/743,242

(22) Filed: Jun. 14, 2024

(65) Prior Publication Data

US 2024/0325227 A1 Oct. 3, 2024

Related U.S. Application Data

(63) Continuation of application No. 17/009,854, filed on Sep. 2, 2020, now Pat. No. 12,029,690, which is a (Continued)

(51) Int. Cl.
*A61G 13/04* (2006.01)
*A61G 7/075* (2006.01)
(Continued)

(52) U.S. Cl.
CPC ......... *A61G 13/04* (2013.01); *A61G 13/0054* (2016.11); *A61G 13/06* (2013.01);
(Continued)

(58) Field of Classification Search
CPC .... A61G 13/04; A61G 13/0054; A61G 13/06; A61G 13/08; A61G 13/104;
(Continued)

(56) References Cited

U.S. PATENT DOCUMENTS

| | | | |
|---|---|---|---|
| 1,021,335 | A | 3/1912 | Robinson |
| 1,098,477 | A | 6/1914 | Cashman |

(Continued)

FOREIGN PATENT DOCUMENTS

| | | | |
|---|---|---|---|
| DE | 1162508 | B | 2/1964 |
| DE | 3438956 | A1 | 5/1985 |

(Continued)

OTHER PUBLICATIONS

Trios® Table Base Owner's Manual; Chapter 6; pp. 43-52 (10 pp); 2015.

*Primary Examiner* — Myles A Throop
(74) *Attorney, Agent, or Firm* — Barnes & Thornburg LLP

(57) ABSTRACT

According to the present disclosure, a patient support system includes patient support tops for accommodating various body positions of a patient occupying the patient support tops. The patient support system may include various features to accommodate patient body positioning to facilitate surgical access.

20 Claims, 21 Drawing Sheets

Related U.S. Application Data continuation of application No. 16/740,838, filed on Jan. 13, 2020, now Pat. No. 10,792,207, which is a continuation of application No. 15/290,164, filed on Oct. 11, 2016, now Pat. No. 10,561,559.

(60) Provisional application No. 62/352,625, filed on Jun. 21, 2016, provisional application No. 62/245,641, filed on Oct. 23, 2015.

(51) Int. Cl.

| | |
|---|---|
| ***A61G 13/00*** | (2006.01) |
| ***A61G 13/06*** | (2006.01) |
| ***A61G 13/08*** | (2006.01) |
| ***A61G 13/10*** | (2006.01) |
| ***A61G 13/12*** | (2006.01) |

(52) U.S. Cl.
CPC ........... *A61G 13/08* (2013.01); *A61G 13/104* (2013.01); *A61G 13/1295* (2013.01); *A61G 7/075* (2013.01); *A61G 13/1235* (2013.01); *A61G 13/1285* (2013.01)

(58) Field of Classification Search
CPC ................ A61G 13/1295; A61G 7/075; A61G 13/1235; A61G 13/1285
See application file for complete search history.

(56) References Cited

U.S. PATENT DOCUMENTS 1,160,451 A 11/1915 Sanford
1,171,713 A 2/1916 Gilkerson
1,372,565 A 3/1921 Skelly
1,528,835 A 3/1925 McCollough
1,662,464 A 3/1928 McCutchen
1,799,692 A 4/1931 Knott
1,938,006 A 12/1933 Blanchard
2,103,693 A 12/1937 Pohl
2,188,592 A 1/1940 Hosken et al.
2,261,297 A 11/1941 Seib
2,337,505 A 12/1943 Swift
2,452,816 A 11/1948 Wagner
2,613,371 A 10/1952 Keyes, Jr.
2,636,793 A 4/1953 Meyer
2,667,169 A 1/1954 Kambourakis
2,688,410 A 9/1954 Nelson
2,691,979 A 10/1954 Watson
2,764,150 A 9/1956 Ettinger et al.
2,792,945 A 5/1957 Brenny
2,803,022 A 8/1957 Wynkoop
2,880,720 A 4/1959 Houghtaling
3,046,071 A 7/1962 Shampaine et al.
3,049,726 A 8/1962 Getz
3,090,381 A 5/1963 Watson
3,226,734 A 1/1966 Coventon
3,238,539 A 3/1966 Albert
3,281,141 A 10/1966 Smiley et al.
3,286,707 A 11/1966 Shafer
3,302,218 A 2/1967 Stryker
3,388,700 A 6/1968 Mountz
3,428,307 A 2/1969 Owen
3,434,165 A 3/1969 Keane
3,584,321 A 6/1971 Buchanan
3,599,964 A 8/1971 Magni
3,640,416 A 2/1972 Temple
3,652,851 A 3/1972 Zaalberg
3,739,406 A 6/1973 Koetter
3,745,996 A 7/1973 Rush
3,751,028 A 8/1973 Scheininger et al.
3,766,384 A 10/1973 Anderson et al.
3,795,018 A 3/1974 Broaded
3,814,414 A 6/1974 Chapa
3,827,089 A 8/1974 Grow
3,832,742 A 9/1974 Stryker
3,859,982 A 1/1975 Dove
3,873,081 A 3/1975 Smith et al.
3,895,403 A 7/1975 Davis et al.
3,946,452 A 3/1976 Eary
3,949,983 A 4/1976 Tommasino et al.
3,988,790 A 11/1976 Mracek et al.
4,071,916 A 2/1978 Nelson
4,101,120 A 7/1978 Seshima
4,131,802 A 12/1978 Braden et al.
4,144,880 A 3/1979 Daniels
4,148,472 A 4/1979 Rais et al.
4,175,550 A 11/1979 Leininger et al.
4,186,917 A 2/1980 Rais et al.
4,227,269 A 10/1980 Johnston
4,239,039 A 12/1980 Thompson
4,244,358 A 1/1981 Pyers
4,257,407 A 3/1981 Macchi
4,356,577 A 11/1982 Taylor et al.
4,384,378 A 5/1983 Getz et al.
4,398,707 A 8/1983 Cloward
4,459,712 A 7/1984 Pathan
4,503,844 A 3/1985 Siczek et al.
4,545,571 A 10/1985 Chambron
4,552,346 A 11/1985 Schnelle et al.
4,579,111 A 4/1986 Ledesma
4,658,450 A 4/1987 Thompson
4,712,781 A 12/1987 Watanabe
4,730,606 A 3/1988 Leininger
4,763,643 A 8/1988 Vrzalik
4,769,584 A 9/1988 Irigoyen et al.
4,771,785 A 9/1988 Duer et al.
4,827,541 A 5/1989 Vollman
4,840,362 A 6/1989 Bremer et al.
4,850,775 A 7/1989 Lee et al.
4,858,128 A 8/1989 Alsip et al.
4,866,796 A 9/1989 Robinson et al.
4,868,937 A 9/1989 Connolly
4,872,657 A 10/1989 Lussi
4,887,325 A 12/1989 Tesch
4,924,537 A 5/1990 Alsip et al.
4,937,901 A 7/1990 Brennan
4,939,801 A 7/1990 Schaal et al.
4,944,054 A 7/1990 Bossert
4,944,500 A 7/1990 Mueller et al.
4,947,496 A 8/1990 Connolly
4,953,245 A 9/1990 Jung
4,970,737 A 11/1990 Sagel
5,020,170 A 6/1991 Ruf
5,088,706 A 2/1992 Jackson
5,131,106 A 7/1992 Jackson
5,152,024 A 10/1992 Chrones
5,161,267 A 11/1992 Smith
5,181,289 A 1/1993 Kassai
5,210,887 A 5/1993 Kershaw
5,210,888 A 5/1993 Canfield
5,231,741 A 8/1993 Maguire
5,239,716 A 8/1993 Fisk
5,274,862 A 1/1994 Palmer et al.
5,333,334 A 8/1994 Kassai
5,393,018 A 2/1995 Roth et al.
5,404,603 A 4/1995 Fukai
5,444,882 A 8/1995 Andrews et al.
5,461,740 A 10/1995 Pearson
5,483,323 A 1/1996 Matsuda et al.
5,487,195 A 1/1996 Ray
5,499,408 A 3/1996 Nix
5,502,853 A 4/1996 Singleton et al.
5,524,304 A 6/1996 Shutes
5,544,371 A 8/1996 Fuller
5,579,550 A 12/1996 Bathrick et al.
5,588,705 A 12/1996 Chang
5,611,638 A 3/1997 Dörr et al.
5,613,254 A 3/1997 Clayman et al.
5,658,315 A 8/1997 Lamb et al.
5,673,443 A 10/1997 Marmor
5,737,781 A 4/1998 Votel et al.
5,775,334 A 7/1998 Lamb et al.
5,778,467 A 7/1998 Scott et al.

(56) References Cited

U.S. PATENT DOCUMENTS 5,794,286 A 8/1998 Scott et al.
5,890,238 A 4/1999 Votel et al.
5,901,388 A 5/1999 Cowan
5,926,871 A 7/1999 Howard
5,937,456 A 8/1999 Norris
5,950,259 A 9/1999 Boggs
6,003,174 A 12/1999 Kantrowitz et al.
6,035,465 A 3/2000 Rogozinski
6,042,558 A 3/2000 Hoyne et al.
6,049,923 A 4/2000 Ochial
6,076,525 A 6/2000 Hoffman
6,094,760 A 8/2000 Nonaka et al.
6,108,838 A 8/2000 Connolly et al.
6,112,349 A 9/2000 Connolly
6,154,901 A 12/2000 Carr
6,230,342 B1 5/2001 Haugs
6,260,220 B1 7/2001 Lamb et al.
6,282,736 B1 9/2001 Hand et al.
6,286,164 B1 9/2001 Lamb et al.
6,295,671 B1 10/2001 Reesby et al.
6,311,349 B1 11/2001 Kazakia et al.
6,315,564 B1 11/2001 Levisman
6,324,710 B1 12/2001 Hernandez et al.
6,385,801 B1 5/2002 Watanabe et al.
6,421,854 B1 7/2002 Heimbrock
6,438,777 B1 8/2002 Bender
6,496,991 B1 12/2002 Votel
6,499,158 B1 12/2002 Easterling
6,499,160 B2 12/2002 Hand et al.
6,505,365 B1 1/2003 Hanson et al.
6,523,197 B2 2/2003 Zitzmann
6,526,610 B1 3/2003 Hand et al.
6,584,630 B1 7/2003 Dinkler
6,609,260 B2 8/2003 Hand et al.
6,615,430 B2 9/2003 Heimbrock
6,622,324 B2 9/2003 VanSteenberg et al.
6,634,043 B2 10/2003 Lamb et al.
6,637,058 B1 10/2003 Lamb
6,638,299 B2 10/2003 Cox
6,662,388 B2 12/2003 Friel et al.
6,662,391 B2 12/2003 Wilson et al.
6,668,396 B2 12/2003 Wei
6,671,904 B2 1/2004 Easterling
6,681,423 B2 1/2004 Zachrisson
6,691,347 B2 2/2004 Hand et al.
6,701,553 B1 3/2004 Hand et al.
6,701,554 B2 3/2004 Heimbrock
6,721,976 B2 4/2004 Schwaegerle
6,813,788 B2 11/2004 Dinkler et al.
6,817,363 B2 11/2004 Biondo et al.
6,854,137 B2 2/2005 Johnson
6,857,144 B1 2/2005 Huang
6,859,967 B2 3/2005 Harrison et al.
6,862,759 B2 3/2005 Hand et al.
6,862,761 B2 3/2005 Hand et al.
6,874,181 B1 4/2005 Vijayendran
6,886,199 B1 5/2005 Schwaegerle
6,898,811 B2 5/2005 Zucker et al.
6,912,959 B2 7/2005 Kolody et al.
6,928,676 B1 8/2005 Schwaegerle
6,941,951 B2 9/2005 Hubert et al.
6,966,081 B1 11/2005 Sharps et al.
6,971,997 B1 12/2005 Ryan et al.
6,986,179 B2 1/2006 Varadharajulu et al.
7,020,917 B1 4/2006 Kolody et al.
7,080,422 B2 7/2006 Ben-Levi
7,086,103 B2 8/2006 Barthelt
7,089,612 B2 8/2006 Rocher et al.
7,089,884 B2 8/2006 Wang et al.
7,103,932 B1 9/2006 Kandora
7,137,160 B2 11/2006 Hand et al.
7,152,261 B2 12/2006 Jackson
7,171,709 B2 2/2007 Weismiller
7,197,778 B2 4/2007 Sharps
7,214,138 B1 5/2007 Stivers et al.
7,216,385 B2 5/2007 Hill
7,234,180 B2 6/2007 Horton et al.
7,290,302 B2 11/2007 Sharps
7,343,635 B2 3/2008 Jackson
7,343,916 B2 3/2008 Biondo et al.
7,496,980 B2 3/2009 Sharps
7,520,007 B2 4/2009 Skripps
7,520,008 B2 4/2009 Wong et al.
7,565,708 B2 7/2009 Jackson
7,600,281 B2 10/2009 Skripps
7,653,953 B2 2/2010 Lopez-Sansalvador et al.
7,669,262 B2 3/2010 Skripps et al.
7,681,269 B2 3/2010 Biggie et al.
7,694,369 B2 4/2010 Hinders et al.
7,739,762 B2 6/2010 Lamb et al.
7,810,185 B2 10/2010 Burstner et al.
7,824,353 B2 11/2010 Matta
7,861,720 B1 1/2011 Wolcott
7,882,583 B2 2/2011 Skripps
7,931,607 B2 4/2011 Biondo et al.
7,954,996 B2 6/2011 Boomgaarden et al.
D645,967 S 9/2011 Sharps
8,020,227 B2 9/2011 Dimmer et al.
8,042,208 B2 10/2011 Gilbert et al.
8,056,163 B2 11/2011 Lemire et al.
8,060,960 B2 11/2011 Jackson
8,118,029 B2 2/2012 Gneiting et al.
D663,427 S 7/2012 Sharps
D665,912 S 8/2012 Skripps
8,234,730 B2 8/2012 Skripps
8,234,731 B2 8/2012 Skripps
8,256,050 B2 9/2012 Wong et al.
8,286,283 B2 10/2012 Copeland et al.
D676,971 S 2/2013 Sharps
8,381,331 B2 2/2013 Sharps et al.
8,397,323 B2 3/2013 Skripps et al.
D683,032 S 5/2013 Sharps
8,464,375 B1 6/2013 Jorgensen et al.
8,486,068 B2 7/2013 Starr
8,555,439 B2 10/2013 Soto et al.
8,584,281 B2 11/2013 Diel et al.
8,590,074 B2 11/2013 Hornbach et al.
8,635,725 B2 1/2014 Tannoury et al.
8,676,293 B2 3/2014 Breen et al.
8,677,529 B2 3/2014 Jackson
8,707,476 B2 4/2014 Sharps
8,707,484 B2 * 4/2014 Jackson ................. A61G 13/08 5/607
8,719,979 B2 5/2014 Jackson
8,732,876 B2 5/2014 Lachenbruch et al.
8,763,178 B1 7/2014 Martin et al.
8,777,878 B2 7/2014 Deitz
8,782,832 B2 7/2014 Blyakher et al.
8,806,679 B2 8/2014 Soto et al.
8,826,474 B2 9/2014 Jackson
8,826,475 B2 9/2014 Jackson
8,833,707 B2 9/2014 Steinberg et al.
8,839,471 B2 9/2014 Jackson
8,844,077 B2 9/2014 Jackson et al.
8,845,264 B2 9/2014 Kubiak et al.
8,856,986 B2 10/2014 Jackson
8,864,205 B2 10/2014 Lemire et al.
8,893,333 B2 11/2014 Soto et al.
D720,076 S 12/2014 Sharps et al.
8,938,826 B2 1/2015 Jackson
8,978,180 B2 3/2015 Jackson
8,997,286 B2 4/2015 Wyslucha et al.
9,072,646 B2 7/2015 Skripps et al.
9,119,610 B2 9/2015 Matta et al.
9,180,062 B2 11/2015 Jackson
9,205,013 B2 12/2015 Jackson
9,211,223 B2 12/2015 Jackson
9,233,037 B2 1/2016 Sharps et al.
9,289,342 B2 3/2016 Jackson
9,295,433 B2 3/2016 Jackson et al.
9,308,145 B2 4/2016 Jackson et al.
9,339,430 B2 5/2016 Jackson et al.
9,364,380 B2 6/2016 Jackson
9,498,397 B2 11/2016 Hight et al.

(56) References Cited

U.S. PATENT DOCUMENTS

| | | | |
|---|---|---|---|
| 9,561,145 | B2 | 2/2017 | Jackson et al. |
| 9,636,266 | B2 | 5/2017 | Jackson et al. |
| 10,561,559 | B2 | 2/2020 | Hight et al. |
| 10,792,207 | B2 | 10/2020 | Hight et al. |
| 10,888,484 | B2 * | 1/2021 | Lim .................. A61G 13/0036 |
| 12,029,690 | B2 | 7/2024 | Hight et al. |
| 2004/0133983 | A1 | 7/2004 | Newkirk et al. |
| 2005/0155149 | A1 | 7/2005 | Pedersen |
| 2005/0235415 | A1 | 10/2005 | Pedersen et al. |
| 2006/0123552 | A1 | 6/2006 | Ben-Levi |
| 2006/0185090 | A1 | 8/2006 | Jackson |
| 2008/0000028 | A1 | 1/2008 | Lemire et al. |
| 2008/0222811 | A1 | 9/2008 | Gilbert et al. |
| 2009/0044813 | A1 | 2/2009 | Gneiting et al. |
| 2009/0205139 | A1 | 8/2009 | Van Deursen et al. |
| 2009/0282614 | A1 | 11/2009 | Jackson |
| 2010/0192300 | A1 | 8/2010 | Tannoury et al. |
| 2011/0083273 | A1 | 4/2011 | Sharps |
| 2011/0107516 | A1 | 5/2011 | Jackson et al. |
| 2012/0144589 | A1 * | 6/2012 | Skripps .............. A61G 13/1245 5/624 |
| 2012/0198625 | A1 | 8/2012 | Jackson |
| 2013/0111666 | A1 | 5/2013 | Jackson |
| 2013/0205500 | A1 | 8/2013 | Jackson |
| 2013/0219623 | A1 | 8/2013 | Jackson |
| 2013/0254995 | A1 | 10/2013 | Jackson |
| 2013/0254996 | A1 | 10/2013 | Jackson |
| 2013/0254997 | A1 | 10/2013 | Jackson |
| 2013/0269710 | A1 * | 10/2013 | Hight ..................... A61G 13/04 128/845 |
| 2013/0312181 | A1 | 11/2013 | Jackson et al. |
| 2013/0312187 | A1 | 11/2013 | Jackson |
| 2013/0312188 | A1 | 11/2013 | Jackson |
| 2013/0326813 | A1 | 12/2013 | Jackson |
| 2014/0007349 | A1 | 1/2014 | Jackson |
| 2014/0020181 | A1 | 1/2014 | Jackson |
| 2014/0033434 | A1 | 2/2014 | Jackson |
| 2014/0033436 | A1 | 2/2014 | Jackson |
| 2014/0068861 | A1 * | 3/2014 | Jackson ................. A61G 13/08 5/624 |
| 2014/0082842 | A1 | 3/2014 | Jackson |
| 2014/0109316 | A1 * | 4/2014 | Jackson ................. A61G 13/04 5/607 |
| 2014/0173826 | A1 | 6/2014 | Jackson |
| 2014/0196212 | A1 | 7/2014 | Jackson |
| 2014/0201913 | A1 | 7/2014 | Jackson |
| 2014/0201914 | A1 | 7/2014 | Jackson |
| 2014/0208512 | A1 | 7/2014 | Jackson |
| 2014/0317847 | A1 | 10/2014 | Jackson |
| 2015/0059094 | A1 | 3/2015 | Jackson |
| 2015/0150743 | A1 | 6/2015 | Jackson |
| 2016/0000621 | A1 | 1/2016 | Jackson et al. |
| 2016/0000626 | A1 * | 1/2016 | Jackson ................. A61G 13/02 5/608 |
| 2016/0000627 | A1 * | 1/2016 | Jackson ............... A61B 6/0407 5/608 |
| 2016/0000629 | A1 | 1/2016 | Jackson et al. |
| 2016/0361218 | A1 * | 12/2016 | Dubois .................. A61G 13/08 |
| 2017/0027797 | A1 | 2/2017 | Dolliver et al. |
| 2017/0112698 | A1 | 4/2017 | Hight et al. |
| 2017/0128304 | A1 * | 5/2017 | Hight ................... A61B 5/0077 |
| 2017/0135890 | A1 | 5/2017 | DuBois et al. |
| 2017/0151115 | A1 * | 6/2017 | Jackson ............... A61B 6/0407 |
| 2018/0185228 | A1 * | 7/2018 | Catacchio .............. A61G 13/04 |
| 2018/0214333 | A1 * | 8/2018 | McKenney .......... A61H 1/0222 |
| 2019/0046383 | A1 * | 2/2019 | Lim ................... A61G 13/1295 |
| 2019/0209409 | A1 * | 7/2019 | Jackson ............... A61B 6/0407 |
| 2020/0146915 | A1 | 5/2020 | Hight et al. |
| 2023/0066826 | A1 * | 3/2023 | Morgan ................. A61G 13/06 |
| 2024/0398648 | A1 * | 12/2024 | Boucher .............. A61G 13/123 |

FOREIGN PATENT DOCUMENTS

| | | | |
|---|---|---|---|
| DE | 4039907 | A1 | 7/1991 |
| DE | 19723927 | C2 | 5/2003 |
| DE | 10158470 | A1 | 6/2003 |
| DE | 202008001952 | U1 | 6/2008 |
| DE | 4429062 | C2 | 8/2008 |
| EP | 617947 | B1 | 1/1995 |
| EP | 1210049 | A1 | 6/2002 |
| EP | 1159947 | B1 | 9/2006 |
| EP | 1686944 | A1 | 8/2008 |
| EP | 1982680 | B1 | 7/2011 |
| EP | 2653145 | A2 | 10/2013 |
| EP | 3 124 000 | A1 | 2/2017 |
| FR | 2247194 | B1 | 10/1977 |
| GB | 2210554 | B | 9/1989 |
| JP | S57-107466 | U | 7/1982 |
| JP | 2001112582 | A | 4/2001 |
| JP | 2002-519111 | A | 7/2002 |
| JP | 2013-223722 | A | 10/2013 |
| WO | 2004026212 | A1 | 4/2004 |
| WO | 2006006106 | A1 | 1/2006 |
| WO | 2009071787 | A2 | 6/2009 |
| WO | 2011/006163 | A2 | 1/2011 |

* cited by examiner

TABLE TOP SUPPORT BRACKET FOR SPINE SURGERY TABLE

The present application is a continuation of U.S. application Ser. No. 17/009,854, filed Sep. 2, 2020, now U.S. Pat. No. 12,029,690, which is a continuation of U.S. application Ser. No. 16/740,838, filed Jan. 13, 2020, now U.S. Pat. No. 10,792,207, which is a continuation of U.S. application Ser. No. 15/290,164, filed Oct. 11, 2016, now U.S. Pat. No. 10,561,559, which claims the benefit, under 35 U.S.C. § 119(e), of U.S. Provisional Application No. 62/352,625, filed Jun. 21, 2016, and of U.S. Provisional Application No. 62/245,641, filed Oct. 23, 2015, each of which is hereby incorporated by reference herein in its entirety.

BACKGROUND

The present disclosure relates to patient support systems and methods. More specifically, the present disclosure relates to surgical patient support systems and methods for operating surgical patient support systems.

Patient supports provide support to various portions of a patient's body. Some patient supports can provide support that is configured to assist movement of the patient's body into specific positions. Surgical patients may need to be positioned in various body positions during the course of a surgery. Surgical patient body positioning provides surgical access to surgical sites on the patient's body.

SUMMARY

The present application discloses one or more of the features recited in the appended claims and/or the following features which, alone or in any combination, may comprise patentable subject matter:

According to an aspect of the disclosure, a surgical patient support system may include a tower base having a pair of spaced apart support towers, a first support top having a head end and a foot end, the first support top being configured to support a patient, a pair of support brackets, each support bracket of the pair of support brackets being configured for connection to a respective one of the support towers, and a second support top coupled to the pair of support brackets and arranged perpendicular to the first support top, and each of the pair of support brackets may be configured to couple to a respective one of the head and foot ends of the first support top to support the first support top between the support towers.

In some embodiments, the pair of support brackets may each include first and second bracket rails extending parallel to each other and bracket struts extending between and connected to the first and second bracket rails.

In some embodiments, the second support top may be connected to the pair of support brackets by respective extension brackets each including first and second extension bracket rails, and one of the extension brackets may extend orthogonally from one of the first and second bracket rails of each of the support brackets.

In some embodiments, each main bracket may include a main bracket frame defining rail slots therein and the first and second bracket rails may be slidably received in the rail slots such that the first and second bracket rails are configured for selective sliding movement relative to the main bracket frame between a first and a second position.

In some embodiments, each of the pair of support brackets may include a rotor and a number of adjustment supports, the adjustment supports each being configured for selective angular position adjustment and for selective radial position adjustment relative to their respective rotor.

In some embodiments, the adjustment supports may include a slide bar and a slide brace, and selective radial position adjustment includes moving the slide brace relative to the slide bar.

In some embodiments, the slide brace may include a position lock including lock pins configured for selective positioning between a locked and an unlocked state.

In some embodiments, each rotor may include a pair of mounts, the mounts each including an engagement rod configured for selective positioning between a engaged state and a disengaged state, and wherein in the engaged state the rod is positioned within a depression of the rotor and in the disengaged state the rod is positioned outside of the depression of the rotor.

In some embodiments, each rotor may include an outer circumferential surface and the depression is disposed in the outer circumferential surface for engagement with the engagement rod.

In some embodiments, the system may include a transfer sheet having an H-shape configured to shift a patient lying in the lateral position on the first support top laterally across the first support top into contact with the second support top and to secure the patient to the second support top for rotation between lateral and prone positions.

In some embodiments, the transfer sheet may include transfer straps and fasteners arranged on an outer surface thereof to secure a patient to the second support top to provide a cocooning effect.

In some embodiments, the system may include an axilla support pad configured to provide support to a patient's axilla, the axilla support pad including a rotatable pad extending laterally across the first support top.

In some embodiments, the axilla support pad may include mount arms configured for attachment to each of the first support top and rotatably connected to the rotatable pad.

In some embodiments, the system may include a leg positioning device configured to secure a patient's hip and leg position including a main strap and a material net, wherein the main strap is configured for removable locking engagement with the first support top.

In some embodiments, the leg positioning device may include at least one secondary strap configured for removable locking engagement with the first support top.

In some embodiments, the system may include a head strap configured to wrap around a patient's head and one of the first and second patient support tops to secure the patient's head thereto.

In another aspect of the present disclosure, a surgical patient support may include a first support top having a head end and a foot end, a pair of support brackets, one of the pair of support brackets being coupled to each of the head and foot ends of the first support top, a second support top extending from the head end to the foot end and connected to the pair of support brackets such that the prone support top is perpendicular to the first support top.

In some embodiments, each support bracket may include a rotor and a pair of mounts, the mounts each being independently selectively adjustable in angular position around the rotor.

In some embodiments, each support bracket may include a rotor having a central axis and a number of adjustment supports mounted on the rotor, each adjustment support including a body connected to the rotor and extending radially outward from the central axis and a brace engaged with the body for selective movement relative to the body along the radial extension direction of the body.

In some embodiments, each brace may include a locking pin and each body may include a number of locking holes, and insertion of the locking pin of the brace within one of the locking holes prevents movement of each brace relative to its respective body.

In some embodiments, each adjustment support may include a connection member, and each mount includes a cradle shaped complimentary to the connection members, and each adjustment support attaches to one of the mounts by reception of its connection member by the respective cradle.

In another aspect of the present disclosure, a surgical patient support system may include a patient support including a frame, a deck, and a pad, and a break assist bladder disposed at a position corresponding to a patient's hips while lying in a lateral position, and the break assist bladder may be configured to receive pressurized fluid to operate between a deflated state and an inflated state to create a contour in the pad to create leg break to the patient occupying the surgical patient support system.

In some embodiments, the break assist bladder may be configured such that in the inflated state the break assist bladder creates leg break in the range of about 0 degrees to about 10 degrees in a patient occupying the patient support while lying in the lateral position.

In some embodiments, the deck may include a leg section pivotably attached to the frame and selectively moveable between a raised and a lowered position, and the leg section is configured such that a combination of the break assist bladder in the inflated state and the leg section in the lowered position creates a leg break in the range of about 25 to about 45 degrees in a patient occupying the patient support while lying in the lateral position.

In some embodiments, the system may include an attachment sled disposed between the pad and the deck and configured to slidably secure the pad to the deck to accommodate relative movement therebetween during change in state of the break assist bladder and during change in position of the leg portion.

In some embodiments, the attachment sled may include hooked ends configured to wrap around the deck to slidably secure the attachment sled to the deck.

In some embodiments, the break assist bladder may be positioned between the deck and the pad of the patient support.

In some embodiments, the break assist bladder may be a portion of the pad and may be housed within a resilient sheath of the pad configured to bias the break assist bladder to the deflated state.

In another aspect of the present disclosure, a method of operating a surgical patient support system may include positioning a patient in a lateral position on a patient support top of the surgical patient support system, shifting the patient laterally to contact the patient's anterior side with a prone support top oriented substantially perpendicular relative to the patent support top of the surgical patient support system, securing the patient to the prone support top, and rotating the patient support top and the prone support top with fixed relative position to each other by about 90 degrees until the patient achieves the prone position on the prone support top.

In some embodiments, the method may include adjusting an angular position of one of the patient support top and the prone support top relative to the other.

In some embodiments, the method may include adjusting a radial position of one of the patient support top and the prone support top relative to the axis of rotation.

In another aspect of the present disclosure, a surgical patient support system may include a patient support top having a frame, and a pad, and the pad may include a torso section having a first height above the frame and a leg section having a second height above the frame, the second height being greater than the first height.

In some embodiments, the system may include a roller support connected to the patient support top, the roller support including a support pad extending laterally across the patient support top.

In some embodiments, the roller support may extend across the patient support top at the torso section of the pad, and may be selectively locatable to a position corresponding to a patient's axilla while occupying the patient support top in a lateral position.

According to another aspect of the disclosure, a surgical patient support system may include a tower base including a pair of spaced apart support towers, a lateral support top having a head end and a foot end, the first support top being configured to support a patient lying in at least lateral and supine positions, a pair of support brackets, each support bracket of the pair of support brackets being configured for connection to a respective one of the support towers and each including a pair of bracket rails extending in a first direction to a connection end and a prone bracket coupled to one of the bracket rails and extending generally perpendicularly to the first direction, and a prone support top coupled to the pair of support brackets and arranged generally perpendicularly to the first support top and being configured to support a patient in at least a prone position, wherein each of the pair of support brackets are configured to couple to a respective one of the head and foot ends of the first support top and the second support top to support the first support top and the second support tops between the support towers.

In some embodiments, the bracket rails of each support bracket may be attached to opposite ends of a connection bar of the respective tower base.

In some embodiments, each connection bar may be attached to an elevator tower of the respective tower base by a mounting post and the respective support bracket may define a first distance between the mounting post and the connection end of the main bracket.

In some embodiments, each prone bracket may extend from the respective main bracket rail to a prone connection end and may define a second distance between the mounting post and the prone connection end, the second distance being greater than the first distance.

In some embodiments, the main bracket rails may include a connection slot defined therein proximate to the connection end.

In some embodiments, each connection slot may include a recess defined on an interior side of the respective main bracket rail that extends between the connection end and an attachment hole of the respective main bracket rail generally in the same direction of extension as the respective main bracket rail to receive a pin tube of the lateral patient support therein in alignment with each attachment hole of the respective support bracket.

In some embodiments, a pin tube of the lateral patient support top may be blocked against resting within the connections slots of the support brackets without a connection pin inserted through each of the attachment holes and the pin tube.

In some embodiments, each prone bracket may include a body and a pair of bracket rails extending from the body in spaced apart relation to each other for connection with one of the main bracket rails.

In some embodiments, the prone bracket may include a pair of legs extending between the body and the prone connection end.

In some embodiments, each main bracket rail may include a shelf for connection with the prone bracket, the shelf includes a first surface facing in a first direction and a second surface facing in a second direction opposite the first direction.

In some embodiments, the lateral support top may include a deck having a torso section and a leg section, and a mattress pad slidingly attached to the deck, the leg section of the deck being selectively movable between raised and lowered positions.

In some embodiments, the mattress pad may include a number of pegs attached to a bottom surface thereof, the number of pegs each including a stem extending from the bottom surface and a head attached to an end of the stem, the stem having a width defined along a direction perpendicular to its extension that it less than a maximum width of the head measured along the same direction.

In some embodiments, the torso deck may include a number of key slots penetrating through the torso deck and each defined to include an opening and a slit extending for a length from the opening for slidably receiving the pegs therein, and wherein each opening is sized to allow the head to pass therethrough, and wherein each slit is sized to allow the stem to pass therethrough and to slidably move along its length and is sized to prevent the head from passing therethrough.

These and other features of the present disclosure will become more apparent from the following description of the illustrative embodiments.

BRIEF DESCRIPTION OF THE DRAWINGS

The detailed description particularly refers to the accompanying figures in which.

Figure 1:
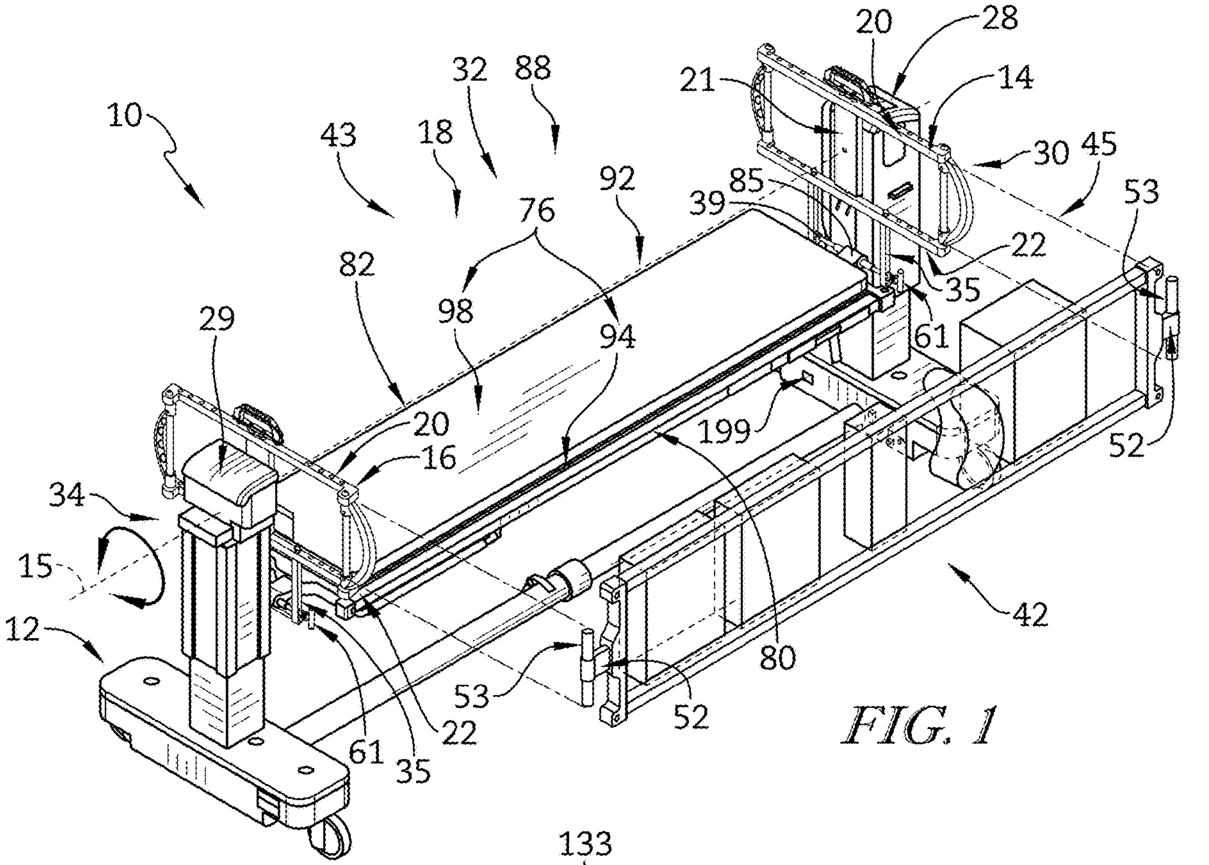
FIG. 1 is a perspective view of a surgical patient support system including a tower base connected to first and second patient support tops through main brackets.
Figure 10A:
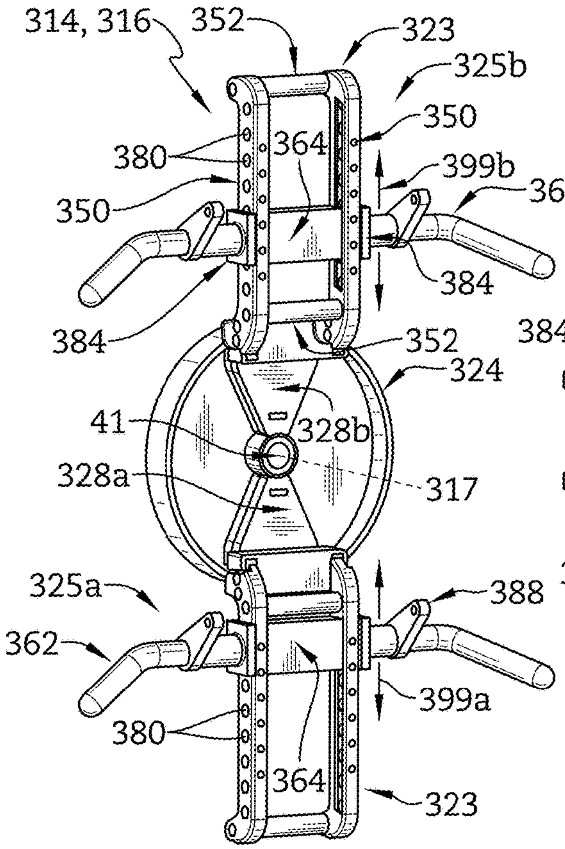
Figure 10B:
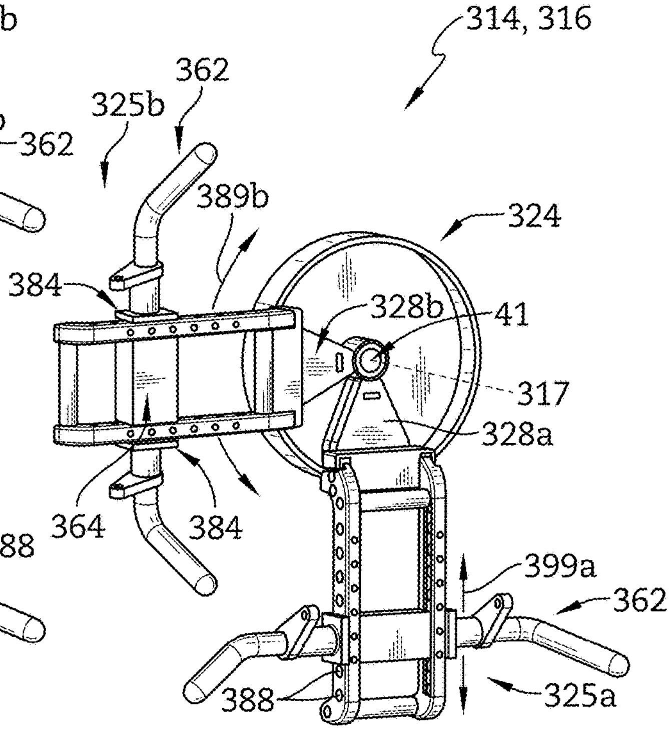
Figure 11A:
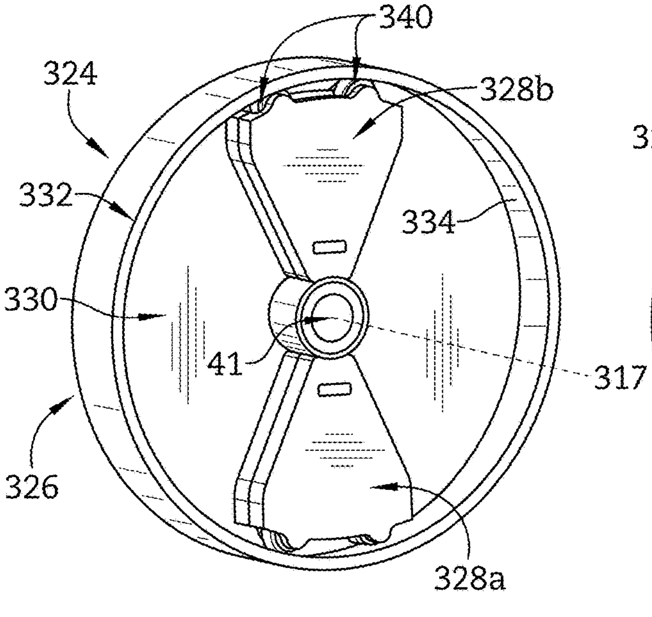
Figure 11B:
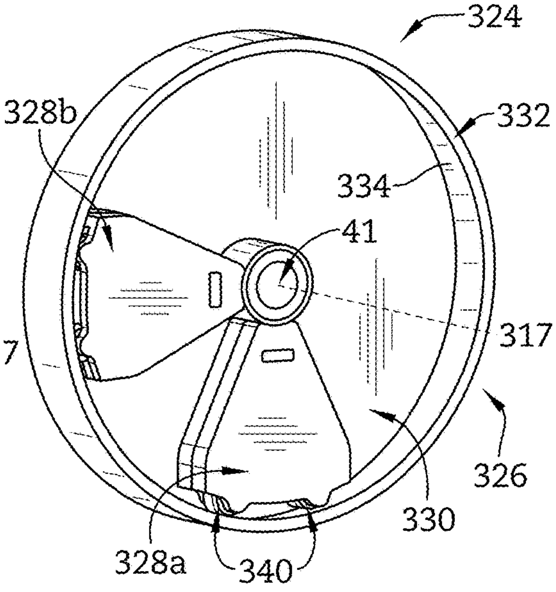
Figure 12A:
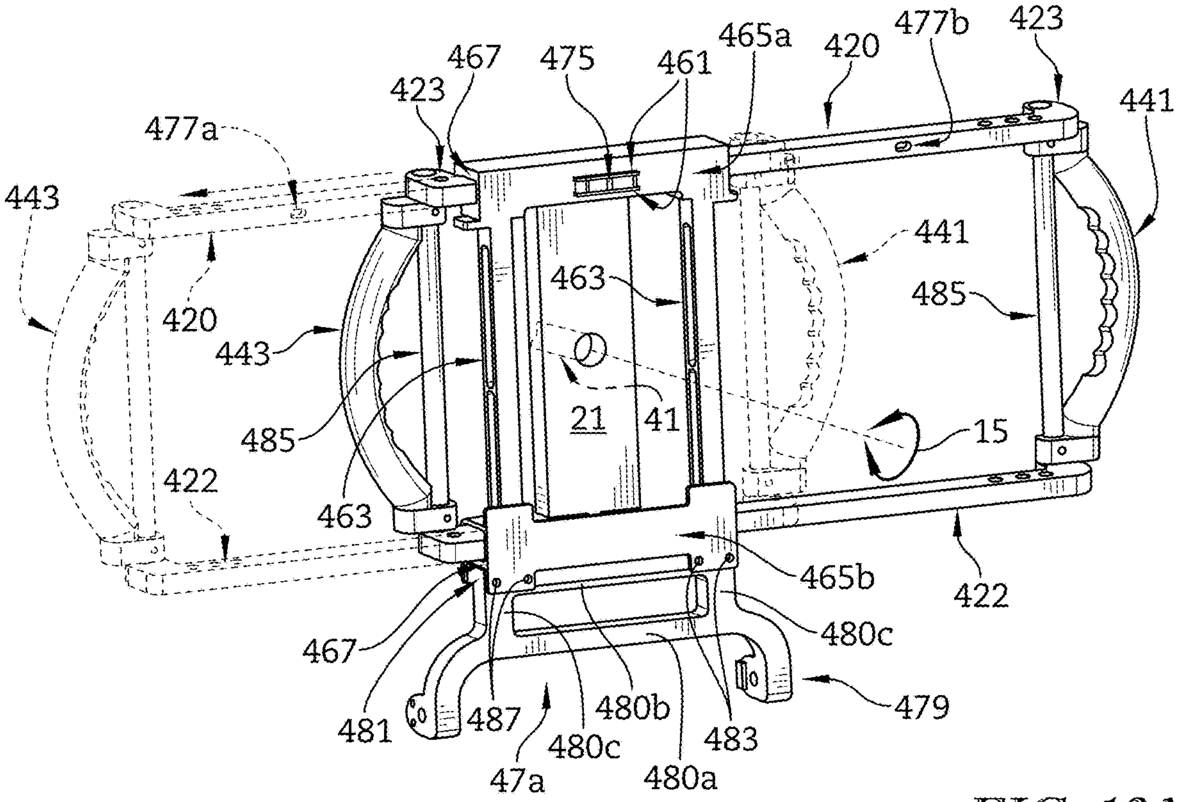
Figure 12B:
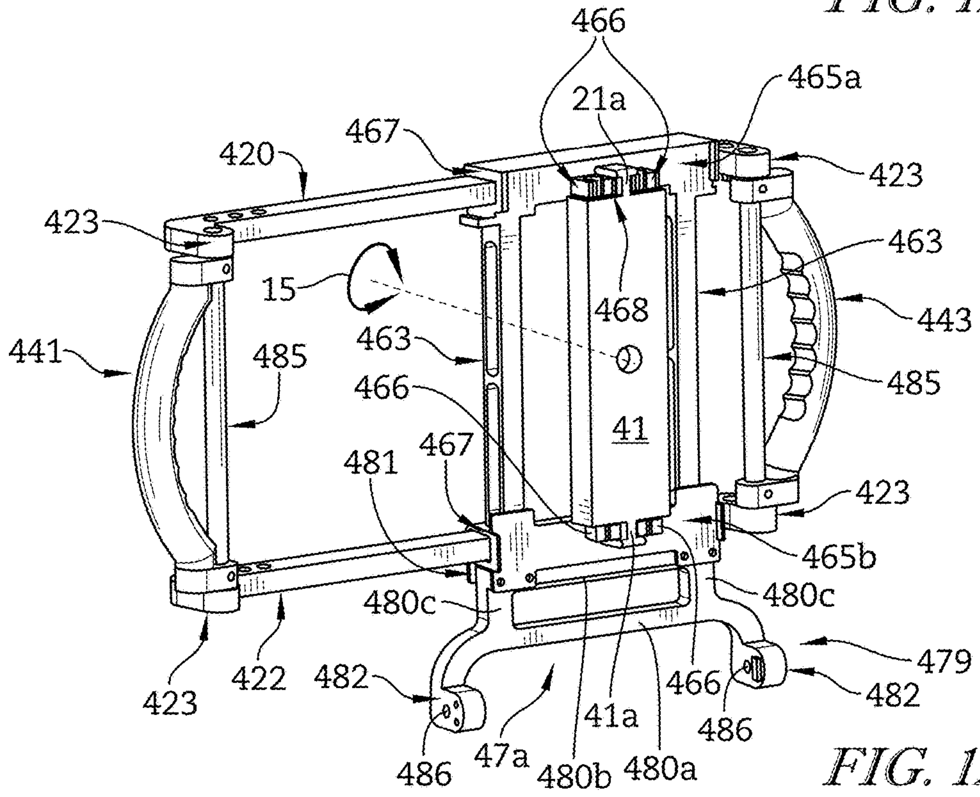
Figure 12C:
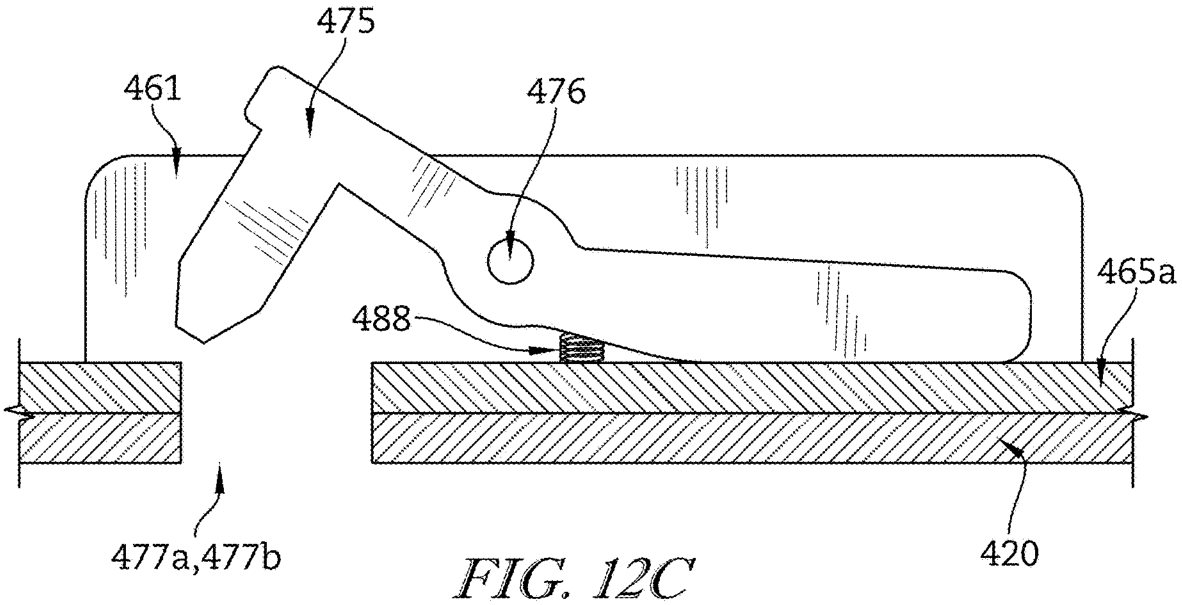
Figure 12D:
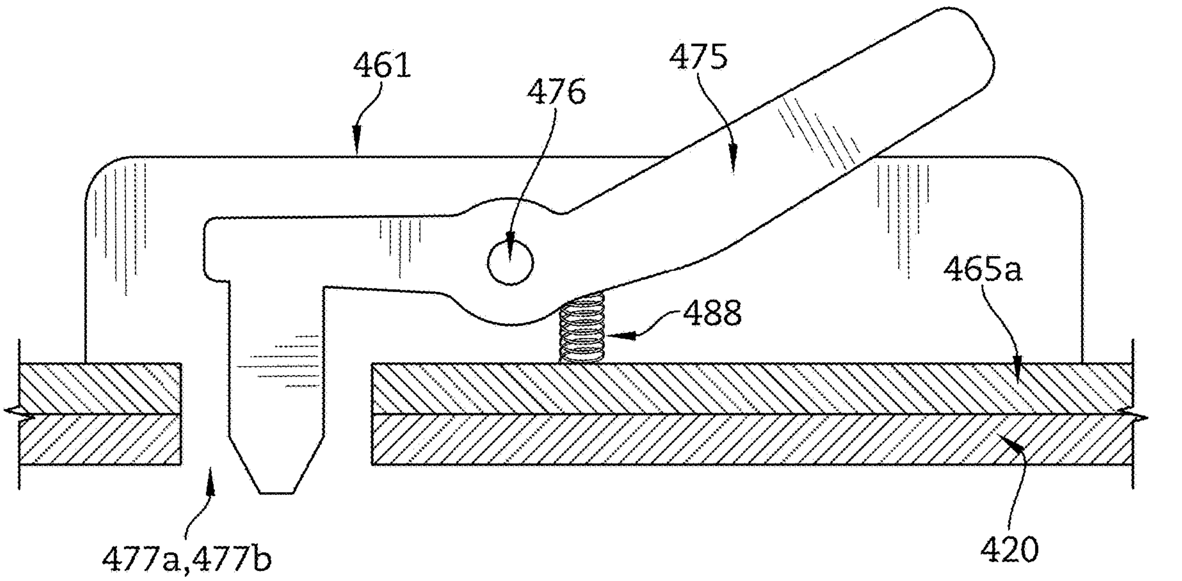
Figure 13:
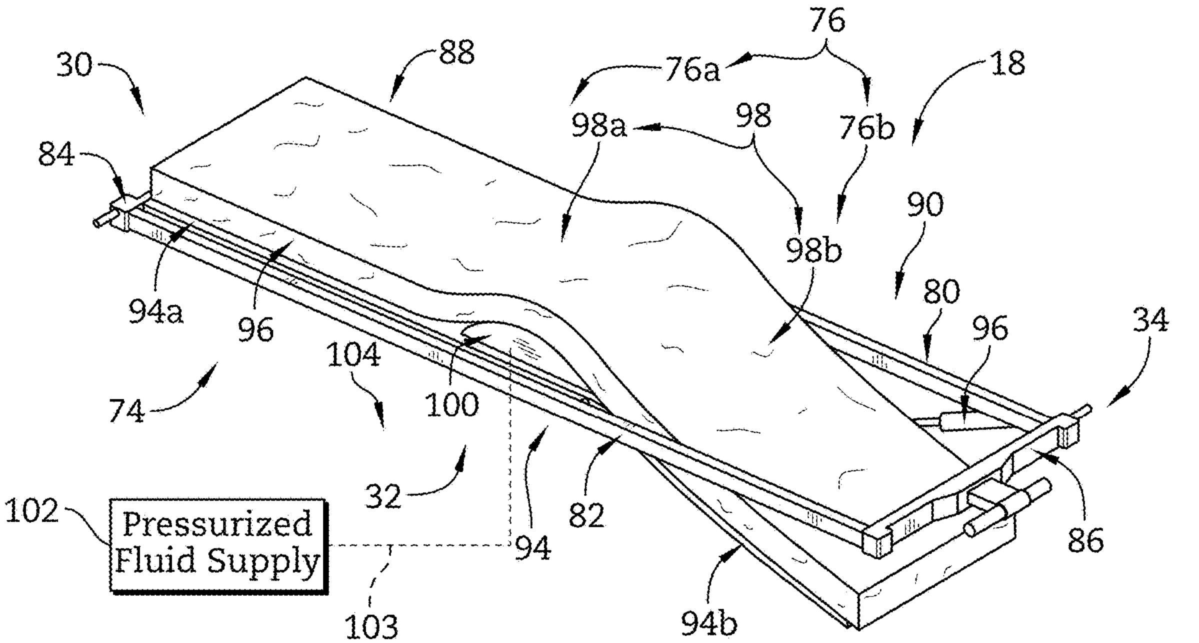
Figure 14A:
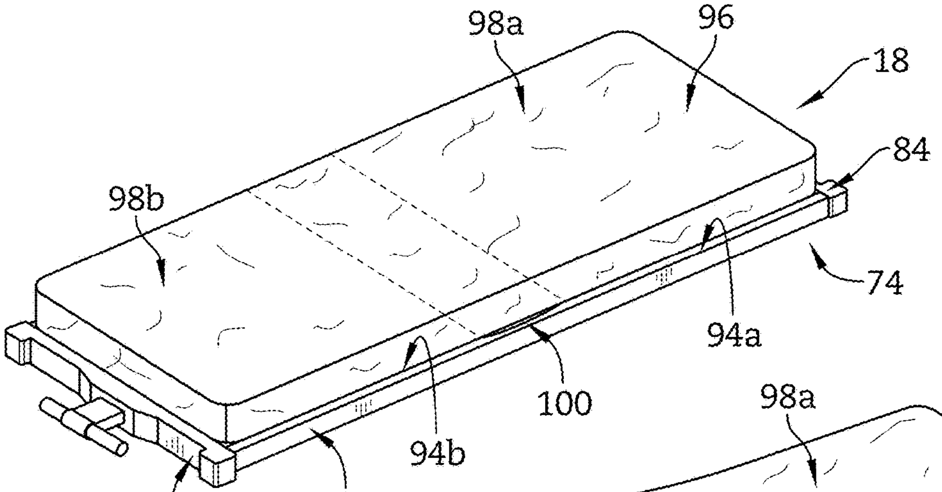
Figure 14B:
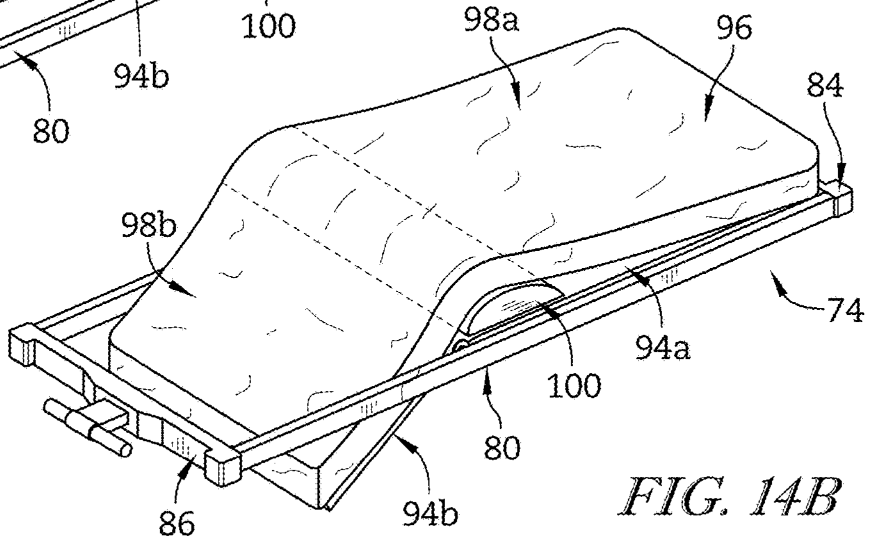
Figure 15A:
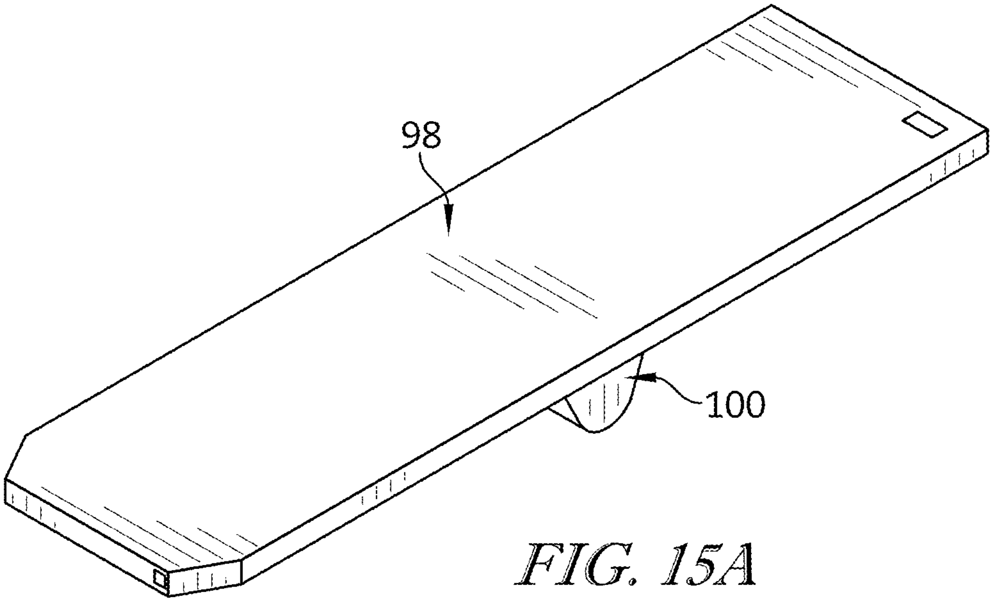
Figure 15B:
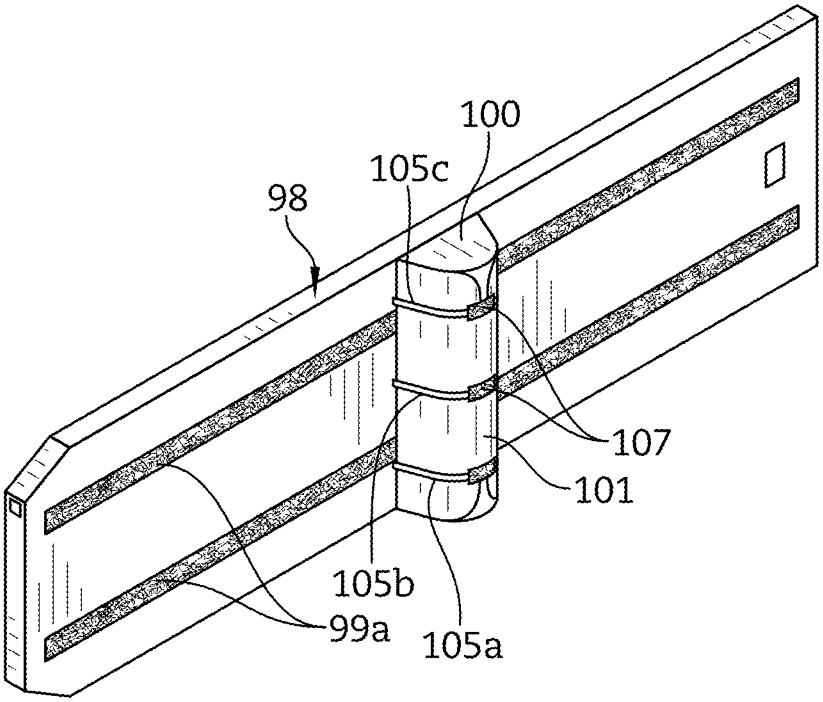
Figure 16A:
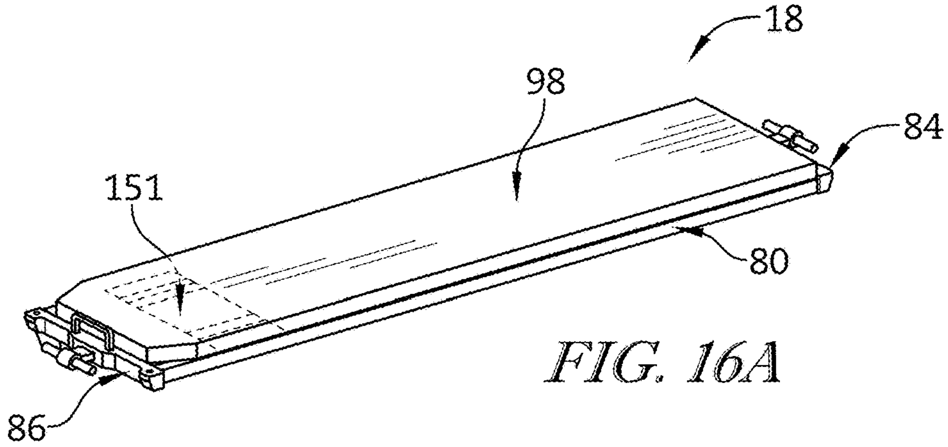
Figure 16B:
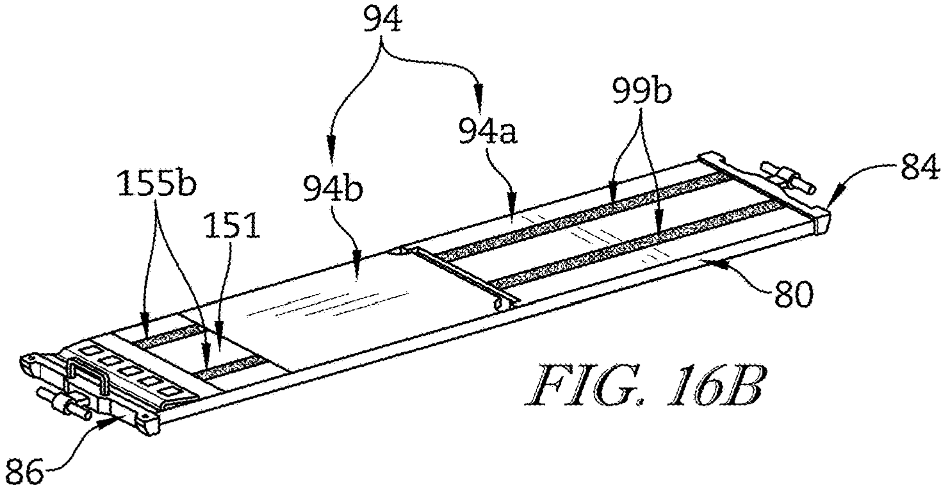
Figure 17:
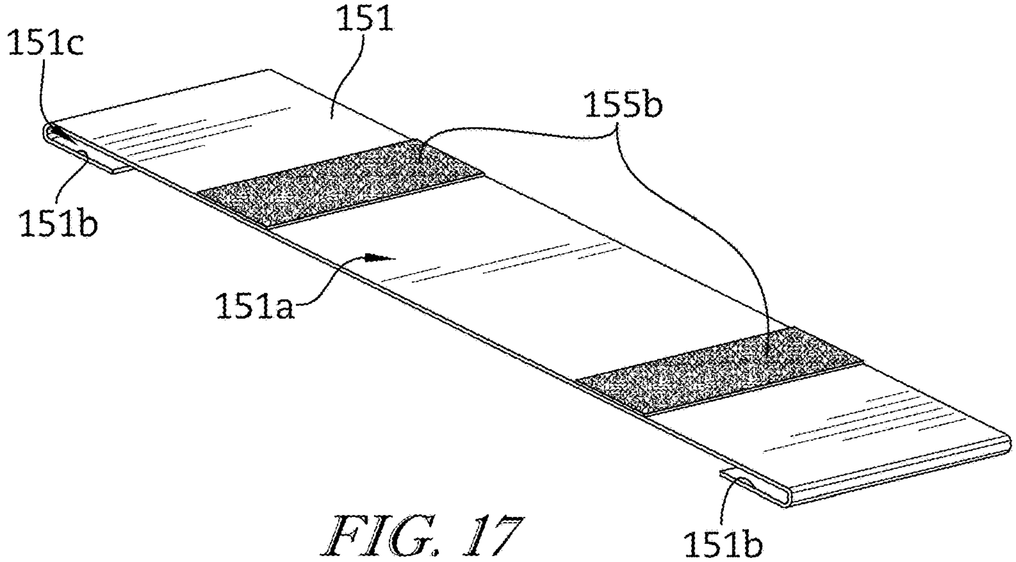
Figure 18A:
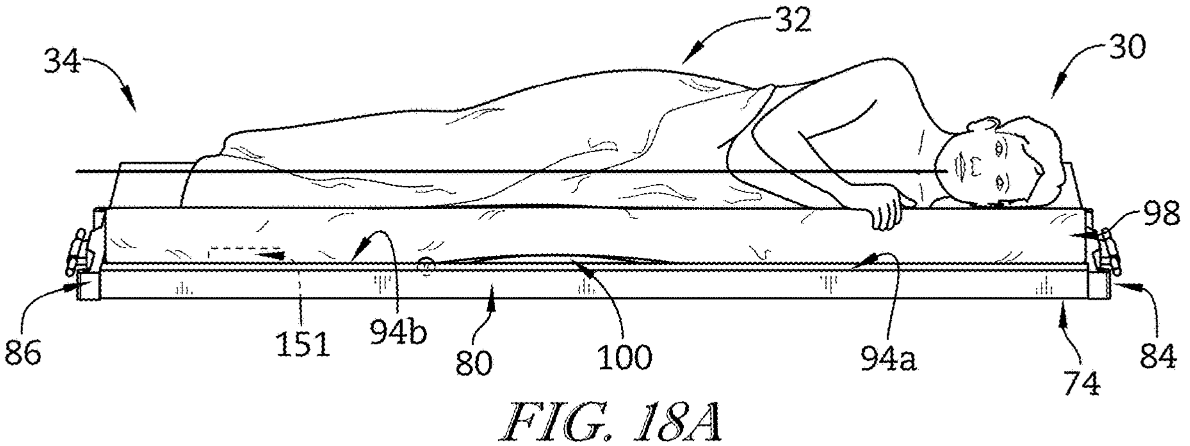
Figure 18B:
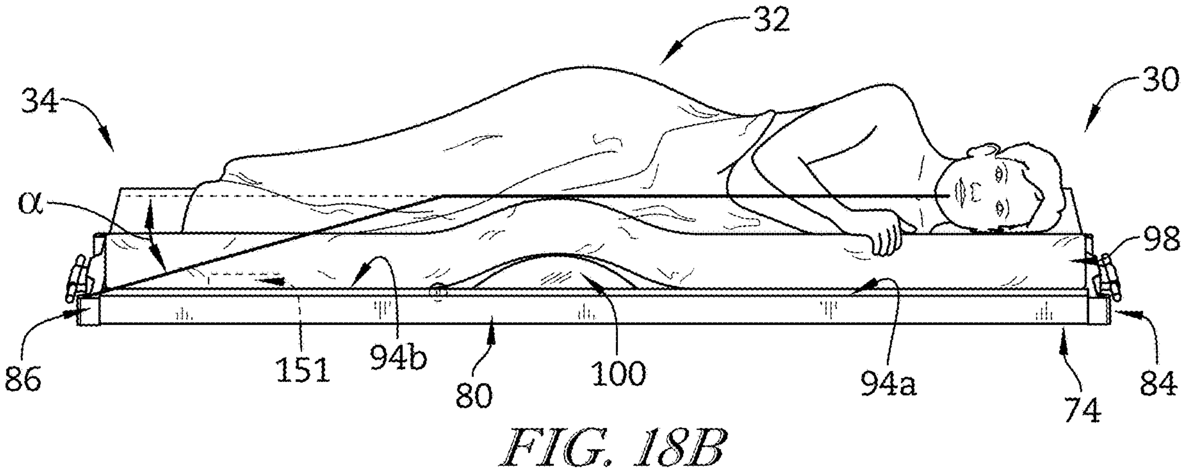
Figure 18C:
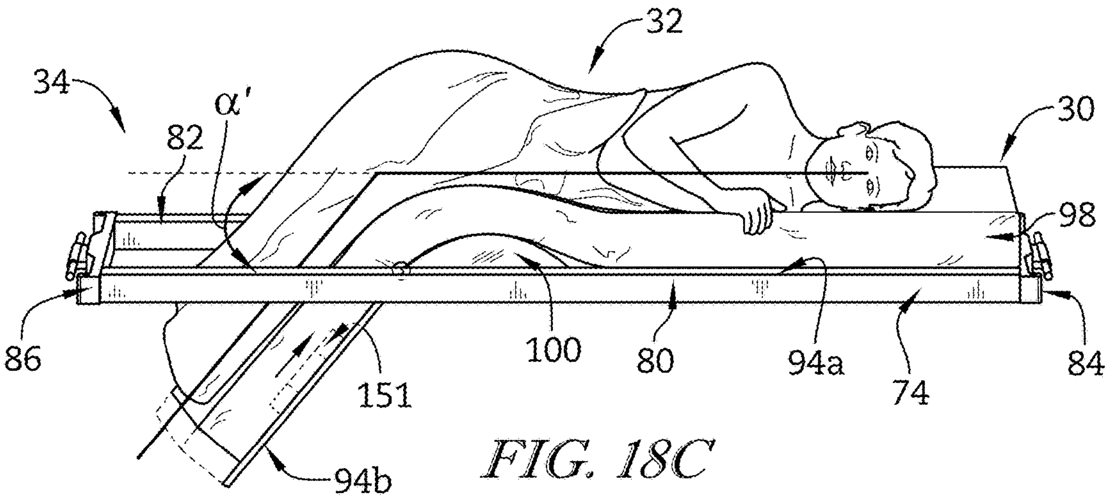
Figure 19:
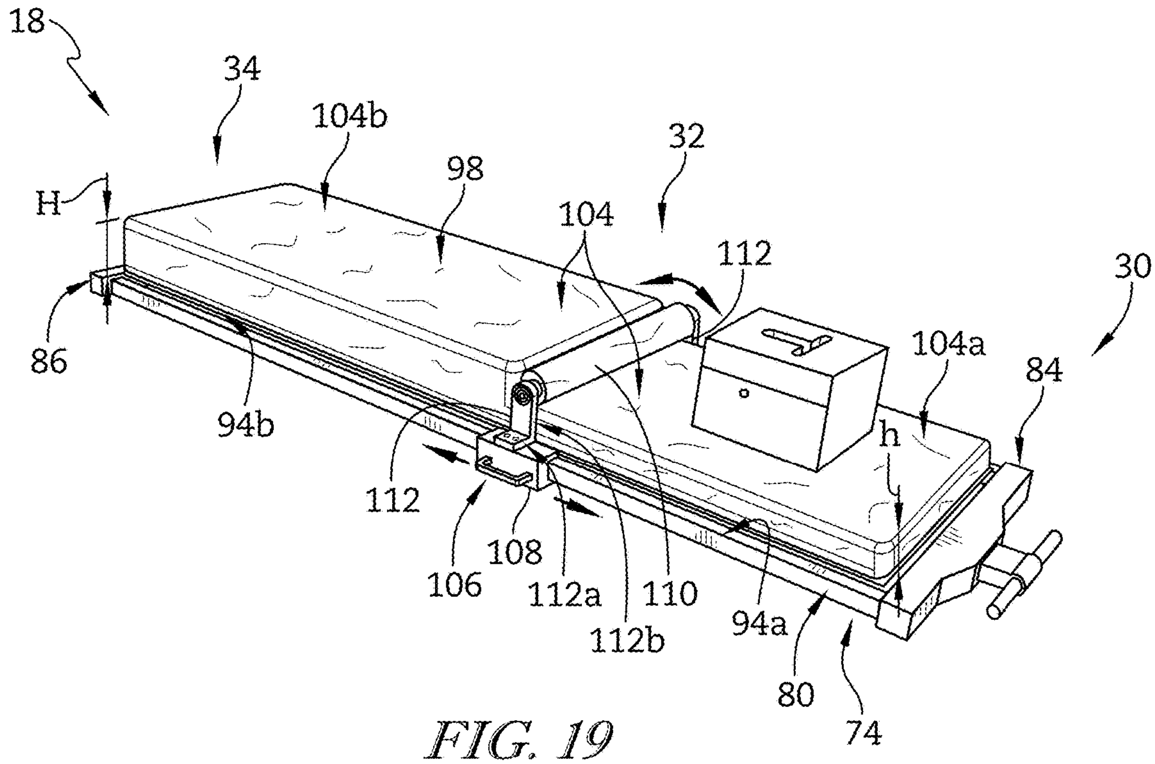
Figure 20:
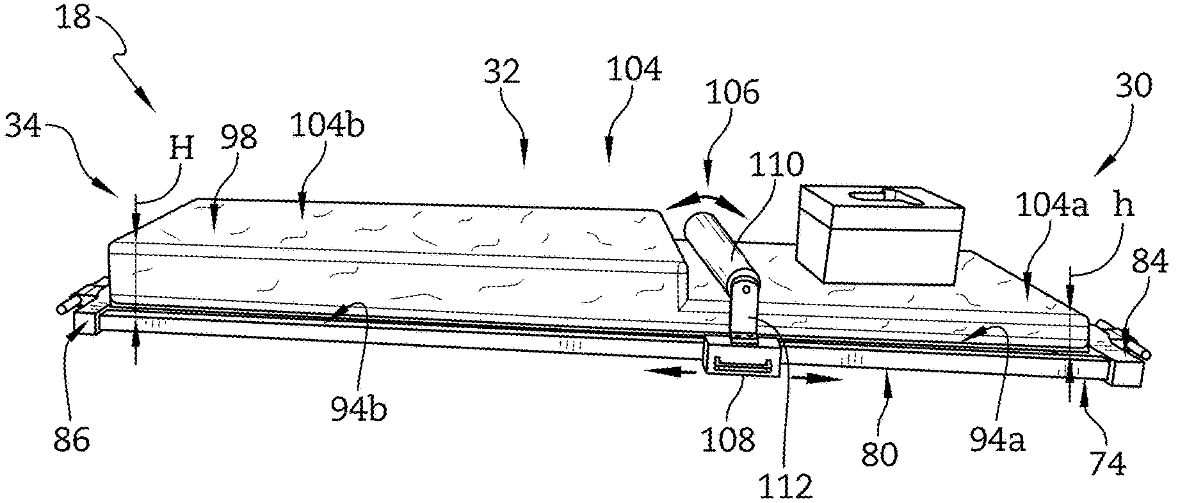
Figure 21:
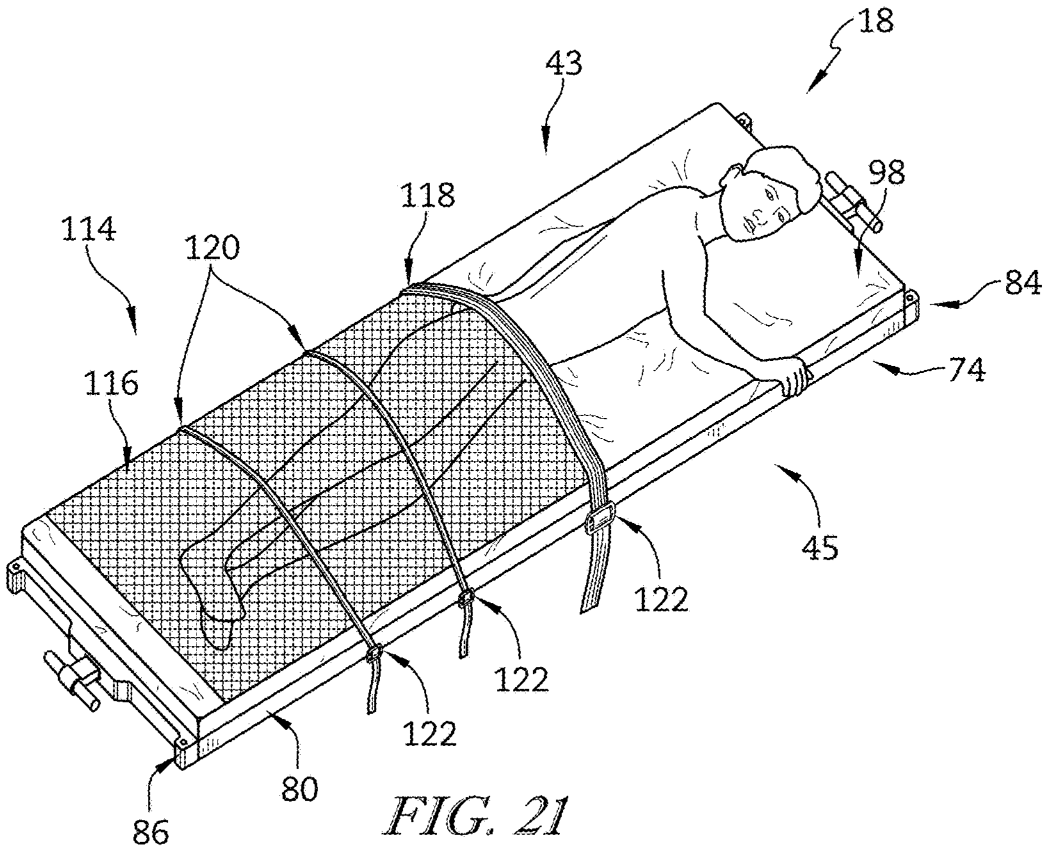
Figure 22:
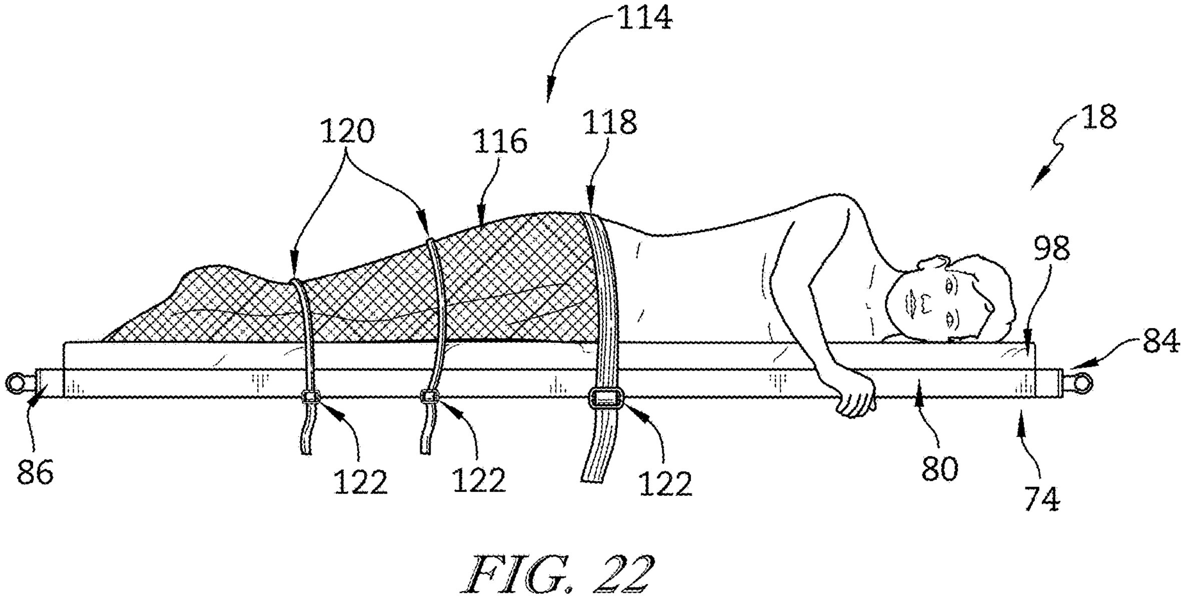
Figure 23:
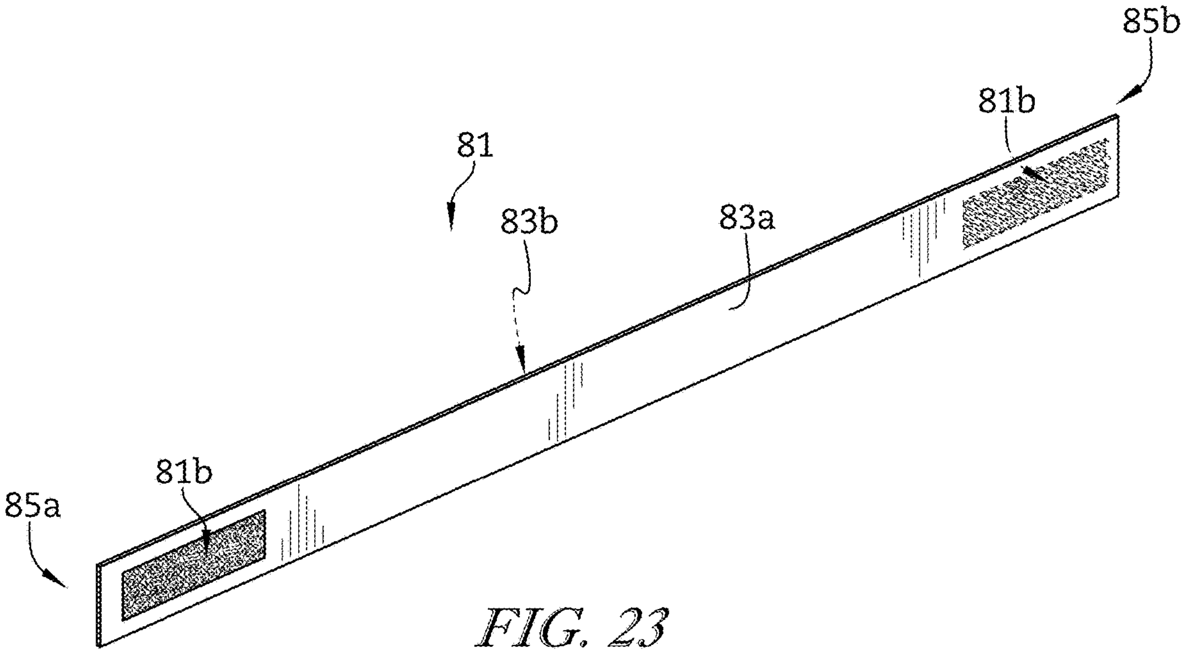
Figure 24:
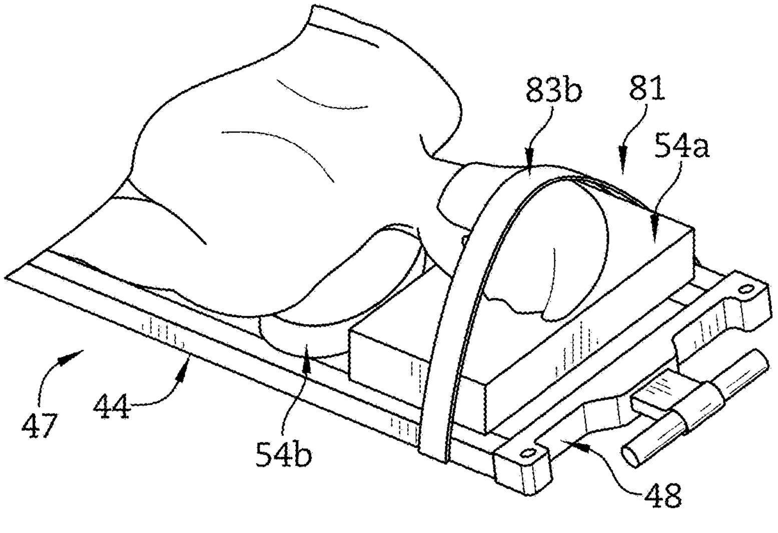
Figure 25:
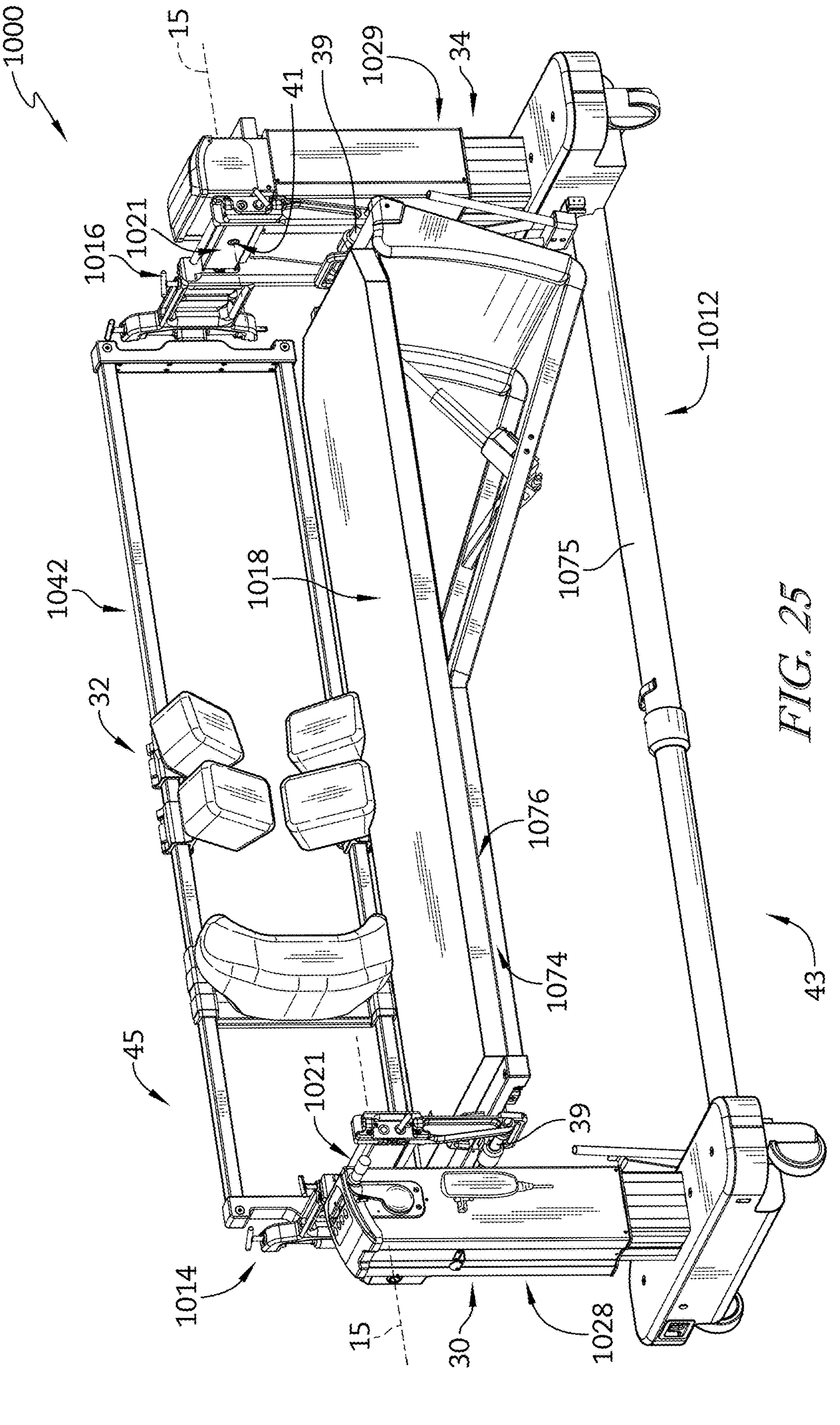
Figure 26:
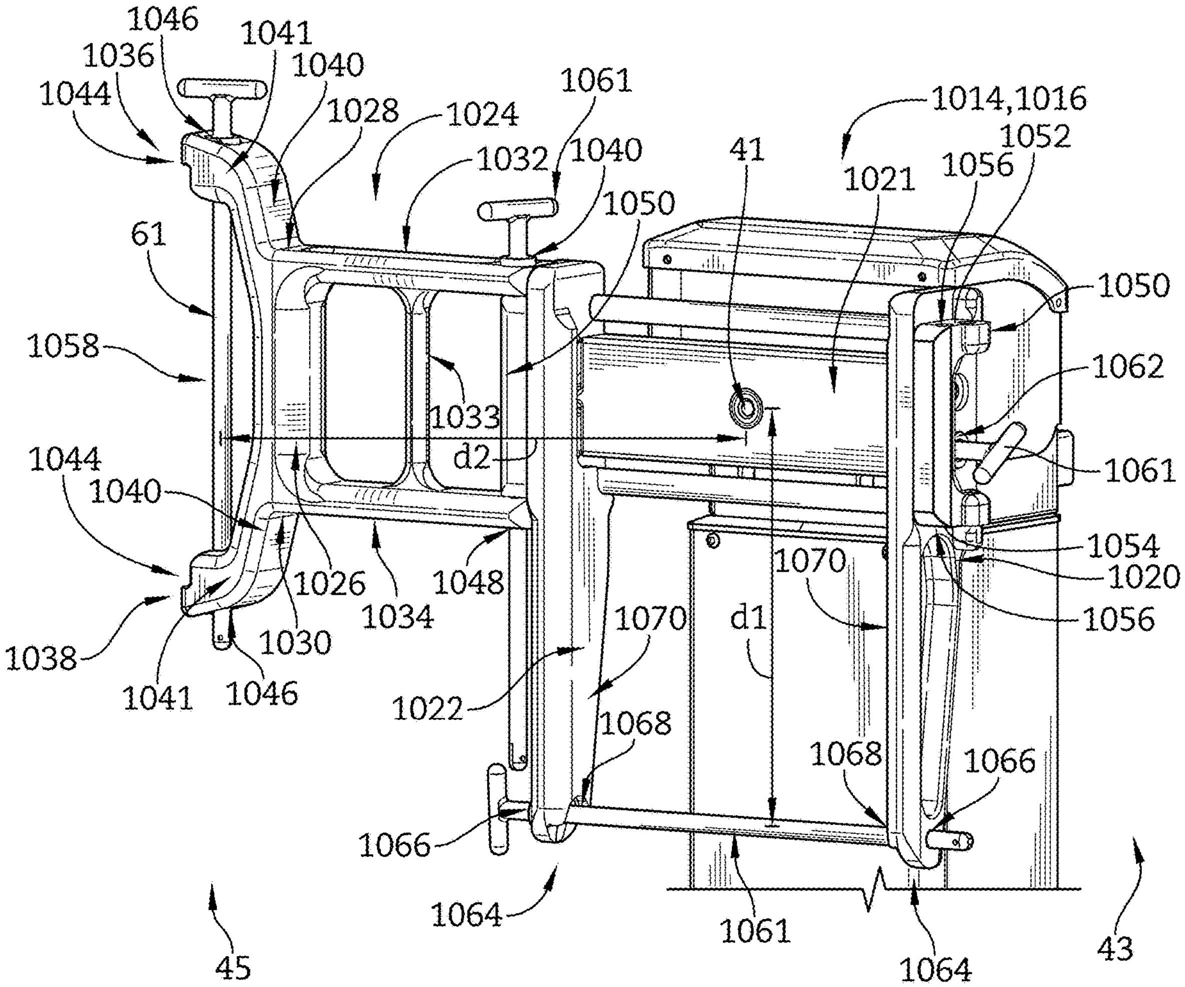
Figure 27:
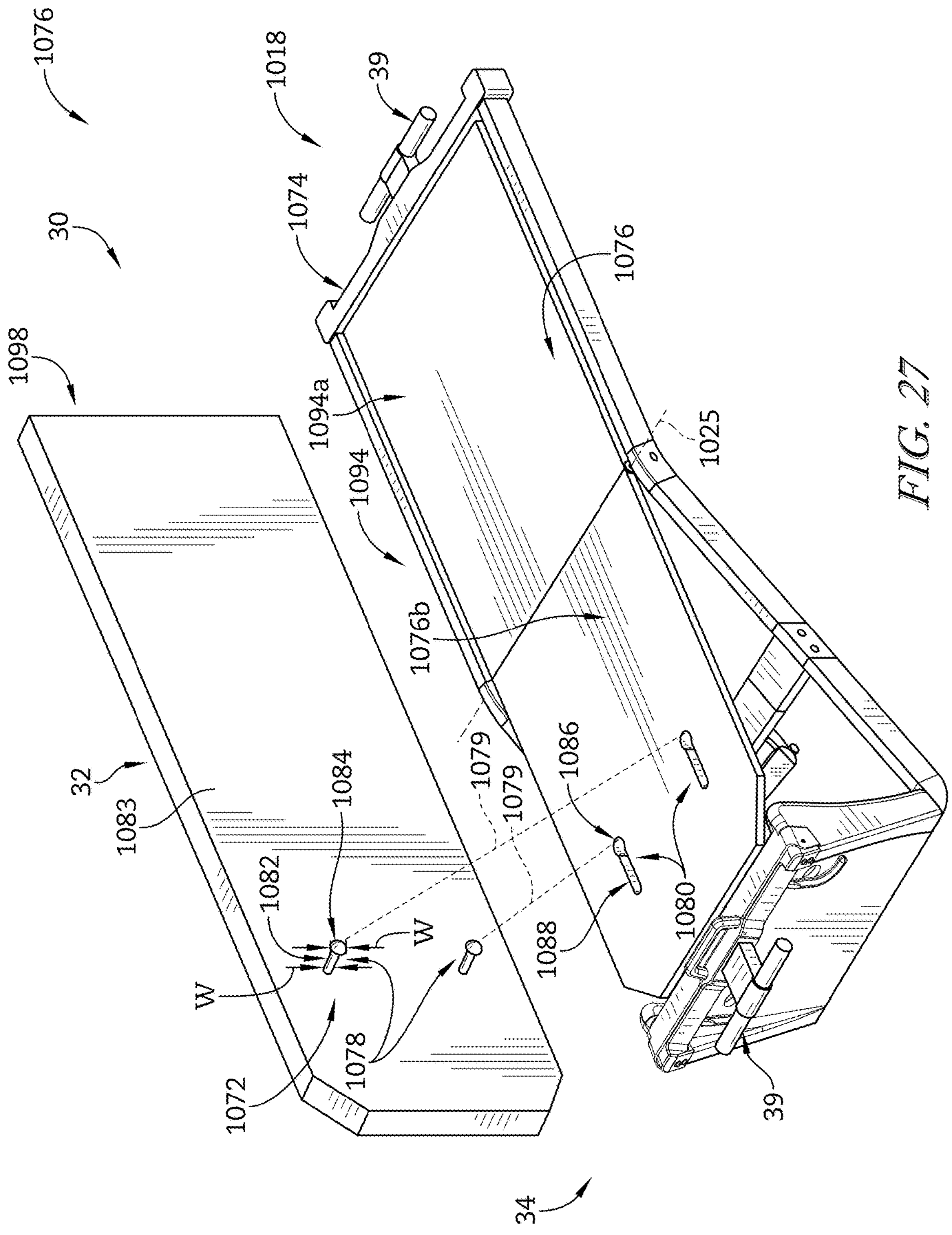

FIG. 10A is a perspective view of another illustrative main bracket for use in the surgical patient support system of FIG. 1 showing that the main bracket includes a rotor having a dish body and adjustment supports each having rails and a slide brace;

FIG. 10B is a perspective view of the main bracket of FIG. 10A showing that an angular position of the adjustment support that was formerly arranged in the 12 o'clock position shown in FIG. 10A has been selectively rotated to the 9 o'clock position, and showing that the radial position of the slide brace of the adjustment support presently positioned at the 6 o'clock position has been selectively adjusted to a new radial position;

FIG. 11A is a perspective view of the rotor of the main bracket of FIGS. 10A and 10B showing that the rotor includes support mounts arranged inside the dish body and having roller wheels arranged to contact an interior surface of the dish body;

FIG. 11B is a perspective view of the rotor of the main bracket of FIG. 11A showing that the support mount formerly arranged in the 12 o'clock position shown in FIG. 11A has been selectively rotated to the 9 o'clock position;

FIG. 12A is a perspective view of another illustrative main bracket for use in the surgical patient support system of FIG. 1 showing that the main bracket includes a main bracket frame and bracket rails coupled to the main bracket frame for sliding relative movement between a first right position (shown in solid line) and a second left position (shown in broken line) to provide selective arrangement of support to the second patient support top on either of the right or left lateral sides of the patient support system, respectively, and having a locking device configured to provide locking engagement between the bracket rails and the main bracket frame at each of the first and second positions;

FIG. 12B is a perspective view of the main bracket of FIG. 12A from a rear direction showing that the main bracket frame includes a connection mount configured to connect to the first patient support top, and showing that the main bracket frame is configured to connect to a connection bar;

FIG. 12C is a side view of the locking device of the main bracket of FIG. 12A showing the locking device in an unlocked position in which a biasing member is compressed and the locking device is positioned outside of a lock opening partly defined by each of the main bracket frame and one of the rail arms;

FIG. 12D is a side view of the locking device shown in FIG. 12B showing the locking device in a locked position in which a biasing member is extended and the locking device is positioned inside of the lock opening partly defined by each of the main bracket frame and one of the rail arms;

FIG. 13 is a perspective view of another illustrative embodiment of a patient support top for use in the surgical patient support system of FIG. 1 including a break assist bladder inflated by a pressurized fluid system, and showing that the first patient support top includes a pivotable leg portion arranged in a lowered position to provide leg break to a patient's body;

FIG. 14A is a perspective view of the patient support top of FIG. 13 showing that the break assist bladder is in a deflated state and the leg portion is in a raised position;

FIG. 14B is a perspective view of the patient support top of FIG. 13 showing that the break assist bladder is in the inflated state and the leg portion is in the lowered position to provide leg break to the patient's body;

FIG. 15A is a perspective view of a pad of the patient support top of FIG. 13 showing that the break assist bladder forms part of the pad and is attached on a bottom side thereof;

FIG. 15B is a perspective view of the pad shown in FIG. 15A from a lower perspective showing that the pad includes a sheath containing the break assist bladder and includes resilient straps configured to bias the assist bladder into the deflated state, and showing that the pad includes hook and loop fastener portions configured to releasably connect with other hook and loop fasteners portions disposed on the deck of the patient support system;

FIG. 16A is a perspective view of the patient support top of FIG. 13 showing that the support top includes an attachment sled (in broken line) disposed between the pad and a deck of the patient support top to connect the pad to the deck;

FIG. 16B is a perspective view of the patient support top shown in FIG. 16A with the pad removed and showing that the deck include a torso section and a foot section and that the attachment sled sliding connects to the foot section of the deck, and showing that the attachment sled and the torso section of the deck each include hook and loop fastener portions on a top side thereof configured for releasable attachment to the hook and look fastener portions of the pad;

FIG. 17 is a perspective view of the attachment sled shown in FIGS. 16A and 16B showing that the attachment sled has hooked ends each of which define a slot for receiving the foot section of the deck to permit sliding connection of the attachment sled to the deck;

FIG. 18A is a perspective view of the patient support top of FIG. 13 showing that the assist bladder is in the deflated position and the leg portion is in the raised position to create a zero leg break arrangement such that a patient occupying the patient support top while lying in the lateral position is positioned with the patient's spine generally aligned, and showing that the attachment sled is positioned between the deck and the pad to secure the pad to the deck and is in a first position along the leg portion of the deck;

FIG. 18B is a perspective view of the patient support top of FIG. 13 showing that the assist bladder is inflated at least partially and the leg portion of the patient support top is in the raised position to create a partial leg break arrangement such that the patient occupying the patient support top while lying in the lateral position is positioned with the patient's spine being slightly not aligned;

FIG. 18C is a perspective view of the patient support top of FIG. 13 showing that the assist bladder is in the inflated state and the leg portion of the support is in a lowered position to create a full leg break arrangement such that the patient occupying the patient support while lying in a lateral position is positioned to have the patient's spine generally not aligned, and showing that the attachment sled is position between the deck and the pad to secure the pad to the deck and has moved from the first position to a second position along the leg portion of the deck to accommodate the relative movement between the pad and the deck during change in state of the break assist bladder and change in position of the leg portion;

FIG. 19 is a perspective view of another embodiment of a patient support top for use in the surgical patient support system of FIG. 1 including a pad having a tiered support surface and an axilla support device for supporting a patient's axilla;

FIG. 20 is a perspective view from the lower right side of the patient support top as shown in FIG. 19;

FIG. 21 is perspective view of another embodiment of a patient support top for use in surgical patient support system of FIG. 1 including a patient securing device that secures the patient while lying in the lateral position to the patient support;

FIG. 22 is a side elevation view of the patient support top of FIG. 21 showing that the patient securing device includes straps and buckles configured for adjustably securing the patient to the patient support top;

FIG. 23 is a perspective view of a head strap of the patient support system of FIG. 1 that is configured to secure a patient's head to the patient support top showing that the head strap includes a strap body and fasteners that releasable couple opposite ends of the strap body to each other at various lengths; and FIG. 24 is a perspective view of the head strap of FIG. 23 wrapped around the patient's head and around the prone patient support top to secure the patient's head thereto;

FIG. 25 is a perspective view of another illustrative surgical patient support system that includes a tower base and patient support tops attached to the tower base by main brackets;

FIG. 26 is a perspective view of one of the main brackets of the surgical patient support system of FIG. 25 showing that the main brackets includes a pair of main bracket rails that extend downwardly to a connection end for connecting with the lateral patient support tops and a prone bracket coupled to one of the main bracket rails and extending laterally to connect with the prone patient support top;

FIG. 27 is a perspective view of the lateral patient support top of the surgical patient support system of FIG. 25 showing that the patient support top includes a platform including a deck adapted for pivoting movement between raised and lowered positions to provide leg break to a patient lying on the patient support top in the lateral position and a pad (shown rotated to the left and rear to show the bottom surface) slidingly coupled to the deck by an attachment assembly to accommodate movement of the deck.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

In performance of various surgical procedures, providing surgical access to surgery sites on a patient's body promotes favorable surgical conditions and increases the opportunity for successful results. Positioning the patient's body in one particular manner can provide a surgical team preferred and/or appropriate access to particular surgical sites. As a surgical patient is often unconscious during a surgery, a surgical team may position a patient's body in various manners throughout the surgery. Patient supports, such as operating tables, that can accommodate various body positions provide surgical access to the surgical sites while safely supporting the patient's body.

Some surgical procedures, such as spinal fusion procedures, require particular access to various parts of a patient's spine. The course of a surgery can require a patient's body to be positioned for a period of time in several different manners, for example, in a lateral position for a lateral lumbar interbody fusion and in a prone position for a posterior spinal fusion. Safely moving a surgical patient's body during surgery can be challenging. Surgical support systems that can accommodate multiple positions of a patient's body while easing the transition between different positions provide safe and effective body positioning during a surgery.

For procedures that are performed in the lateral body position (e.g., lateral lumbar interbody fusion), it can be desirable to articulate the patient's legs out of the sagittal plane along the coronal plane such that the patient's legs are generally out of parallel with the patient's torso to misalign the patient spine, referred to as leg break. This leg break can provide access to certain surgical sites, for example certain lumbar areas. The present disclosure includes, among other things, surgical patient support systems for accommodating various positions of a patient's body, including for example a lateral position with leg break and a prone position.

An illustrative embodiment of a surgical patient support system 10 includes a tower base 12, main brackets 14, 16, and patient support tops 18, 42 as shown in FIG. 1. Main brackets 14, 16 are configured to support patient support tops 18, 42 at about 90 degrees relative to each other to support various patient body positions. Surgical patient support system 10 includes head end 30, a mid-section 32, foot end 34, and left 43 and right 45 lateral sides as shown in FIG. 1. In the illustrative embodiment, patient support top 18 is configured to support a patient lying in a lateral position and patient support top 42 is configured to support the patient lying in a prone position.

Tower base 12 supports main brackets 14, 16 for controlled translatable and rotational movement about an axis 15. Tower base 12 includes first and second elevator towers 28, 29 as shown in FIG. 1. First elevator tower 28 is positioned at the head end 30 of the support system 10, and second elevator tower 29 is positioned at the foot end 34 of the support system 10.

Each elevator tower 28, 29 includes one mounting post 41. In the illustrative embodiment, each mounting post 41 is fixed for rotation with its connection bar 21 and is configured to be vertically translated by its elevator tower 28, 29 and rotated by its elevator tower 28, 29 about axis 15 for controlled rotation of connection bar 21. Each mounting post 41 extends from its elevator tower 28, 29 to connect to main brackets 14, 16, illustratively through connection bar 21. Axis 15 is illustratively defined by a line intersecting both mounting posts 41 at their points of connection to connection bars 21. Each connection bar 21 is configured on opposite ends thereof to attach to one of main brackets 14, 16 to provide moveable support thereto.

Figure 2:
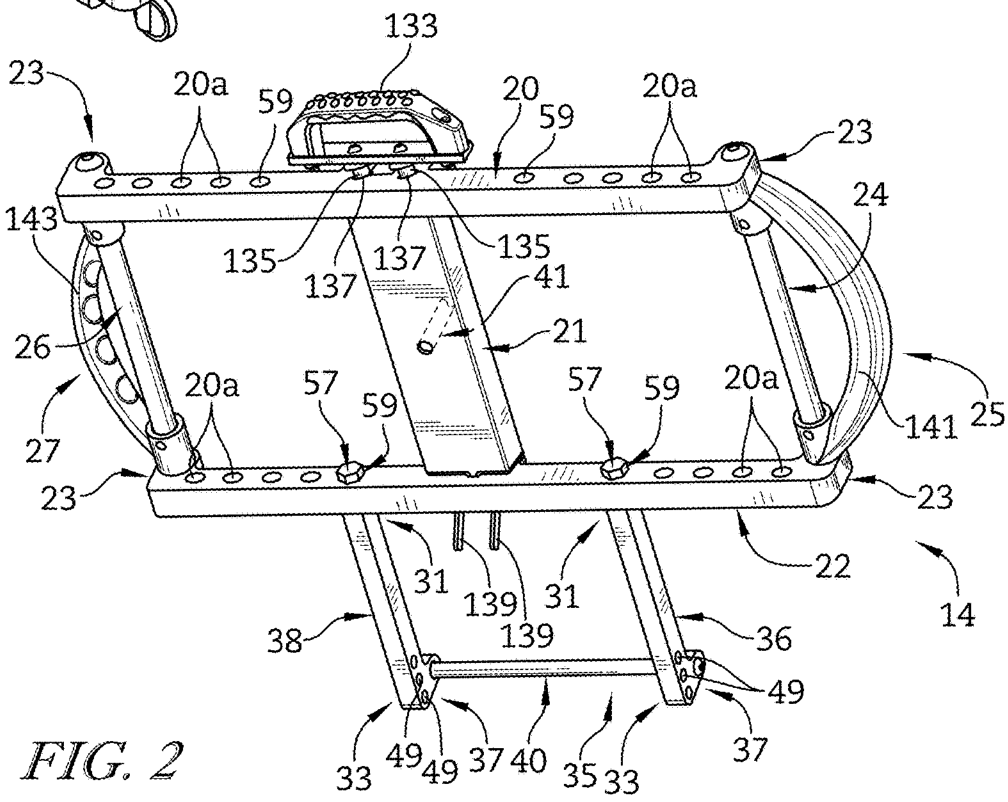
FIG. 2 is a perspective view of a main bracket of the patient support system of FIG. 1.

Main brackets 14, 16 connect patient support tops 18, 42 to tower base 12 respectively at a head end 30 and a foot end 34 of the support system 10 as suggested in FIG. 1 to provide adaptable support to a surgical patient. Main brackets 14, 16 each include a first bracket rail 20, a second bracket rail 22, and an extension bracket 35 as illustratively shown in FIGS. 1 and 2. In the orientation as shown in FIG. 2, first and second bracket rails 20, 22 extend between left and right lateral sides 43, 45 of patient support system 10. Extension brackets 35 of each main brackets 14, 16 are configured for connection to patient support top 18.

Figure 3A:
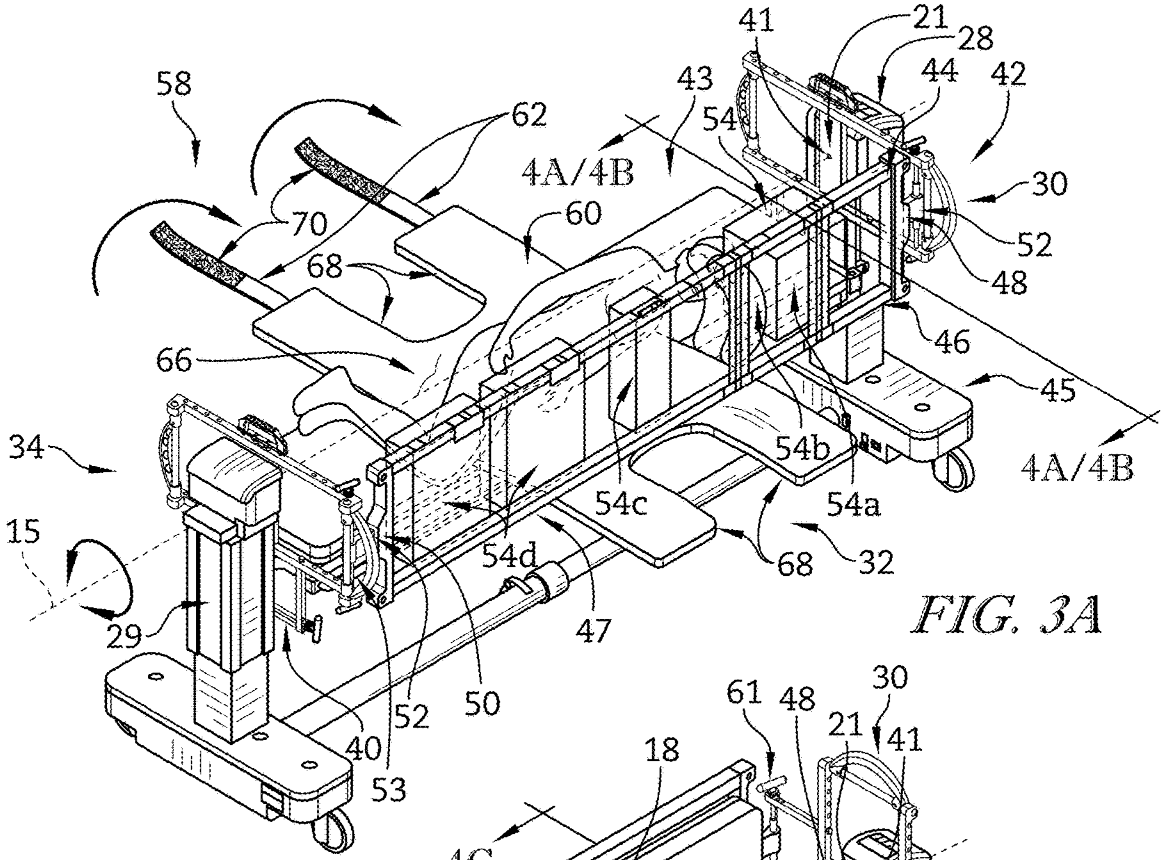
FIG. 3A is a perspective view of the surgical patient support system of FIG. 1 showing a patient occupying the first patient support top while lying in a lateral position with knees bent and facing the second patient support top, and showing an H-shaped transfer sheet underlying the patient's torso, pelvis, and thighs.
Figure 3B:
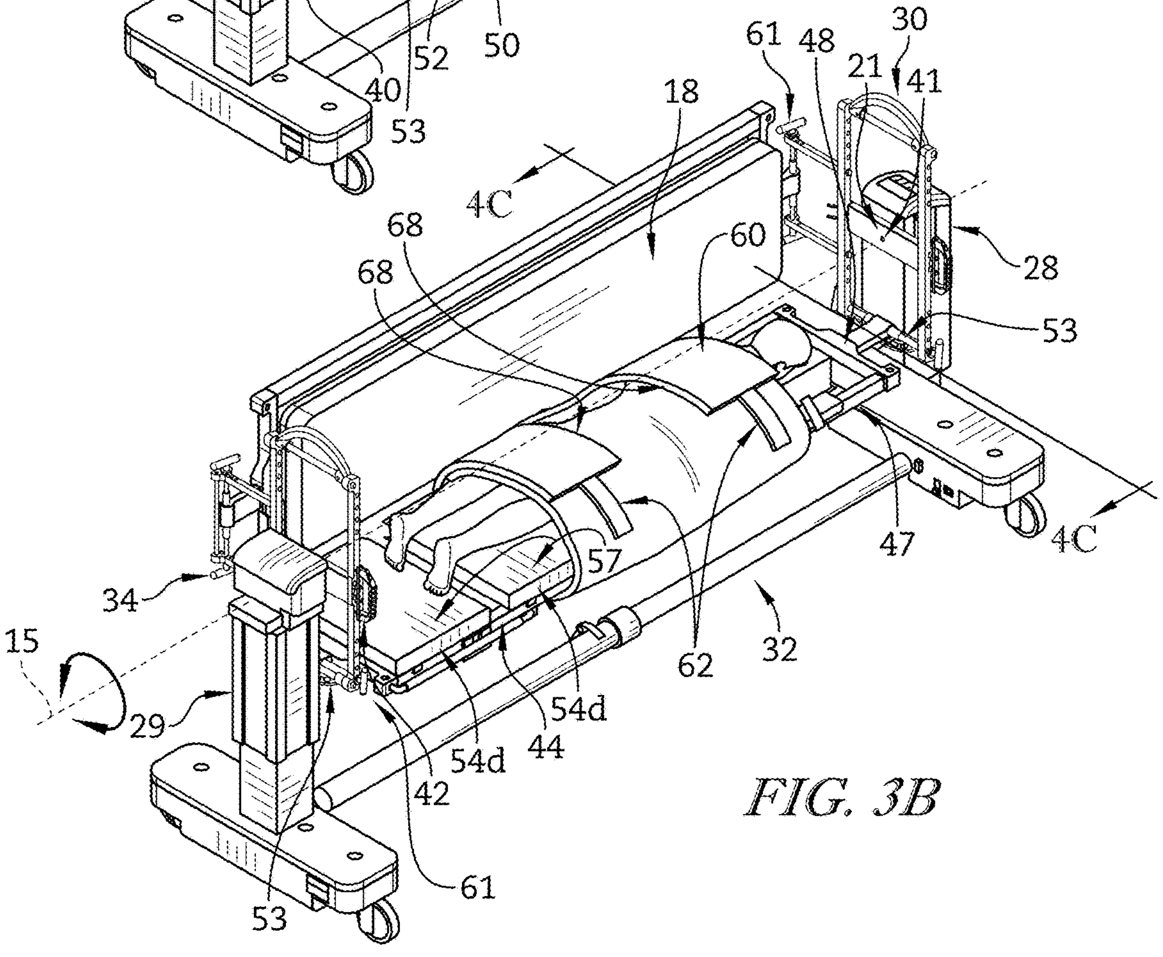
FIG. 3B is a perspective view of the surgical patient support system of FIG. 1 with the main brackets having been rotated about 90 degrees relative to head end and foot end elevator towers such that the patient is supported by the second patient support top in a prone position.

Extension brackets 35 are illustratively configured to connect patient support top 18 to each main bracket 14, 16 to provide support to a patient lying in either of the lateral or supine positions as shown in FIGS. 1, 3A, and 3B. Each extension bracket 35 includes a first extension bracket rail 36 and a second extension bracket rail 38 as shown in FIGS. 1 and 2. The first and second extension bracket rails 36, 38 of each extension bracket 35 extend parallel to each other in spaced apart relation. In the illustrative embodiment as shown in FIG. 2, the first and second extension bracket rails 36, 38 of each main brackets 14, 16 extend perpendicularly from their respective second bracket rail 22 in a direction away from the first bracket rail 20.

As suggested in FIGS. 1 and 2, the first and second extension bracket rails 36, 38 illustratively extend coplanar with the first and second bracket rails 20, 22 of their respective main bracket 14, 16. As illustratively shown in FIG. 1, extension bracket 35 of each main bracket 14, 16 is attached to second bracket rail 22 such that each is illustratively arranged to extend beneath its respective bracket rail 22 to connect to patient support top 18 below the height of its respective bracket rail 22 in the orientation shown in FIGS. 1 and 3A.

First and second extension bracket rails 36, 38 of main brackets 14, 16 each have an attachment end 31 configured for attachment to second bracket rail 22 as suggested in FIG. 2. Each extension bracket rail 36, 38 illustratively attaches to its respective second bracket rail 22 by a bolt 57 which penetrates through an attachment hole 59 in the bracket rail 22 for connection with end 31 of the respective extension bracket rail 36, 38. In some embodiments, extension bracket rails 36, 38 are attached their respective second bracket rail 22 by one or more of riveting, welding, friction fit, shear pin, and/or any other suitable fastening manner. Extension bracket rails 36, 38 are illustratively substantially parallel with connection bar 21 and are spaced equidistantly on left and right lateral sides of connection bar 21 in the orientation as shown in FIG. 2.

First and second extension bracket rails 36, 38 each include a flanged section 37 located on another end 33 that is spaced apart from the attachment end 31 thereof as shown in FIG. 2. Each extension bracket 35 includes an extension bracket strut 40 extending perpendicularly to extension bracket rails 36, 38 as shown in FIGS. 1 and 2. Each extension bracket strut 40 illustratively extends between and connects to the flanged sections 37 of the first and second extension bracket rails 36, 38 of the same extension bracket 35. First and second extension bracket rails 36, 38 of each extension bracket 35 include extension mount holes 49 for connecting the extension brackets 35 to patient support top 18.

Extension mount holes 49 illustratively extend through the first and second extension bracket rails 36, 38 in a direction parallel to the extension bracket strut 40 of the same extension bracket 35 as suggested in FIGS. 1 and 2. A number of extension mount holes 49 are illustratively disposed on end 33 of each first and second extension bracket rail 36, 38. On each extension bracket 35, the extension mount holes 49 of the first extension bracket rail 36 are positioned in spaced apart relation to each other. Each extension mount hole 49 of first extension bracket rail 36 illustratively corresponds in position to one extension mount hole 49 of the second extension bracket rail 38 of the same extension bracket 35. Corresponding extension mount holes 49 are configured to receive a connection pin 61 (see FIG. 3B) therethrough for connection of patient support top 18 to the main brackets 14, 16 via extension brackets 35. Main brackets 14, 16 are configured to connect to prone support top 42 via first and second bracket rails 20, 22.

First and second bracket rails 20, 22 of each main bracket 14, 16 extend parallel to each other in spaced apart relation as shown in FIG. 2. First and second bracket rails 20, 22 are embodied as rigid one-piece solid rails with portions extending between left and right side of connection bar 21 when rails 20, 22. Each first and second bracket rail 20, 22 includes a first end 25 and a second end 27. Each first and second end 25, 27 of bracket rails 20, 22 includes a flanged section 23 extending perpendicularly from its respective bracket rail 20, 22 in a direction away from the patient support top 18 as suggested in FIGS. 1 and 2. First and second bracket rails 20, 22 of each main bracket 14, 16 include prone mount holes 20*a* for coupling the main brackets 14, 16 to prone patient support top 42 to support a patient while lying in prone position as suggested in FIG. 3B.

Prone mount holes 20*a* illustratively extend through the first and second bracket rails 20, 22 in a vertical direction of patient support system 10 when oriented as shown in FIGS. 1 and 2. A number of prone mount holes 20*a* are illustratively disposed on each end 25, 27 of first bracket rail 20 and a corresponding number of prone mount holes 20*a* are illustratively disposed on each end 25, 27 of second bracket rail 22. Each prone mount hole 20*a* on one end 25, 27 of first bracket rail 20 of one main bracket 14, 16 illustratively corresponds in position to a prone mount hole 20*a* on the same one end 25, 27 of the second bracket rail 22 of the same main bracket 14, 16. Corresponding prone mount holes 20*a* of the first and second brackets 20, 22 are configured to receive a connection pin 61 therethrough for connection of the lateral patient support top 42 to the main bracket 14, 16.

Each of the main brackets 14, 16 includes first and second bracket struts 24, 26 as shown in FIGS. 1 and 2. Bracket struts 24, 26 extend parallel to each other between the first and second bracket rails 20, 22 of each main bracket 14, 16. In the illustrative embodiment as shown in FIG. 2, one first bracket strut 24 connects to flanged section 23 on the first end 25 of first bracket rail 20 of main bracket 14 and to flanged section 23 of the first end 25 of second bracket rail 22 of the same main bracket 14. One second bracket strut 26 connects to flanged section 23 of the second end 27 of first bracket rail 20 of main bracket 14 and to flanged section 23 of the second end 27 of second bracket rail 22 of the same main bracket 14.

In the illustrative embodiment as suggested in FIG. 1, another first bracket strut 24 connects to flanged section 23 on the first end 25 of first bracket rail 20 of main brackets 16 and to flanged section 23 of the first end 25 of second bracket rail 22 of the same main bracket 16. Another second bracket strut 26 connects to flanged section 23 of the second end 27 of first bracket rail 20 of the same main bracket 16 and to flanged section 23 of the second end 27 of second bracket rail 22 of the same main bracket 16. Long handles 141, 143 are coupled respectively to struts 24, 26 at the ends 25, 27 of main brackets 14, 16 as shown in FIGS. 1 and 2.

Each main bracket 14, 16 is illustratively connected to its connection bar 21 by a handle 133 having a pair of parallel pins 135 extending therefrom as shown in FIGS. 1 and 2. Pins 135 are each respectively inserted through corresponding holes 137 of rails 20, 22 and through bores (not shown) provided through the long dimension of connection bar 21. When pins 135 are each fully inserted through their corresponding holes 137 of one main bracket 14, 16, handle 133 is closely adjacent to one of the rails 20, 22 of the main bracket 14, 16 and latches 139 mounted to the distal ends of pins 135 are exposed for manipulation adjacent to the other rail 20, 22 of the same main bracket 14, 16. Latches 139 are pivotable between unlocked and locked positions, the locked position (shown in FIG. 2) preventing disconnection for handle 133 and pins 135 from the main bracket 14 and the unlocked position allowing removal of pins 153 from their respective holes 137.

Figure 4A:
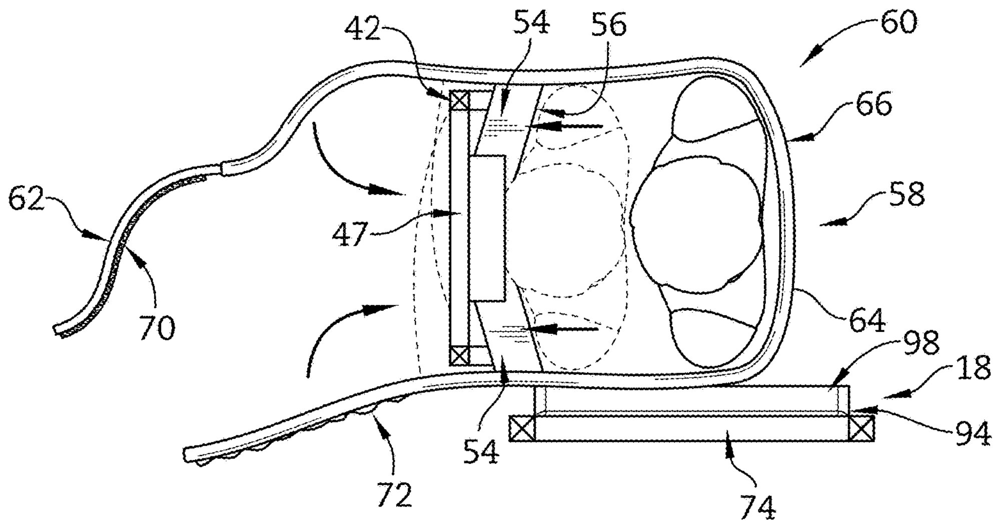
FIG. 4A is a cross-sectional elevation view taken along a line 4A/4B-4A/4B of FIG. 3A showing the patient being laterally shifted with a transfer sheet from the solid line position to the dotted line position while lying in the lateral position to contact the second patient support top with an anterior side of the patient's body.
Figure 4B:
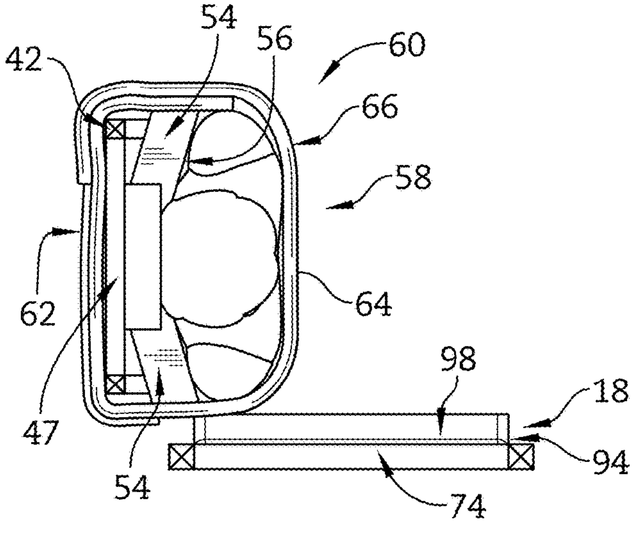
FIG. 4B is a cross-sectional elevation view taken along the line 4A/4B-4A/4B of FIG. 3A showing the patient in contact with the second patient support top and secured with the transfer sheet to the second patient support top.

Prone patient support top 42 is configured to connect to the main brackets 14, 16 to provide a prone support surface 56 to permit engagement with the anterior side of a patient's body while in the lateral position as suggested in FIGS. 3A, 4A, and 4B. In the illustrative embodiment, prone patient support top 42 is illustratively arranged perpendicular to the patient support top 18. Prone patient support top 42 includes a prone frame 47 and prone pads 54. Prone frame 47 includes first and second prone support rails 44, 46 and first and second prone mount rails 48, 50.

First and second prone support rails 44, 46 extend parallel to each other in spaced apart relation from the head end 30 to the foot end 34 of patient support system 10 as shown in FIG. 3A. In the illustrative embodiment, prone rails 44, 46 are illustratively embodied as straight tubular frame members, but in some embodiments are any of solid and/or filled frame members. First and second prone rails 44, 46 extend between and connect to prone mount rails 48, 50 arranged respectively at the head end 30 and foot end 34 of patient support system 10 to form prone frame 47 as shown in FIGS. 3A and 3B.

First and second prone mount rails 48, 50 each includes a prone connection limb 52 configured for engagement with the main brackets 14, 16 and for limited movement to permit rotatable connection of patient support top 42 to tower base 12. The movable connection of main brackets 14, 16 to prone connection limb 52 permits rotation of main brackets 14, 16 about axis 15 while the elevator towers 28, 29 are arranged to have their mounting posts 41 at different elevations above the floor, without binding the connections. An example of such a movable connection of a patient table to a support structure is disclosed in U.S. Patent Application Publication No. 2013/0269710 by Hight et al., the contents of which are hereby incorporated by reference as described for motion coupler "218" and similar descriptions therein.

Each prone connection limb 52 includes a prone pin tube 53 attached to an end of the prone connection limb 52 that is positioned away from the respective prone mount rail 48, 50 as suggested in FIG. 3A. The prone pin tube 53 illustratively extends through the prone connection limb 52 and is configured for selective engagement of corresponding prone mount holes 20*a* of first and second bracket rails 20, 22. A connection pin 61 penetrates through the corresponding prone mount holes 20*a* and the prone pin tube 53 to movably connect the patient support top 42 to main brackets 14, 16.

In the illustratively embodiment, patient support top 42 connects to each of the main brackets 14, 16 at the head end 30 and foot end 34 of surgical patient support system 10 as shown in FIGS. 3A and 3B. Patient support top 42 illustratively connects to each of the first and second bracket rails 20, 22 of each main bracket 14, 16 by pinned connection described above. In the illustrative embodiment, patient support top 42 is selectively connected to first and second bracket rails 20, 22 of each main bracket 14, 16 on a right lateral side 45 of the patient support device, but can alternatively be selectively connected to first and second bracket rails 20, 22 of each main bracket 14, 16 on a left lateral side 43 of the patient support device. Prone patient support top 42 is support by the main brackets 14, 16 at about 90 degrees relative to patient support top 18.

Patient support top 18 is configured to provide support to a patient in any of the supine and the lateral positions as shown in FIG. 1. Patient support top 18 is connected to elevator towers 28, 29 through the main brackets 14, 16. Patient support top 18 illustratively includes a frame 74 and a platform 76.

Frame 74 of patient support top 18 includes support rails 80, 82 and mount rails 84, 86 as shown in FIGS. 1 and 3-5. Support rails 80, 82 extend parallel to each other in spaced apart relation from the head end 30 to the foot end 34 of patient support system 10. Support rails 80, 82 extend between and connect to mount rails 84, 86 that are disposed respectively at the head end 30 and foot end 34 to form a rigid structure. Each mount rail 84, 86 includes a moveable connection limb 85 that is configured for connection with one of main brackets 14, 16.

The movable connection of frame 74 to movable connection limb 85 permits rotation of main brackets 14, 16 about axis 15 while the elevator towers 28, 29 are configured to have their mounting posts 41 at different elevations above floor, without binding the connections. Connection limbs 85 are illustratively embodied as having similar construction to prone connection limb 52 and an example of such a movable connection of a patient table to a support structure is disclosed in U.S. Patent Application Publication No. 2013/0269710 by Hight et al., the contents of which are hereby incorporated by reference as described for motion coupler "218" and similar descriptions therein.

Each connection limb 85 includes a pin tube 39 attached to an end of the connection limb 85 that is positioned away from the respective mount rail 84, 86 as suggested in FIG. 1. Each pin tube 39 extends through its respective connection limb 85 and is configured for selective engagement of corresponding mount holes 49 of one extension bracket 35 of main brackets 14, 16. A connection pin 61 penetrates through the corresponding mount holes 49 and pin tube 39 to movably connect patient support top 18 to main brackets 14, 16 to support a patient while lying in any of the supine and the lateral positions.

Elevator towers 28, 29 provide movable support to the respective main brackets 14, 16. Elevator towers 28, 29 are configured to vertically translate and rotate their mounting posts 41 such that each of the head end 30 and foot end 34 of patient support top 18 and patient support top 42 can be independently translated vertically, and such that the patient support tops 18, 42 can be rotated around axis 15 together in fixed position relative to each other as suggested in FIGS. 3A-4C. In the illustrative embodiment shown in FIG. 3A, main brackets 14, 16 are operable for controlled rotation around axis 15 via connection bars 21 to move a patient between positions, for example, from the lateral position into the prone position.

Before rotation of main brackets 14, 16, a patient occupying patient support top 18 while lying in the lateral position is shifted laterally (from the solid line position to the dotted line position in FIG. 4A) to place her anterior side into contact with prone support surface 56 of patient support top 42 while a lateral side is supported by patient support top 18 as shown in FIGS. 4A and 4B. Once the patient is secured with the anterior side of her body in contact with the prone support surface 56, a user can operate towers 28, 29 to rotate mounting posts 41 such that main brackets 14, 16 are illustratively rotated towards the right lateral side 45 around axis 15 until the patient achieves the prone position supported by patient support top 42 as shown in FIGS. 3A and 3B. The patient is thus easily and safely moved into the prone position onto prone patient support top 42 providing the corresponding surgical access and without any separate surgical support structure. In the illustrative embodiment, the controlled rotation and translation of the mounting posts 41 is embodied to be performed by an elevator control system. The elevator control system is embodied to include a user interface, controller, and associated peripherals including hardware and/or software/firmware to allow a user to selectively perform controlled rotation and translation of the mounting posts 41. An example of such a control system is described in U.S. Patent Application Publication No. 2013/0269710 by Hight et al., the contents of which are hereby incorporated by reference as described for control system "30" and similar descriptions therein.

Figure 4C:
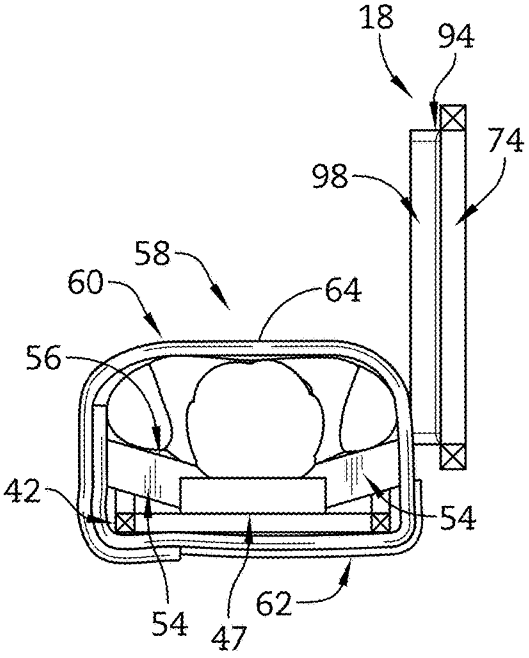
FIG. 4C is a cross-sectional elevation view taken along a line 4C-4C of FIG. 3B showing that the patient has been rotated from the lateral position supported by the first patient support top into the prone position supported by the second patient support top.
Figure 4D:
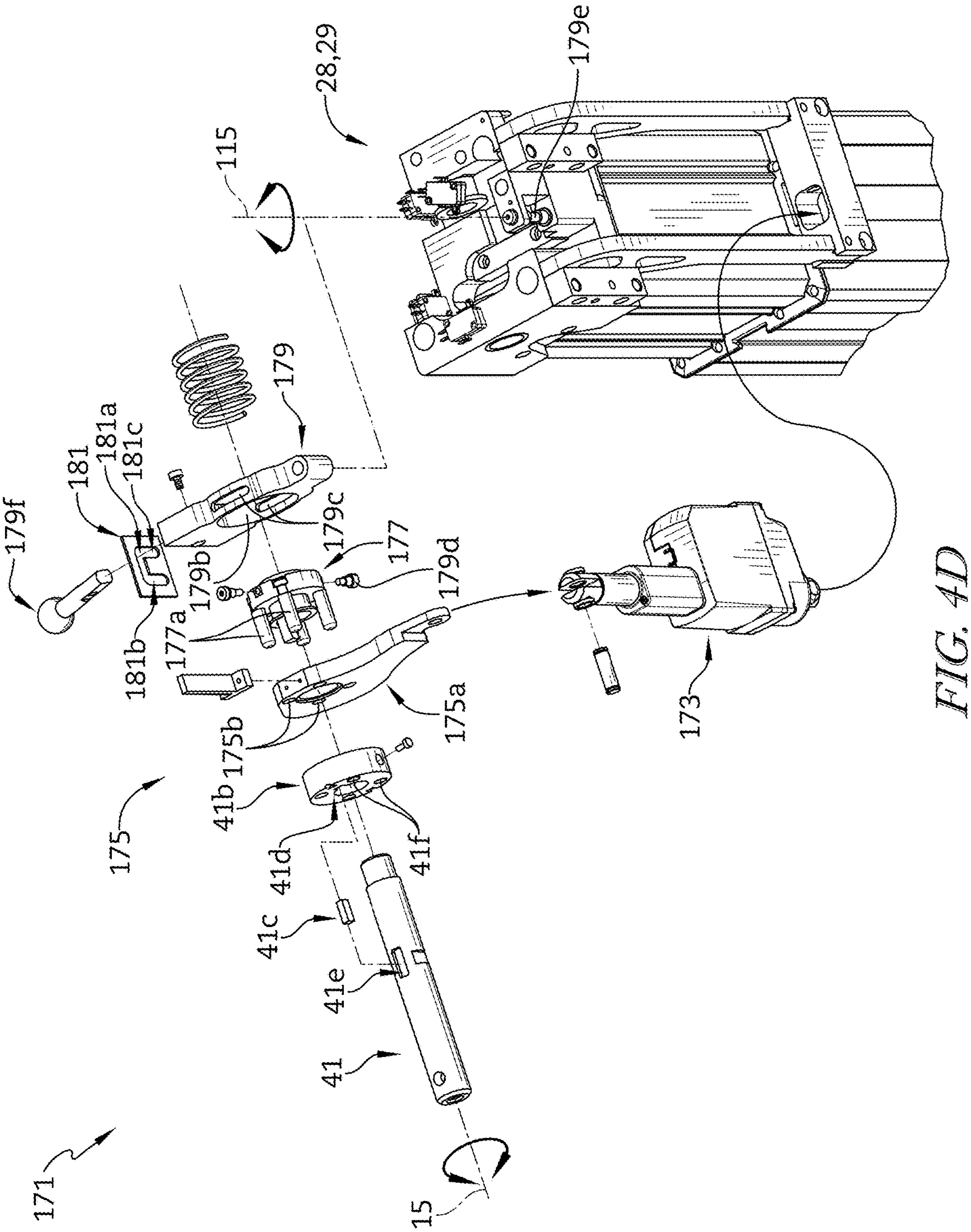
FIG. 4D is a perspective view of an exploded clutch rotation system of the tower base of the patient support system shown in FIG. 1 showing that the clutch rotation system includes a clutch having a lever connected to an actuator, and a clutch spindle configured to provide selective rotational-locking engagement between the lever and a mounting post, such that the mounting post can be selectively connected to the actuator for powered rotation or disconnected for free rotation.

In the illustrative embodiment, towers 28, 29 each have a clutch rotation system 171, as shown in FIG. 4D, including a powered actuator 173 which is operable to provide a limited ranged of powered rotation to mounting posts 41 to tilt main brackets 14, 16 and thereby tilt patient support top 18 side-to-side. If presently attached, as described herein, the prone patient support top 42 also undergoes the limited amount of powered tilt. Mounting posts 41 are illustratively selectively locked for limited powered rotation relative to their respective elevator towers 28, 29 by the clutch rotation system 171 that can be unlocked to permit manual (free) rotation of mounting posts 41 and main brackets 14, 16, and thus support tops 18, 42, through a larger rotational range, for example, plus and minus 90 degrees and or more. An example of such a clutch rotation system is described in U.S. Patent Application Publication No. 2013/0269710 by Hight et al., the contents of which are hereby incorporated by reference as described for rotation system "46" and similar descriptions therein.

Clutch rotation system 171 includes powered actuator 173, clutch 175, and mounting post 41, as shown in FIG. 4D. Clutch 175 includes a mounting post ring **41*b*, an actuator lever 175*a*, a clutch spindle 177, and a spindle housing 179. Actuator lever 175*a* is pivotably connected at one end to actuator 173 and is mounted at the other end for pivoting rotation about axis 15. Mounting post ring 41*b* is fixed against rotation with mounting post 41 by a key 41*c* being inserted in a key slots 41*d*, 41*e* of the mounting post ring 41*b* and mounting post 41, respectively. Mounting post ring 41*b* includes finger holes 41*f* each configured to receive a clutch finger 177*a* of the clutch spindle 177. Finger holes 41*f* of mounting post ring 41*b* are illustratively arranged in corresponding radial position to holes 175*b* of actuator lever 175*a*. When clutch fingers 177*a* are selectively inserted through each of finger holes 41*f* and holes 175*b*, mounting post ring 41*b* is fixed against rotation relative to actuator lever 175*a***.

Spindle housing 179 defines a recess **179*b* configured to receive clutch spindle 177 for limited rotation therein as suggested in FIG. 4D. Spindle housing 179 includes tracks 179*c* for receiving screws 179*d* therethrough for connection to clutch spindle 177. Screws 179*d* are illustratively arranged to insert into clutch spindle 177 at opposite radial positions about 180 degrees from each other, each through tracks 179*c* to connect clutch spindle 177 to spindle housing 179 with limited relative rotation therebetween to prevent binding during pivoting movement of spindle housing 179 about a post 179*e***.

Spindle housing 179 is mounted on one end to post **179*e* that is vertically mounted on the respective tower 28, 29 for pivoting movement about axis 115 as shown in FIG. 4D. Spindle housing 179 includes a handle 179*f* extending from another end and extending through a plate 181 of the respective tower 28, 29 for selective operation by a user. Plate 181 defines a guide track 181*a* having a first track position 181*b* and a second track position 181*c* as suggested in FIG. 4D. Spindle housing 179 includes a biasing member 183 configured to bias spindle housing 179 and clutch spindle 177 such that clutch fingers 177*a* are inserted into corresponding ones of holes 41*f*, 175*b* to fixed relative rotation of (rotationally-lock) actuator lever 175*a* and mounting post ring 41*b* about axis 15 and thus fix relative rotation between mounting post 41 and the actuator lever 175*a* about axis 15 such that the actuator 173 provides controlled rotational positioning of mounting post 41**.

When the handle **179*f* is arranged in the first track position 181*b*, the biasing member 183 is extended to bias spindle housing 179 to pivot about axis 115 such that the clutch spindle 177 is in an engaged position such that the clutch fingers 177*a* are inserted into the finger holes 41*f* and corresponding holes 175*b* such that rotation of the mounting post 41 is controlled by actuator 173. When the handle 179*f* is arranged in the second track position 181*c*, the biasing member 183 is compressed and spindle housing 179 is pivoted about axis 115 such that clutch spindle 177 is in a disengaged position such that the clutch fingers 177*a* are not inserted into finger holes 41*f* of mounting post ring 41*b* and mounting post 41 is free to rotate relative to actuator lever 175*a*. In the illustrative embodiment, clutch spindle 177 includes four clutch fingers 177*a*; and clutch fingers 177*a*, finger holes 41*f*, and holes 175*b* are each disposed at equal radial distance from axis 15 and at equal circumferential spacing from each other such that finger holes 41*f* align with holes 175*b* and clutch fingers 177*a* at each 90 degree interval of rotation of mounting post 41 relative to actuator lever 175*a*. Such arrangement permits mounting post 41, and thus connection bar 21 and main brackets 14, 16, to be locked for controlled powered rotation by actuator 17** embodied as a linear actuator.

Handles 133 and long handles 141, 143 are configured to be easily gripped by a user to perform the manual rotation. In the illustrative embodiment, the limited powered rotation is embodied to be about plus and minus 25 degrees of tilt, but in some embodiments is any amount of powered rotation. In some embodiments, the mounting post 41 are configured for powered rotation of plus and minus 90 degrees and or more.

As described above, patient support 18 is configured for pinned connection to the extension brackets 35 and patient support 42 is configured for pinned connection to the first and second bracket rails 20, 22. In some embodiments, patient supports 18, 42 may each be configured for selective pinned connection to both extension brackets 35 and first and second bracket rails 20, 22, for example, pin tubes 39, 53 and the distance between corresponding holes **20*a*, 49 may be arranged to corresponding such that each pin tube 39, 53 can be selectively pinned to any corresponding holes 20*a*, 49 by one connection pin 61**.

In another embodiment of the present disclosure, in place of main brackets 14, 16, the patient support system 10 respectively includes main brackets 214, 216 as shown in FIGS. 5A-9B. Main brackets 214, 216 are configured for use in patient support system 10 in lieu of main brackets 14, 16. Main brackets 214, 216 connect to tower base 12 and respectively to patient support tops 18, 42.

Figure 5A:
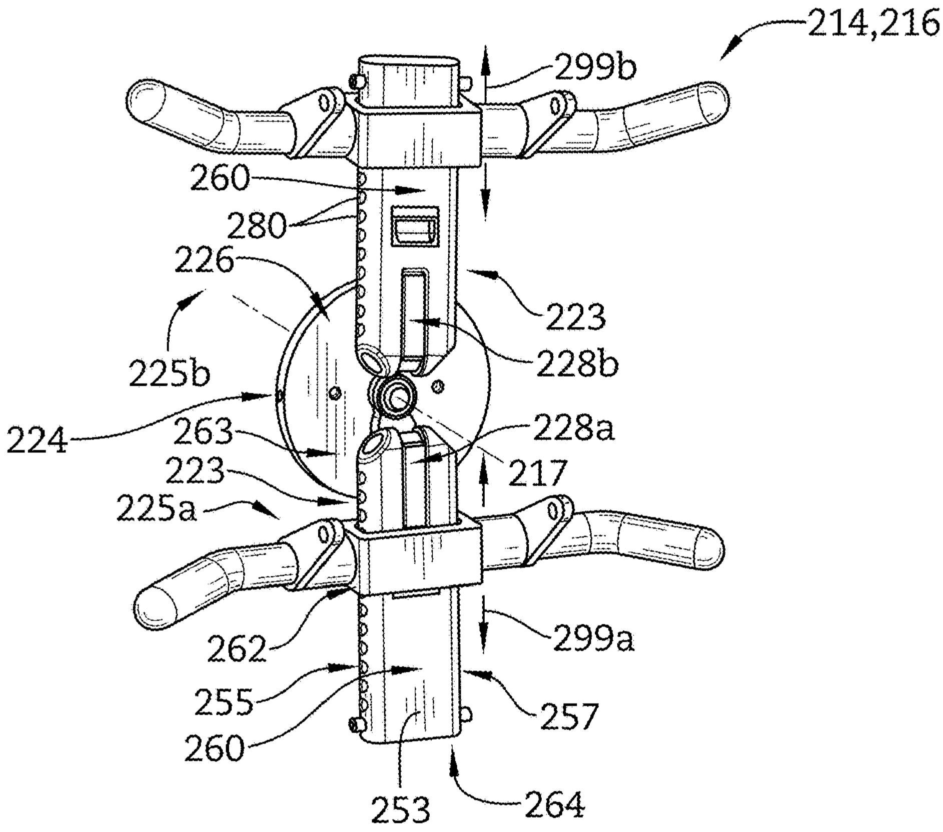
FIG. 5A is a perspective view of another illustrative main bracket for use with the surgical patient support system of FIG. 1 showing that the main bracket includes a rotor and a pair of adjustment supports each including a vertically oriented slide body and a slide brace having handles, and each adjustment support is configured to connect to one of the first and second patient support tops.
Figure 5B:
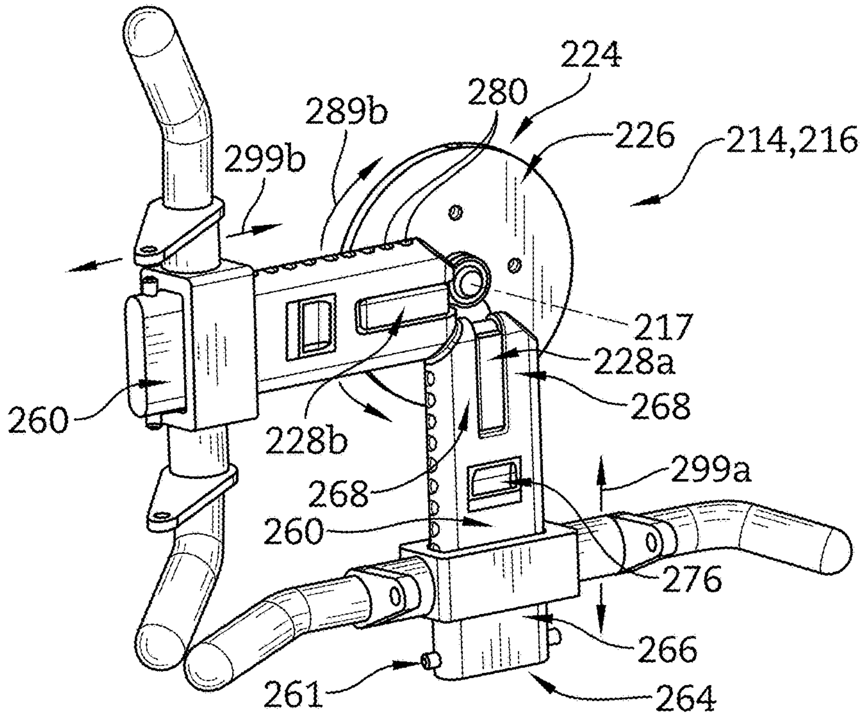
FIG. 5B is a perspective view of the main bracket of the surgical patient support system of FIG. 5A showing that the adjustment support previously positioned at the 12 o'clock position shown in FIG. 5A has been selectively rotated to the 9 o'clock position and showing that the adjustment support positioned at the 6 o'clock position has had its slide brace selectively adjusted to a new radial position from a previous radial position shown in FIG. 5A.

Main brackets 214, 216 are configured to provide angular and radial position adjustment of the patient support tops 18, 42, as shown in FIGS. 5A and 5B. Each main bracket 214, 216 includes a rotor 224 and adjustment supports **225*a*, 225*b*. Main brackets 214, 216 connect patient support tops 18, 42 to tower base 12 to provide selective adjustment of the angular and radial position of each patient support top 18, 42 about axis 15**.

Figure 6:
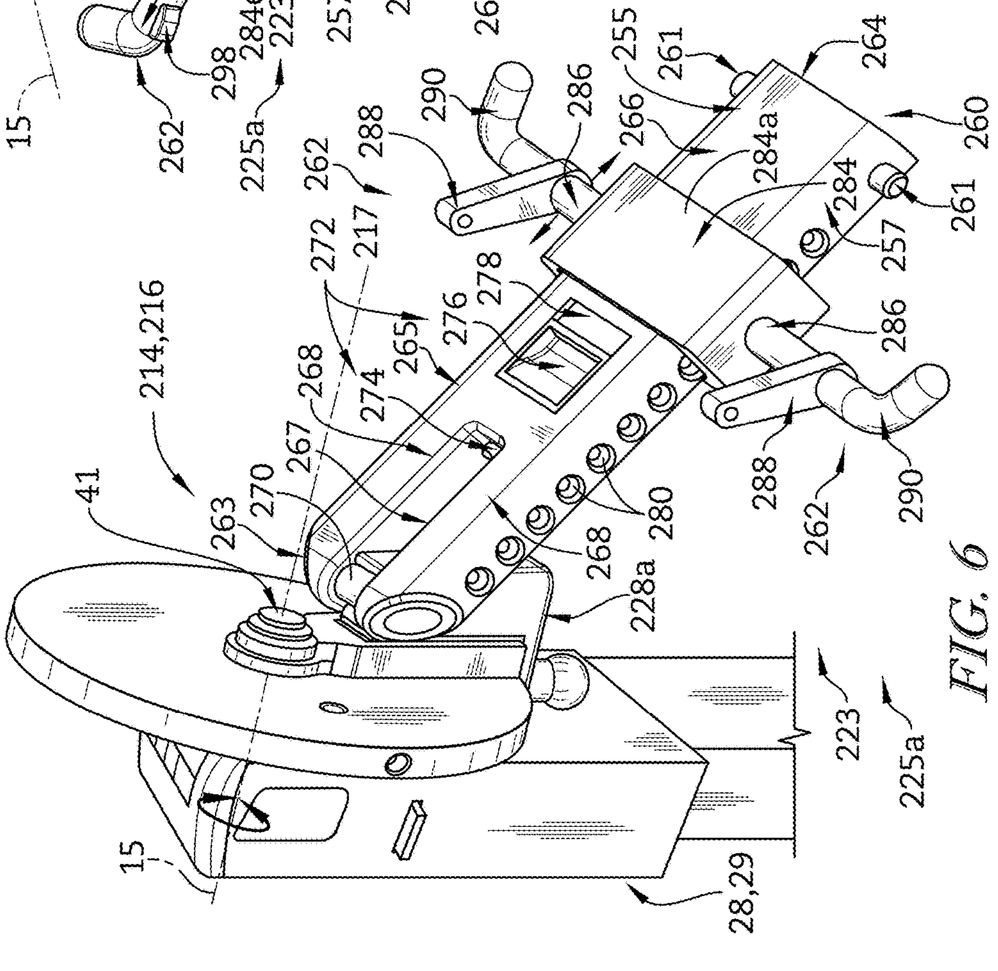
FIG. 6 is a perspective view of the main bracket of FIGS. 5A and 5B includes an attachment assembly that has been unlocked and showing that one of the adjustment supports has been pivoted away from the rotor.

Each rotor 224 of main brackets 214, 216 is configured to connect to the mounting post 41 of one of the elevator towers 28, 29, without any connection bar 21 as shown in FIG. 6. In the illustrative embodiment as shown in FIGS. 5A and 5B, head end adjustment supports 225*a*, 225*b* are mounted to the rotor 224 of main bracket 214, and foot end adjustment supports 225*a*, 225*b* are mounted to the rotor 224 of the other main bracket 216. In the illustrative embodiment, adjustment supports 225*a* of each of main brackets 214, 216 correspond to and are configured to connect to patient support top 18; and the other adjustment supports 225*b* of each of the main brackets 214, 216 correspond to and are configured to connect to patient support top 42 to provide selective adjustment of the angular and radial position of each patient support top 18, 42 about an axis 217 illustratively defined through the center of rotor 224 as shown in FIGS. 5A and 5B.

A user can selectively change the radial position of either of patient support tops 18, 42 relative to axis 217 as suggested by arrows 299*a*, 299*b* shown in FIGS. 5A and 5B. For example, a user can change the radial position of patient support top 18 by unlocking the position setting system 282 of each of the adjustment supports 225*a* of each main bracket 214, 216; adjusting the radial position of those adjustment supports 225*a* of each of main bracket 214, 216 to a new radial position relative to axis 217; and locking position setting systems 282 of adjustment supports 225*a* of each main bracket 214, 216 at the new radial position. In the illustrative embodiment, each adjustment support 225*a*, 225*b* at either one of the head end 30 or foot end 34 are configured for independent radial adjustment without adjustment of the radial position of the adjustment supports 225*a*, 225*b* at the other one of the head end 30 or foot end 34.

Figure 7:
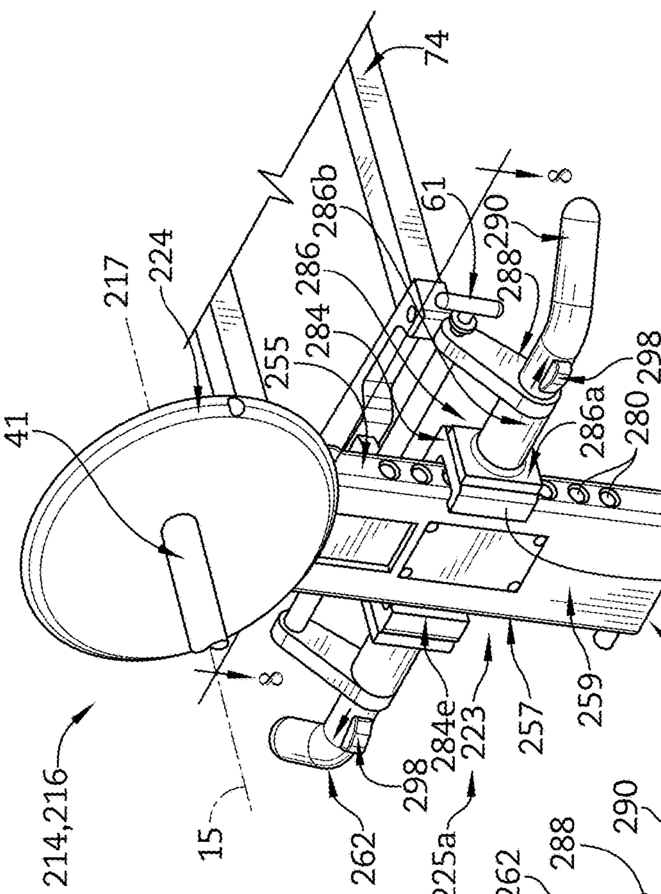
FIG. 7 is a rear perspective view of the main bracket of FIGS. 5A-6 showing that the slide brace of one of the adjustment supports includes a position setting system for engaging position depressions of the slide body of the same adjustment support to lock the position of the slide brace relative to the slide body and showing that the slide brace includes a pair of support flanges pinned to the first patient support top.

Adjustment supports 225*a*, 225*b* are configured to permit user selectable adjustment of the radial position of the patient support tops 18, 42 relative to axis 217 without requiring removal of connection pin 61 as suggested in FIG. 7. Adjustment of the radial position of the patient support tops 18, 42 without removal of the connection pin 61 permits controlled radial adjustment of patient support tops 18, 42 without disconnection of the patient support tops 18, 42 from elevator towers 28, 29.

Each adjustment support 225*a*, 225*b* includes a slide bar 223 having a slide body 260 and a slide brace 262 engaged with slide body 260 and configured for selectable positioning relative to slide body 260 as suggested in FIGS. 5A and 5B. Each slide body 260 includes first and second ends 263, 264, a front side 253, lateral sides 255, 257, and a back side 259 as shown in FIGS. 6 and 7. Each slide body 260 is configured to be secured at its first end 263 to the one of the rotors 224.

Each slide body 260 includes a main body 266 and connection arms 268 as shown in FIGS. 5A, 5B, and 8. Each main body 266 extends from second end 264 of slide body 260 towards the first end 263 of slide body 260 to a release end 265 of main body 266. Connections arms 268 extend from release end 265 of their main body 266 towards first end 263 of their main body 266. Connection arms 268 extend from the main body 266 parallel to each other and in spaced apart relation to define a gap 267 therebetween. Each slide body 260 includes a connection member 270, illustratively embodied as a shaft, connected to its connection arms 268 and configured for attachment to rotor 224.

Each slide body 260 includes position depressions 280 distributed along lateral sides 255, 257 thereof as shown in FIGS. 6 and 7. Position depressions 280 are illustratively embodied as circular holes defined in opposing lateral sides 255, 257 of slide body 260 and configured for engagement with the position setting system 282 of the attachment supports 225*a*, 225*b*. Position depressions 280 on either lateral side 255, 257 are illustratively disposed at equally spaced apart intervals from each other, but in some embodiments are disposed at varying intervals, for example, graduated intervals. In some embodiments, position depressions 280 may have any shape and/or size complimentary to the position setting system 282 to permit selective locking of the position of the slide brace 262 relative to the slide body 260. Each slide body 260 includes stop posts 261 projecting perpendicularly outward from either lateral side 255, 257 on second end 264 to prevent disengagement of the slide brace 262 from the slide body 260 on the second end 264.

Figure 8A:
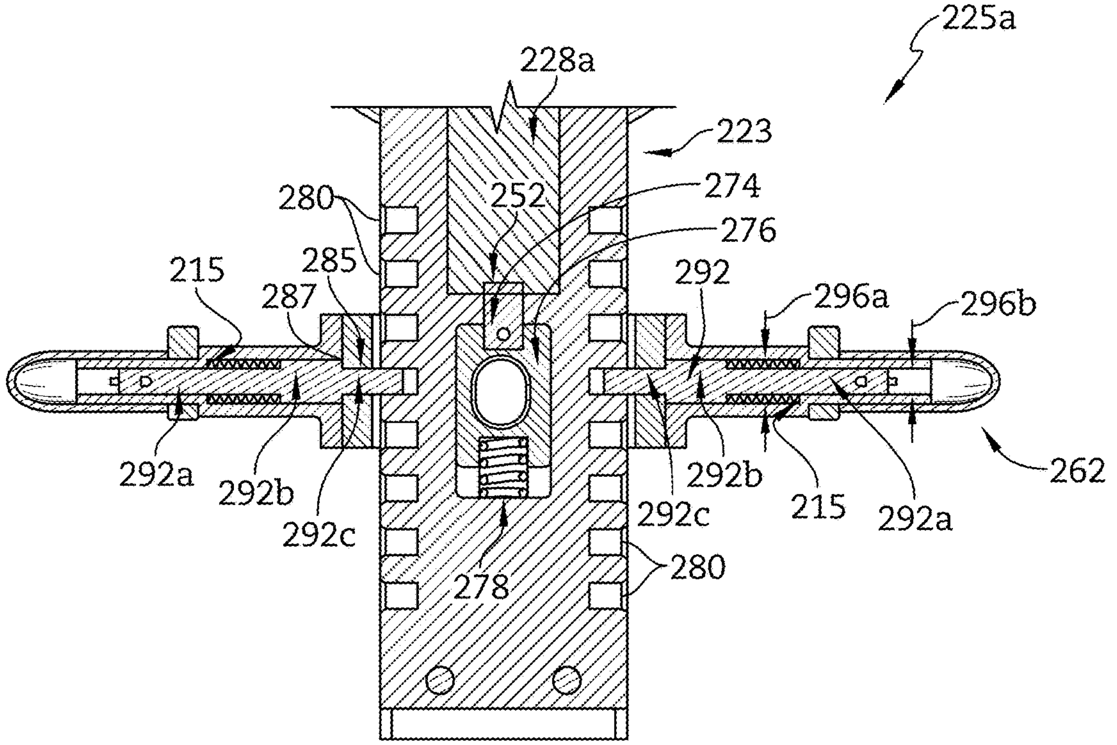
FIG. 8A is cross-sectional view of one of the adjustment supports of the main bracket taken along the line 8-8 of FIG. 7 showing that the position setting system includes horizontal movable pins that are each arranged in a locked position within a position depression of the slide body to lock the position of the slide brace in position relative to the slide body.
Figure 8B:
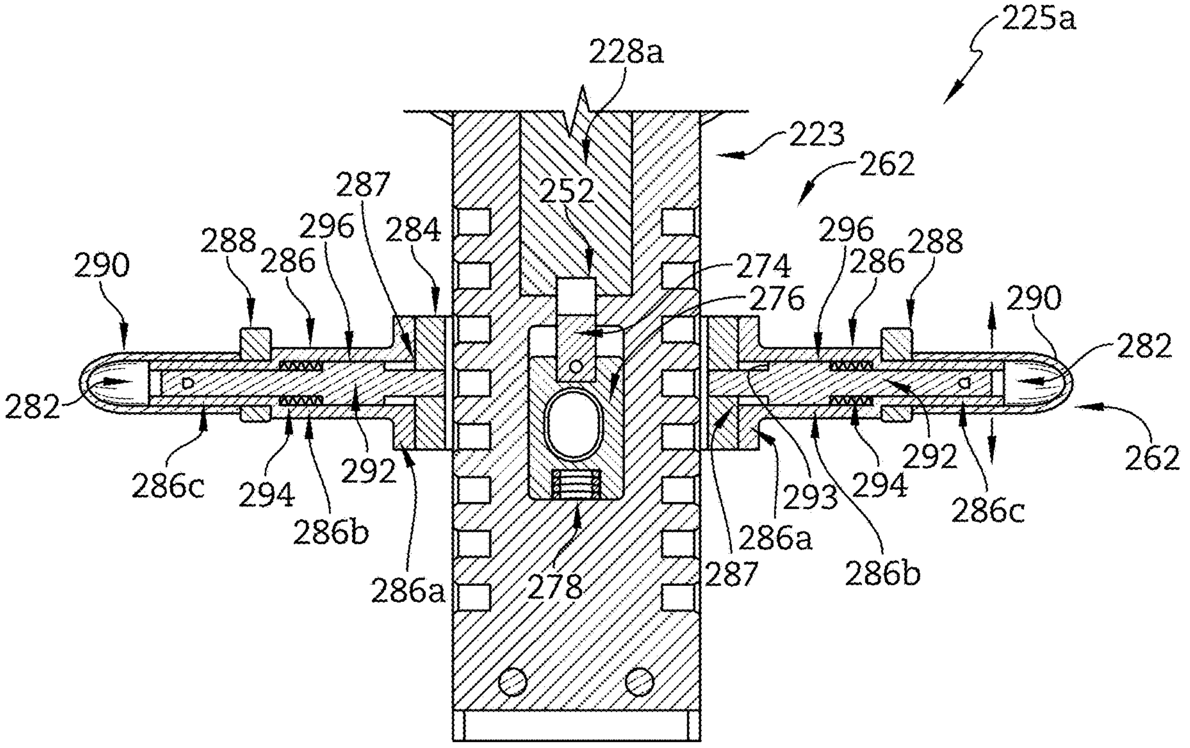
FIG. 8B is cross-sectional view, similar to FIG. 8A, of the one adjustment support of the main bracket taken along the line 8-8 of FIG. 7 showing that the pins of the position setting system have been moved out of the position depressions to an unlocked position to unlock the position of the slide brace relative to the slide body.

Each slide brace 262 includes one position setting system 282 for selectively locking the position of slide brace 262 along the slide body 260 by engagement of position setting system 282 with position depressions 280 as shown in FIGS. 7, 8A, and 8B. Each slide brace 262 includes a brace body 284, extension housings 286, support flanges 288, and handles 290. Brace body 284 engages its corresponding slide body 260 for selective radial positioning.

Each brace body 284 is configured to extend around its slide body 260 as shown in FIG. 7. Brace body 284 is illustratively embodied to have a C-shape when viewed in a radial direction with respect to axis 217. Brace body 284 includes front portion 284*a*, side portions 284*b*, 284*c*, and back portions 284*c*, 284*f*, each disposed to extend across the respective front 253, sides 255, 257, and back 259 of the slide body 260 as shown in FIGS. 6 and 7. Side portions 284*b*, 284*c* each include a bore 285 penetrating therethrough and configured for selective alignment with position depressions 280 on corresponding lateral sides 255, 257 of slide body 260 to permit engagement of position setting system 282 with position depressions 280 as shown in FIGS. 8A and 8B. Each side portion 284*b*, 284*c* is configured to connect to one of the extension housings 286.

Extension housings 286 each includes a base 286*a*, a main body 286*b*, and an extension body 286*c* as shown in FIGS. 7, 8A, and 8B. Base 286*a* illustratively connects to one of the side portions 284*b*, 284*c* of one of the brace bodies 284. Base 286*a* is illustratively embodied as a plate having an opening 287 defined therein.

Each main body 286*b* has a first end connected to its base 286*a* as shown in FIGS. 8A and 8B. Main body 286*b* extends from base 286*a* in a direction away from the brace body 284 to connect with extension body 286*c* on the other end positioned away from the base 286*a*. Main body 286*b* is illustratively embodied as a cylinder having a first outer diameter.

Each extension body 286*c* is connected to its main body 286*b* and extends from the main body 286*b* in a direction away from the brace body 284 as shown in FIGS. 8A and 8B. Extension body 286*c* extends parallel to its main body 286*b* in a direction away from brace body 284. In the illustrative embodiment, extension body 286*c* is a cylinder having a second outer diameter, smaller than the first outer diameter of main body 286*b*, and extending coaxial with the main body 286*b*. Each extension housing 286 includes a cavity 296 defined therein and extending through each of base 286*a*, main body 286*b*, and extension body 286*c*.

Cavities 296 of extension housings 286 of each adjustment support 225*a*, 225*b* are configured to house the position setting system 282. Each cavity 296 is illustratively embodied as a cylindrical cavity extending through a center of extension housing 286 from the interface between base 286*a* and its connected side portion 284*b*, 284*c* in a direction away from the brace body 284. Each cavity 296 is illustratively defined by a first cavity diameter 296*a* defined within each of base 286*a* and main body 286*b*, and a second cavity diameter 296*b* defined within extension body 286*c* as shown in FIG. 8A. At the interface between the first and second cavity diameters 296*a*, 296*b*, a step 215 is defined by the interior of the extension housing 286 to support operation of position setting system 282 as shown in FIGS. 8A and 8B. In the illustrative embodiment, steps 215 are embodied as an interior circumferential flat surface facing toward base 286*a* and configured to engage with position setting system 282. Each adjustment support 225*a*, 225*b* includes a position setting system 282.

Each position setting system 282 is configured for selective engagement with position depressions 280 of its corresponding slide bar 223 to provide selective locking of the position of slide brace 262 relative to slide body 260 as shown in FIGS. 8A and 8B. Position setting system 282 includes position setting pins 292 and return devices 294. Position setting pins 292 are arranged within cavity 296 of the extension housings 186 in engagement with return devices 294 for resilient positioning of the pins 292 between an engaged position (FIG. 8A) and a disengaged position (FIG. 8B).

Position setting pins 292 of each position setting system 282 are illustratively embodied as elongated cylindrical pins having an outer portion 292*a*, a center portion 292*b*, and the engagement portion 292*c* as shown in FIG. 8A. Each outer portion 292*a* illustratively includes a diameter corresponding to the second cavity diameter 296*b* of the corresponding extension body 286*c* and configured for sliding engagement with interior portions of the extension body 286*c* which define the cavity 296*b* as suggested in FIGS. 8A and 8B. Each center portion 292*b* illustratively includes a diameter corresponding to the first cavity diameter 296*a* of the corresponding main body 286*b* and configured for sliding engagement with interior portions of base 286*a* and main body 286*b* which define cavity 296 as suggested in FIGS. 8A and 8B. Each center portion 292*b* includes a lateral face 293 configured for engagement with an outer surface of the corresponding side portion 284*b*, 284*c* in the engaged position as shown in FIG. 8A. Each engagement portion 292*c* illustratively includes a diameter corresponding to a diameter of bore 285 of corresponding side portions 284*b*, 284*c* and configured for sliding engagement with interior portions of side portions 284*b*, 284*c* which define bore 285 as suggested in FIGS. 8A and 8B.

Return devices 294 are configured to engage their respective position setting pins 292 to provide resilient return force as suggested in FIGS. 8A and 8B. Each return device 294 is illustratively embodied as a mechanical spring that encircles the outer portion 292*a* of different ones of the pins 292. Each return device 294 is illustratively engaged with step 215 of the corresponding extension housing 286 and is engaged with the respective center portion 292*b* of the respective pin 292 to provide spring loaded return of the pins 292 to their engaged positions. In some embodiments, return devices may include any one or more of resilient material, gas spring, and/or any other device suitable for returning pins 292 to their engaged positions. In some embodiments, return devices 294 may be omitted in favor of user driven manual return of pins 292 to their engaged positions.

In the engaged position, engagement portions 292*c* of pins 292 are inserted into one of the position depressions 280 of the slide bar 223 to lock movement of the slide brace 262 relative to the slide bar 223 as shown in FIG. 8A. In the disengaged position, engagement portions 292*c* of pins 292 are positioned outside of position depressions 280 to unlock movement of the slide brace 262 relative to the slide bar 223 as shown in FIG. 8B. For a user to perform such relative movement of a slide brace 262, both pins 292 of the respective slide brace 262 must be maintained in their disengaged position.

Each position setting pin 292 is connected to a trigger 298, shown in FIG. 7, that extends through its respective handle 290 for user driven operation. A user can illustratively operate triggers 298 to change the position of the pins 292, for example, against the return force of return devices 294 to disengage the pins 292.

In the illustrative embodiment, a user can selectively operate the position setting system 282 to unlock the adjustment supports 225*a*, 225*b* as suggested in FIGS. 6-8B. A user moves triggers 298 of the same slide brace 262 in a direction away from slide bar 360 which moves position setting pins 292 out of engagement with position depressions 280 against the force of return devices 294. The user can selectively move the slide brace 262 relative to slide body 260 into a different radial position relative to axis 217. Once a radial position is selected, the user can release the triggers 298 to permit position setting pins 292 to be forced by return devices 294 back into engagement with position depressions 280 corresponding to the radial position, locking the position of the slide brace 262 relative to the slide body 260. The user can perform radial positioning of slide brace 262 relative to slide body 260 while a patient support top 18, 42 is connected to support flanges 288 to provide radial adjustment of the patient support top 18, 42 relative to axis 217.

Returning to the illustrative embodiment shown in FIGS. 5A and 5B, a user can selectively change the angular position of any patient support top 18, 42 about axis 217 as suggested by arrows 289*b*. For example, a user can change the angular position of patient support top 18 by unlocking rotors 224 of each main bracket 214, 216, adjusting the angular position of the adjustment supports (rotating about axis 217) of each of main bracket 214, 216 to a different angular position, and locking the rotors 224 of each main bracket 214, 216.

Figure 9A:
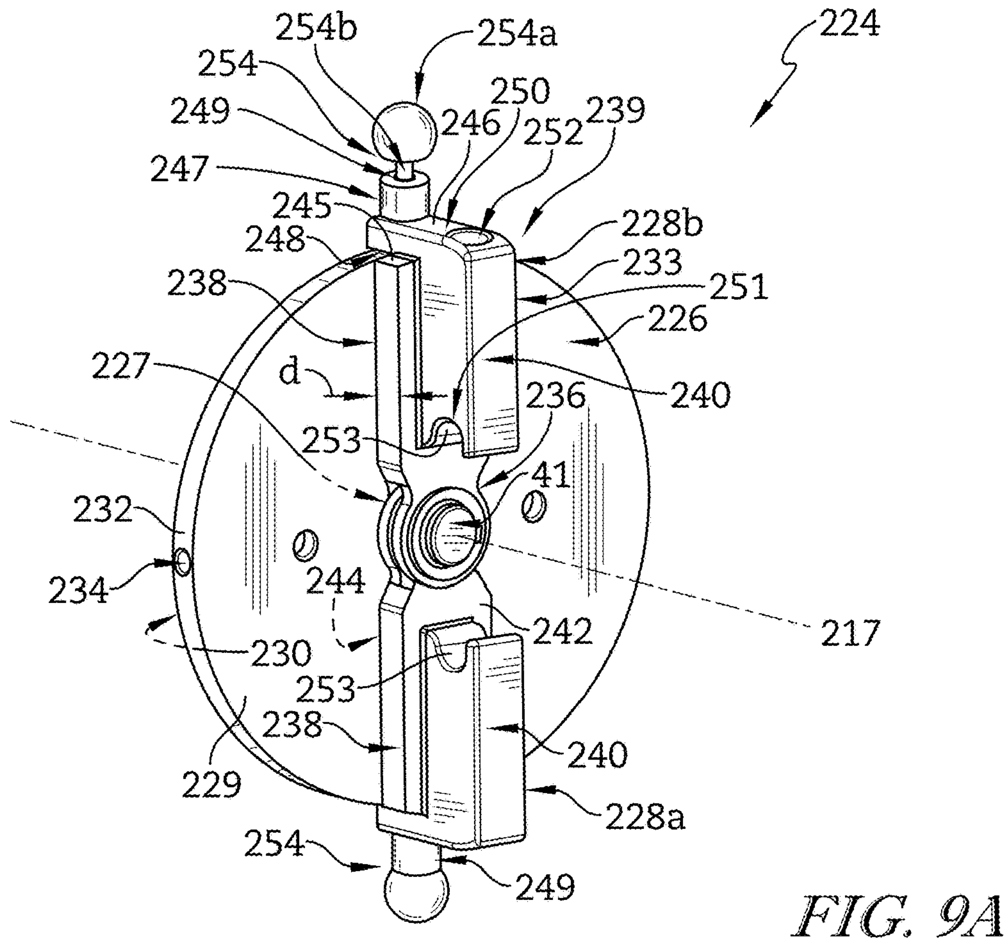
FIG. 9A is a perspective view of a rotor of the adjustment support of the main bracket of FIGS. 5A-8B showing that the rotor includes a circular rotor body and a pair of bar mounts mounted to the rotor body for rotation about a horizontal central axis of the rotor and that each bar mount includes an engagement rod, and showing that the engagement rod of the bar mount presently arranged at the 12 o'clock position is in a disengaged position to selective unlock the bar mount for rotation around the central axis relative to the rotor body.
Figure 9B:
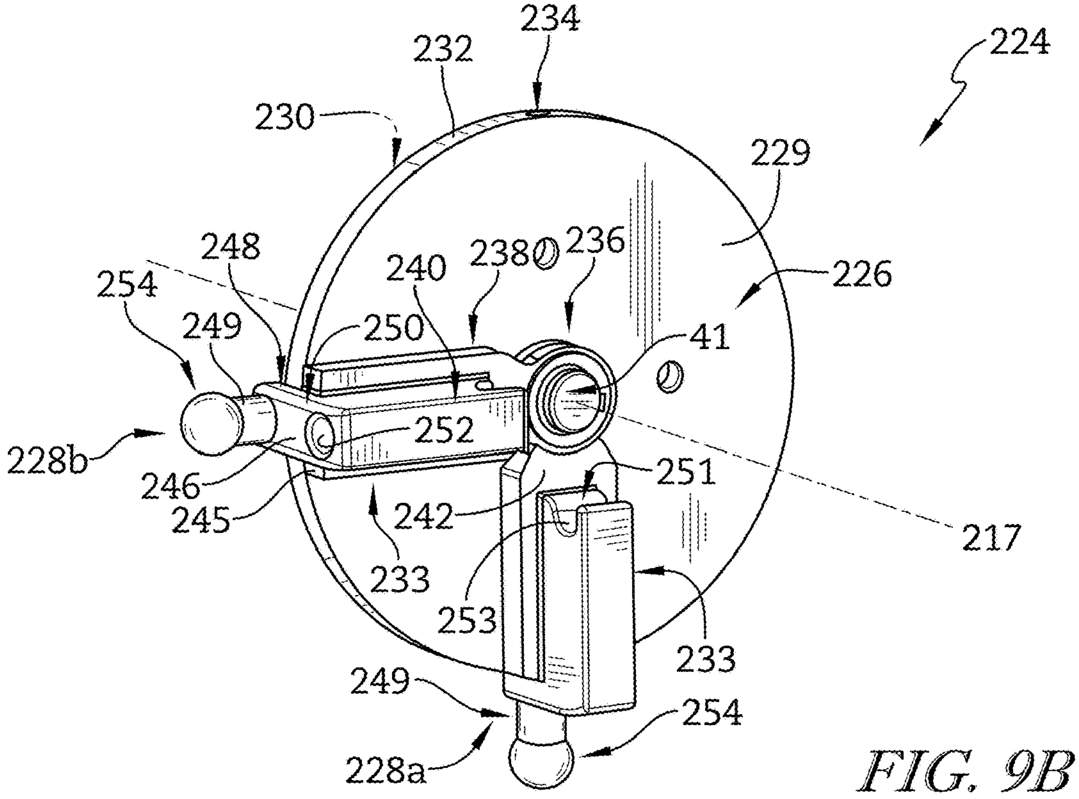
FIG. 9B is a perspective view of the rotor of the adjustment support of the main bracket of FIG. 9A showing that one of the bar mounts that was formerly arranged at the 12 o'clock position shown in FIG. 9A has been selectively rotated about the central axis to the 9 o'clock position, and showing that the engagement rod of the bar mount rotated to the 9 o'clock position has been moved into the engaged position to selectively lock the angular position of the bar mount relative to the rotor body.

Each rotor 224 is connected and rotationally fixed with the mounting post 41 of one of the elevator towers 28, 29 such that axis 15 and axis 217 are aligned as coaxial when mounting posts 41 of each elevator tower 28, 29 are configured at the same elevation above the floor as suggested in FIG. 6. Each rotor 224 includes a rotor body 226 and bar mounts 228*a*, 228*b* configured for selective angular positioning relative to body 226 as shown in FIGS. 5A, 5B, 9A, and 9B. Bar mounts 228*a*, 228*b* are each configured to mount onto rotor body 226 and to connect to one of the patient support tops 18, 42 as shown in FIGS. 9A and 9B. Selective movement of bar mounts 228*a*, 228*b* causes commensurate movement of the connected patient support tops 18, 42 as explained below.

Each rotor body 226 is illustratively embodied as a circular flat disk having a center hole 227 configured to receive the mounting post 41 of one elevator tower 28, 29 as suggested in FIGS. 9A and 9B. Each rotor body 226 defines a front surface 229, a back surface 230, and a circumferential surface 232. Circumferential surface 232 includes depressions 234 defined therein. Depressions 234 are illustratively disposed evenly at 90 degree angular intervals relative to each other on circumferential surface 232, but in some embodiment are disposed at 45 degree intervals and/or are disposed at uneven intervals, for example, graduated intervals decreasing in spacing with decreasing distance from the 6 o'clock position. Depressions 234 are each configured to receive an engagement rod 254, shown in FIG. 9A, of bar mounts 228*a*, 228*b* therein for selective locking of the angular position of bar mounts 228*a*, 228*b* relative their to rotor body 226.

First bar mount 228*a* is illustratively arranged at the 6 o'clock position and second bar mount 228*b* is arranged at the 12 o'clock position as shown in FIG. 9A. Bar mounts 228*a*, 228*b* can be selectively unlocked from the rotor 224 and adjusted in angular position around axis 217. For example, second bar mount 228*b* can be disengaged from the rotor body 226 and rearranged in the 9 o'clock position as shown in FIG. 9B. This permits selectable arrangement of the position of the patient support tops 18, 42 to support surgical site access to a patient's body.

Each bar mount 228*a*, 228*b* is configured to rotatably mount onto the rotor body 226 by connection with the respective mounting post 41 while inserted into the center hole 227 as shown in FIGS. 9A and 9B. Each bar mount 228*a*, 228*b* includes a mount body 233 and a connection head 236. Each mount body 233 includes a first body section 238 and a second body section 240.

First body section 238 of each bar mount 228*a*, 228*b* is illustratively embodied as a plate having a front side 242, a back side 244, and a radially outer surface 245 as shown in FIGS. 9A and 9B. First body section 238 illustratively defines a thickness d between the front side 242 and the back side 244. First body section 238 is illustratively arranged to extend radially between mounting post 41 and circumferential surface 232.

Each connection head 236 connects its bar mount 228*a*, 228*b* to the respective mounting post 41 as shown in FIGS. 9A and 9B. In the illustrative embodiment, connection heads 236 are embodied to have a thickness half d/2, and each connection head 236 is embodied to be offset from a symmetric center of first body section 238 along the direction of axis 217. In the illustrative embodiment, the connection head 236 of bar mount 228*a* is offset in direction closer to rotor 224 and the connection head of bar mount 228*b* of the same rotor 224 is offset farther from the rotor 224 such that both connection heads are stacked on the mounting post 41 to have a combined width equal to with d of first body section 238.

Second body section 240 of each bar mount 228*a*, 228*b* is connected to and extends from the front side 242 of first body section 238 as shown in FIGS. 9A and 9B. In the illustrative embodiment, second body section 240 extends from near the connection head 236 of first body section 238 radially outward to a radially outward end 239 arranged at a position about radially equal to the circumferential surface 232 of the rotor 224 and about radially equal to the radially outer surface 245 of first body section as shown in FIGS. 9A and 9B. Each second body section 240 includes a flange 250 and defines a cradle 251.

Each flange 250 extends perpendicularly from the outward end 239 of the second body section 240 parallel to axis 217 and in a direction towards the back surface 230 of the rotor 224 as shown in FIG. 9A. Flange 250 of each bar mount 228*a*, 228*b* defines a radial surface 246 that is radially outward from the second body section 240 and a radially inward surface 248. In the illustrative embodiment, at least a portion of radially inward surface 248 of flange 250 is connected to radially outer surface 245 of first body section 238 as shown in FIGS. 9A and 9B. Flange 250 illustratively extends from the second body section 240 across the first body section 138 and across the circumferential surface 232 of the rotor 224 as shown in FIGS. 9A and 9B.

Each flange 250 includes a rod receiver 247 and an engagement rod 254 slidably mounted within the receiver 247 as shown in FIGS. 9A and 9B. Rod receiver 247 illustratively extends in a radially outward direction from radial surface 246 at a position along axis 217 corresponding to the circumferential surface 232. Flange 250 and receiver 247 together define a rod bore 249 that continuously extends radially outward from inward surface 248 and penetrates through rod receiver 247. Rod bore 249 is configured to slidably receive engagement rod 254.

Each engagement rod 254 is configured for selective engagement with depressions 234 to selectively lock the angular position of the respective bar mount 228*a*, 228*b* relative to its rotor 224. Engagement rod 254 of each flange 250 includes a rod head 254*a* and rod 254*b* extending from rod head 254*a* as shown in FIG. 9A. Rod head 254*a* is illustratively spherical and rod 254*b* is illustratively cylindrical, but in some embodiments, rod head 254*a* and rod 254*b* may each have any shape suitable for selective engagement of engagement rod 254 with depressions 234 to selectively lock the angular position of the respective bar mount 228*a*, 228*b* relative to its rotor 224.

Each engagement rod 254 is slidable between an engaged position (FIG. 8B) in which the engagement rod 254 is inserted into one of the depressions 234 of the corresponding rotor 224, and a disengaged position (FIG. 8A) in which the engagement rod 254 is retracted out of the depressions 234 of the corresponding rotor 224 to provide selectable locking of the bar mounts 228*a*, 228*b* relative to the rotor body 226. When the engagement rod 254 of one of the bar mounts 228*a*, 228*b* is in the engaged position, the corresponding bar mount 228*a*, 228*b* is fixed against rotation relative to the rotor body 226. When the engagement rod 254 of one of the bar mounts 228*a*, 228*b* is in the disengaged position, the corresponding bar mount 228*a*, 228*b* can rotate relative to the rotor body 226. Engagement rods 254 are biased toward the engaged position by a suitable biasing member such as a spring located inside receiver 247.

In the illustrative embodiment as shown in FIG. 9B, each flange 250 includes an opening 252 configured to receive attachment rods 274 of slide bars 223 to secure the one of the slide bars 223 to the rotor 224. Opening 252 illustratively extends radially inward toward axis 217 from radially outward surface 246 of its flange 250. Opening 252 is illustratively positioned on the radially outward surface 246 in a location away from rod receiver 247 in the direction of axis 217. Opening 252 is arranged with a corresponding position along axis 217 to that of cradle 251 on opposite radial ends of second body section 240 to secure the corresponding slide bar 223 to the rotor 224.

Each cradle 251 is defined by a radially inward surface 253 of its second body section 240 and is configured to receive connection member 270 of one slide bar 223 as shown in FIGS. 5A-6, 8, 9A, and 9B. Cradle 251 is illustratively embodied as a concave cylindrical surface that extends perpendicular to the axis 217 and parallel to the front side 242 of first body section 238 as shown in FIGS. 9A and 9B. Cradle 251 is illustratively complimentary in shape and size to connection member 270 of adjustment supports 225*a*, 225*b*. Cradle 251 and opening 252 of each bar mount 228*a*, 228*b* together function to secure one of the adjustment supports 225*a*, 225*b* to the rotor 224 through their respective engagements with connection member 270 and attachment rod 274 of one of the adjustment supports 225*a*, 225*b*.

Returning now to the illustrative embodiment as shown in FIG. 6, adjustment supports 225*a*, 225*b* each include one connection member 270 and one attachment assembly 272. Connection member 270 of each adjustment support 225*a*, 225*b* extends through gap 267 and connects to each of connections arms 268 of the same slide body 260 at the first end 263 thereof. Connection member 270 is illustratively embodied as a cylinder extending from one connection arm 268 to the other of the same slide body 260. Each connection member 270 is illustratively shaped and sized complimentary to cradle 251. Each connection member 270 is configured to secure its slide body 260 to a bar mount 228*a*, 228*b* by seating within cradle 251 of the bar mount 228*a*, 228*b* and in combination with engagement of its attachment assembly 272 with the bar mount 228*a*, 228*b* as suggested in FIG. 6.

Attachment assembly 272 of each adjustment support 225*a*, 225*b* includes attachment rod 274 and a release button 276 as shown in FIG. 8. Each attachment assembly 272 is configured to secure its respective adjustment support 225*a*, 225*b* to bar mounts 228*a*, 228*b*. Each attachment rod 274 illustratively extends from the release end 265 of main body 266 between connection arms 268 towards first end 263 of slide body 260 of its respective adjustment support 225*a*, 225*b*.

Each attachment rod 274 is configured for slidable movement between a retracted position (FIG. 8B) and an extended position (FIG. 8A). In the extended position as suggested in FIG. 8A, attachment rod 274 projects from its slide body 260 into gap 267 for penetration into opening 252 of one of the bar mounts 228*a*, 228*b* to secure its adjustment support 225*a*, 225*b* thereto. In the retracted position as suggested in FIG. 8B, attachment rod 274 is arranged within slide body 260 and does not penetrate into the opening 252 of the bar mount 228*a*, 228*b* such that the slide bar 223 can be pivoted out of engagement with the bar mount 228*a*, 228*b* as suggested in FIG. 6. Release button 276 is connected to the attachment rod 274 and configured for selectable movement by a user between engaged (FIG. 8A) and disengaged (FIG. 8B) positions to operate the attachment rod 274 between its extended and retracted positions, respectively. Each release button 276 is illustratively received within a cavity 278 of the main body 166 of its slide bar 223 and configured for user interface operation. Button 276 and attachment rod 274 of each attachment assembly 272 are biased toward their respective engaged and extended positions by a suitable biasing member such as a spring located in cavity 278.

In another aspect of the present disclosure, in place of main brackets 14, 16, and main brackets 214, 216, the patient support system 10 includes main brackets 314, 316 as shown in FIGS. 10A and 10B. Main brackets 314, 316 are configured for use in patient support system 10 and are similar to main brackets 214, 216 as shown in FIGS. 5A-9B and described herein. Accordingly, similar reference numbers in the 300 series indicate features that are common between main brackets 214, 216 and main brackets 314, 316 unless indicated otherwise. The description of main brackets 214, 216 is equally applicable to main brackets 314, 316 except in instances when it conflicts with the specific description and drawings of main brackets 314, 316.

Each main bracket 314, 316 connects to tower base 12 by one mounting posts 41 of one of the elevator towers 28, 29 to align axes 15 and 317 when the mounting posts 41 of each elevator tower 28, 29 are configured at the same elevation above the floor. Main brackets 314, 316 connect respectively to patient support tops 18, 42 by support flanges 388. Main brackets 314, 316 are configured to provide angular and radial position adjustment of the patient support tops 18, 42.

Main brackets 314, 316 each include rotors 324 and adjustment supports 325*a*, 325*b* as shown in FIGS. 10A and 10B. Adjustment supports 325*a*, 325*b* each include a slide bracket 323 and a slide brace 362. Each slide bracket 323 includes position depressions 380 configured to engage with a position setting system 282 of the corresponding slide brace 362 to provide selectable locking of the radial position of patient support tops 18, 42.

A user can selectively change the radial position of either patient support top 18, 42 relative to axis 317 as suggested by arrows 399*a*, 399*b* shown in FIGS. 10A and 10B. For example, a user can change the radial position of patient support top 18 by unlocking position setting system 282 of each adjustment support 325*a* of each main bracket 314, 316; adjusting the radial position of the slide braces 362 of the adjustment supports 325*a* of each of main bracket 314, 316 to a new radial position relative to axis 317; and locking position setting systems 382 of adjustment supports 325*a* of each main bracket 314, 316 at the new radial position.

A user can selectively change the angular position of either patient support top 18, 42 about axis 317 as suggested by arrows 389*b* shown in FIG. 10B. For example, a user can change the angular position of patient support top 18 by unlocking rotors 324 of each main bracket 314, 316, adjusting the angular position of the adjustment supports 352*a* of each of main bracket 314, 316 to a new angular position, and locking the rotors 324 of each main bracket 314, 316.

Rotors 324 each include a dish body 326 and support mounts 328*a*, 328*b* as shown in FIGS. 11A and 11B. Dish body 326 includes a center 330 and a rim 332. Center 330 is illustratively embodied as a circular flat plate having a center hole 327 for receiving mounting post 41 therethrough. Rim 332 illustratively extends perpendicularly from a circumferentially outer edge of center 330 and defines a circumferential interior surface 334 configured for engagement by rollers 336 of support mounts 328*a*, 328*b*.

Support mounts 328*a*, 328*b* of one of the main brackets 314, 316 are illustratively attached at radially inward ends to mounting post 41 of one of the elevator towers 28, 29. Support mounts 328*a*, 328*b* extend radially outward from connection with mounting post 41 to the interior surface 334 of rim 332. Support mounts 328*a*, 328*b* each include track wheels 340 disposed on a radially outward side and configured for contact with the interior surface 334. During angular adjustment of the patient support tops 18, 42 about axis 317, track wheels 340 are configured to roll along the interior surface 334 to provide smooth and low friction angular adjustment.

Slide brackets 323 each include rails 350 and struts 352 as shown in FIGS. 10A and 10B. Rails 350 illustratively extend parallel to each other in spaced apart relation. Struts 352 illustratively extend between and connect to each rail 350 of the same slide bracket 323 at opposite ends of the rails 350. Slide brackets 323 permit adjustment of the radial position of the patient support tops 18, 42 through slide braces 362.

Slide braces 362 include a center body 364 arranged between the rails 350 of the respective slide bracket 323 as shown in FIGS. 10A and 10B. Center body 364 connects to brace bodies 384 that house the position setting system 382. Slide braces 362 include support flanges 388 for connection to one of the patient support tops 18, 42.

In another aspect of the present disclosure, in place of main brackets 14, 16, and main brackets 214, 216, the patient support system 10 includes main brackets 414, 416 as shown in FIGS. 12A and 12B. Main brackets 414, 416 are configured for use in patient support system 10 and are similar to main brackets 14, 16 as shown in FIGS. 5A-9B and described herein. Accordingly, similar reference numbers in the 400 series indicate features that are common between main brackets 414, 416 and main brackets 14, 16 unless indicated otherwise. The description of main brackets 14, 16 is equally applicable to main brackets 414, 416 except in instances when it conflicts with the specific description and drawings of main brackets 414, 416.

Main brackets 414, 416 each include first and second bracket rails 420, 422 and main bracket frame 455 as shown in FIGS. 12A and 12B. Each main bracket frame 455 is configured to attach to a connection bar 21 that is configured to receive and fixedly connect to a mounting post 41 of one elevator tower 28, 29. Each main bracket frame 455 is configured to connect to patient support 18 and first and second bracket rails 420, 422 are configured to connect to prone patient support 42. Each main bracket frame 455 is configured to receive respective first and second bracket rails 420, 422 for selectively slidable positioning between a first position on a right lateral side (shown in solid lines in FIG. 12A) and a second position on a left lateral side (shown in broken lines in FIG. 12A) to permit selective positioning of the main bracket rails 420, 422 relative to the main bracket frame 455. The selective positioning of first and second side rails 420, 422 relative to main bracket frame 455 permits support of prone patient support 42 to be selectively arranged on either of the left lateral side 43 or right lateral side 45 of the patient support system 10.

First and second bracket rails 420, 422 of each main bracket 414, 416 extend parallel to each other in spaced apart relation to each other horizontally in the orientation as shown in FIGS. 12A and 12B. First and second bracket rails 420, 422 are configured to penetrate through rail slots 467 for connection to main bracket frame 455. First and second bracket rails 420, 422 include rail struts 485 that extend between and connect to first second bracket rails 420, 422 at their flanged sections 423 on the same lateral ends thereof to form a rigid structure. Rail struts include handles 441, 443 coupled respectively to struts 485 to facilitate user enabled rotation of the main brackets 414, 416. First and second bracket rails 420, 422 are configured to connect to main bracket frame 455.

Main bracket frame 455 includes bracket frame bars 463 and bracket frame carriers 465*a*, 465*b*. Bracket frame bars 463 of each main bracket 414, 416 illustratively extend parallel to each other in spaced apart relation. Bracket frame bars 463 illustratively extend between (vertically in the orientation as shown in FIG. 12A) bracket frame carriers 465*a*, 465*b* to connect thereto to form a rigid structure.

Bracket frame carriers 465*a*, 465*b* illustratively connect to opposite ends of bracket bars 463 to form a rigid structure as shown in FIG. 12A. Bracket frame carriers 465*a*, 465*b* each include a rail slot 467 defined therethrough and configured to receive one of first and second bracket rails 420, 422 therein for selectively slidable positioning relative to main bracket frame 455 between first position and second positions. Each bracket frame carrier 465*a* includes a locking member 475 configured to selectively form locking engagement between bracket frame carrier 465*a* and first bracket rail 420 of each main bracket 414, 416 to selectively lock the relative position therebetween.

Locking member 475 is selectively received within one of lock openings 477*a*, 477*b* as shown in FIGS. 12A, 12C, and 12D. Each lock openings 477*a*, 477*b* is partly defined by bracket frame carrier 465*a* and first bracket rail 420 as shown in FIGS. 12C and 12D. Lock openings 477*a*, 477*b* are arranged on opposite ends of first bracket rail 420 at a corresponding position with the position of locking member 475 such that the locking member 475 is received in one lock opening 477*a*, 477*b* at each of the first and second positions of first and second bracket rails 420, 422 relative to main bracket frame 455. In the illustrative embodiment, in the first position, the position of the lock member 475 corresponds to the position of lock opening 477*a* for locking engagement; and in the second position, the position of the lock member 475 corresponds to the position of lock opening 477*b* for locking engagement.

Locking member 475 is pivotably supported at a pivot point 476 by flanges 461 of bracket frame carrier 465*a* for pivotable movement between an unlock position (FIG. 12C) in which the locking member 475 is not disposed within either lock opening 477*a*, 477*b*, and a lock position (FIG. 12D) in which locking member is disposed into one of the lock openings 477*a*, 477*b*. In the illustrative embodiment, locking member 475 is biased into the lock position by a biasing member 488. A user can selectively operate locking member 475 to the unlock position to unlock the position of the first and second bracket rails 420, 422 relative to main bracket frame 455. With the lock member 475 maintained in the unlock position, the user can selectively slide first and second bracket rails 420, 422 relative to main bracket frame 455. When the first and second bracket rails 420, 422 reaches one of the first and second positions, locking member 475 is positioned for insertion into the corresponding lock opening 477*a*, 477*b*, and the biasing member 488 biases locking member 475 into the second position.

In the illustrative embodiment, first bracket rail 420 of each main bracket includes two lock openings 477*a*, 477*b*, but in some embodiments may comprise any number of lock openings positioned at intervals along first bracket member 420 for selective engagement with locking member 475 to provide various fixed relative positions of first and second frame rails 420, 422 relative to main bracket frame 455.

Bracket frame carriers 465*a*, 465*b* of each main bracket 414, 416 are configured to attach to connection bar 21 of one of elevator towers 28, 29 as shown in FIG. 12A. Bracket frame carriers 465*a*, 465*b* each illustratively include protrusions 466 that extend perpendicular therefrom for connection with connection bar 21. Protrusions 466 of each carrier 465*a*, 465*b* are positioned relative to each other to form a gap 468 therebetween, gap 468 being configured to receive an extension arm 21*a* of one end of connection bar 21.

Each main bracket frame 455 includes a connection mount 479 as shown in FIGS. 12A and 12B. Connection mount 479 is illustratively configured for connection to patient support 18 to provide support thereto. Connection mount 479 is configured to attach to bracket frame carrier 465*b* by reception within a receiving slot 481 of the bracket frame carrier 465*b* and with fasteners 483 inserted through corresponding holes 487 defined through each of bracket frame carrier 465*a* and connection mount 479.

Connection mount 479 includes mount member 480*a* and connection bracket 480*b* as shown in FIGS. 12A and 12B. Connection bracket 480*b* is illustratively defined as a cross member extending parallel to second bracket rail 422 and configured for reception within the receiving slot 481 for connection to the bracket frame carrier 465*b*. Connection bracket 480*b* is illustratively connected to mount member 480*a* by legs 480*c* disposed at opposite ends of connection bracket 480*b* and extending radially outward relative to axis 15 to connect with mount member 480*a*.

Mount member 480*a* is illustratively curved in a downward U-shape in the orientation shown in FIG. 12A and includes flanges 482 on opposite ends thereof that extend in a direction away from the patient support 18 when connected thereto. Flanges 482 illustratively include corresponding holes 486 defined therethrough in a direction parallel to the bracket rails 420, 422 and configured to receive connection pin 61 therethrough to connect to pin tube 39 of patient support 18 for pinned connection thereof.

Returning now to the illustrative embodiment shown in FIGS. 1, 3A, and 4A, prone support surface 56 of patient support top 42 is defined by prone pads 54. Prone pads 54 are configured to connect to the prone rails 44, 46 for fixed positioning and for selectively sliding along the prone rails 44, 46 as shown in FIGS. 3A and 3B. Prone pads 54 are distributed along the patient support top 42 with selective positioning between the head end 30 and the foot end 34 and extending across the prone rails 44, 46 to provide the prone support surface 56 to support the patient in the prone position as shown in FIGS. 3B and 4C.

In the illustrative embodiment, prone pads 54 include prone face pad 54*a*, prone chest pad 54*b*, prone pelvic pad 54*c*, and prone leg pads 54*d*, each respectively configured for engagement with a patient's face, chest, pelvis, and legs as suggested in FIGS. 3A-4C. Prone chest pad 54*b* illustratively has a U-shape for providing support to a patient's upper chest area while permitting the patient's abdomen to hang downwardly and/or sag relative prone frame 47. Allowing the patient's abdomen to sag can provide particular spine arrangement while the patient is lying in the prone position.

Patient support system 10 includes a transfer sheet 58 that is configured to shift and secure the patient to the patient support top 42 for moving the patient into the prone position as suggested in FIGS. 3A-4C. Transfer sheet 58 illustratively includes a draw sheet 60, straps 62, and hook and loop fastener material 70, 72 as shown in FIGS. 3A-4C. Draw sheet 60 includes a low friction bottom surface 64 to provide ease in shifting the patient for contact with the patient support top 42 as suggested in FIG. 4A.

Draw sheet 60 illustratively has an H-shape, including a body 66 and arms 68 as shown in FIG. 3A. Body 66 of draw sheet 60 is configured for placement under a patient occupying the patient support top 18 as shown in FIGS. 3A and 3B. Draw sheet 60 is illustratively embodied as having a soft layer of fabric for contact with the patient as an inner lining, and an outer layer of fabric providing the low friction bottom surface 64, each layer being suitable for use in a surgical environment. In some embodiments, draw sheet 60 is formed of any number of layers and/or any number and/or types of materials.

In the illustrative embodiment, body 66 is generally square-shaped as shown in FIG. 3A. Two arms 68 extend outwardly from the body 66 on a first side thereof and two other arms 68 extend outwardly from the body 66 on a second side thereof opposite the first side. Arms 68 are configured to wrap around the patient and patient support top 42 as suggested in FIGS. 3A-4C.

Straps 62 are each attached to different arms 68 of the same side of draw sheet 60, illustratively on the left lateral side 43 as shown in FIG. 3A. Straps 62 are configured to assist in wrapping the transfer sheet 58 around the patient and patient support top 42, shifting the patient wrapped in transfer sheet 58 into contact with patient support top 42, and securing the patient to patient support top 42 within transfer sheet 58 as suggested in FIGS. 4A-C. In the illustrative embodiment, straps 62 include a portion of hook and loop fastener material 70 configured to attach to another portion of hook and loop fastener material 72 connected to draw sheet 60 as shown in FIG. 4. In some embodiments, straps 62 are configured to secure the patient by any suitable manner, such as with a buckle creating an adjustable securing length of the straps 62 by friction and/or snap fasteners. In some embodiments, the surface 64 of the transfer sheet 58 may be comprised partly or wholly of a hook and loop fastener material 70, 72 complimentary to the material 70, 72 disposed on the straps 62 to permit the straps to be secured with a wide variety of overlap positions with the draw sheet 60.

Referring now to the illustrative embodiment as shown in FIG. 13, platform 76 includes a deck 94 and a pad 98. Platform 76 is defined by a torso portion 76*a* and a leg portion 76*b* as shown in FIG. 13. Torso portion 76*a* illustratively includes a torso deck 94*a* and a torso pad 98*a*. Torso portion 76*a* extends from the head end 30 towards the foot end 34 and meets the leg portion 76*b* near the mid-section 32 of the patient support system 10. Torso deck 94*a* is attached to the frame 74 at the head end 30. Torso pad 98*a* is supported on the torso deck 94*a* to provide a patient support surface for contact with the patient's upper body.

Leg portion 76*b* illustratively includes a leg deck 94*b* and a leg pad 98*b* as shown in FIG. 13. The leg portion 76*b* extends from the mid-section 32 of the support system 10 towards the foot end 34. Leg deck 94*b* is connected to the frame 74 and supports the leg pad 98*b* to provide a patient support surface for contact with the patient's lower body. Leg deck 94*b* is illustratively hingedly connected to the frame 74 near the mid-section 32 for pivotable support of a patient's lower body. Leg deck 94*b* is connected to frame 74 via an actuator 96 as shown in FIG. 13. In illustrative embodiments, the leg portion 76*b* is supported by the frame 74 through actuator 96 for pivotable movement between a lowered (FIG. 14B) and raised (FIG. 14A) positions to provide a patient in the lateral position an articulation of the hips (leg break) for surgical access to spinal regions. Actuator 96 is illustratively embodied as a linear actuator operable between a retracted and extended position to provide controlled movement to the leg portion 76*b* and is illustratively connected for powered operation to tower base 12 through auxiliary power port 199. Auxiliary power port 199 is illustratively embodied to provide 24 volt DC power, but in some embodiments is configured for any form of electric power.

A break assist bladder 100 is illustratively disposed between deck 94 and pad 98 at a position near the mid-section 32. Break assist bladder 100 is illustratively configured to receive pressurized fluid for operation between a deflated state (FIGS. 14A and 18A) and an inflated state (FIGS. 14B and 18B-C) to provide a selectively controllable contour of the pad 98 for imposing partial leg break in a patient while lying in the lateral position.

Break assist bladder 100 illustratively extends laterally across platform 76 from left to right lateral sides 43, 45, but in some embodiments extends only across portions of platform 76 in the lateral direction. Break assist bladder 100 is illustratively shaped to have a half oval cross-section in the inflated stated as suggested in FIGS. 13, 14B, 18B, and 18C. In some embodiments, break assist bladder 100 has any suitable cross-sectional shape for providing partial leg break such as ovular, quadrilateral, triangular, etc.

Break assist bladder 100 is illustratively an inflatable, non-expandable chamber, having uniform shape, size, and construction along its lateral extension as suggested in FIGS. 13A, 13B, and 18A-18C. In some embodiments, break assist bladder 100 has any one or more of ergonomic shape, varying size, and/or varying shape along its lateral extension to form a contour in pad 98 for accommodating a patient. The break assist bladder 100 illustratively receives pressurized fluid, typically air, from a pressurized fluid source 102 as shown in FIG. 13.

Pressurized fluid source 102 is illustratively embodied as an electric motor-driven fluid pump including a controller, and having suitable distribution tubing 103 and valves connected to the bladder 100 for selectively communicating pressurized fluid to and from the bladder 100. In some embodiments, the pressurized fluid source 102 may include any one or more of a pump, compressor, fan, and/or other pressurization device. In some embodiments, the pressurized fluid source 102 may be manually operate and/or may be selectively connectible to the bladder 100. In some embodiments, bladder 100 includes a manual exhaust valve operable to deflate bladder 100.

Break assist bladder 100 is illustratively positioned near the patient's trochanter to assist in creating leg break to improve access to the spinal surgical sites. In the illustrative embodiment as shown in FIGS. 15A and 15B, break assist bladder 100 is secured to pad 98 as a portion thereof. Break assist bladder 100 is received within an outer sheath 101 of pad 98 configured to bias the break assist bladder 100 into the deflated position. Outer sheath 101 is illustratively formed of elastic material and includes biasing straps 105*a*-105*c*, also illustratively comprising elastic material.

Straps 105*a*-105*c* illustratively include hook and loop fastener portions 107 configured to attach pad 98 to deck 94 as shown in FIG. 15B. Pad 98 illustratively includes hook and loop fastener portions 99*a* extending parallel to each other in spaced apart relation along the bottom of pad 98 and configured to engage other hook and loop fasteners portions 99*b* arranged on the top of deck 94 to attached pad 98 to deck 94 (FIG. 16B). In some embodiments, break assist bladder 100 is attached to the deck 94 by fasteners to prevent movement during operation. In some embodiments, break assist bladder 100 may include configuration to adjust its attachment position to deck 94 in the direction between the head end 30 and foot end 34, for example, by multiple fasteners having different positions. In some embodiments, break assist bladder 100 may be formed as a portion of pad 98.

In the illustrative embodiment as shown in FIGS. 16A, 16B, and 17, deck 94 includes an attachment sled 151 configured for mounting to deck 94 to slidably secure pad 98 thereto. Attachment sled 151 includes a body 151*a* that extends laterally across deck 94 and has a hooked end 151*b* on each lateral end thereof defining a deck receiving space 151*c* as shown in FIG. 17. Hooked ends 151*b* are configured to extend around each respective lateral side of deck 94 to receiving deck 94 within the deck receiving spaces 151*c* to secure attachment sled 151 to deck 94 while allowing attachment sled 151 to translate alone deck 94 in the direction between head end 30 and foot end 34 of the patient support system 10.

Attachment sled 151 illustratively includes fasteners 155*b* illustratively embodied as hook and loop fasteners portions configured to engage with hook and loop fastener portions 99*b* of pad 98. Attachment sled 151 illustratively provides attachment between the pad 98 and deck 94 while permitting the pad 98 to move relative to the deck 94 to accommodate various configurations of patient support top 18. For example, when the break assist bladder is in the inflated position and/or when the leg deck 94*b* is in the lowered position, pad 98 (as embodied as a single continuous pad 98) is required to contort and move relative to deck 94 to assume its corresponding position to support a patient occupying patient support top 18. More specifically, attachment sled 151 has a first position relative to leg deck 94*b* (FIG. 18A), and assumes a second position relative to leg deck 94*b* when the break assist bladder 100 is in the inflated state and the leg deck portion is in the lowered position (FIG. 18C). Attachment sled 151 thus is permitted to translate along deck 94 while maintaining attachment of pad 98 to deck 94.

Break assist bladder 100 is embodied as being controllable by a control system of the surgical patient support system 10. The control system is embodied to include a user interface, controller, and associated peripherals including hardware and/or software/firmware to allow a user to selectively inflate and/or deflate the break assist bladder 100 between the deflated and inflated states. The control system is embodied as a main control system that includes common hardware with that for elevator control system described above.

Break assist bladder 100 is configured to provide partial leg break to a surgical patient in the lateral position as suggested in FIGS. 18A and 18B. Break assist bladder 100 is illustratively configured to provide about 0 degrees of leg break in the deflated state, to provide leg break in the range of about 0 to about 10 in any partially inflated state that is defined between the deflated state and the inflated state, and to provide about 10 degrees of leg break when configured in the inflated state. In some embodiments, break assist bladder 100 is configured to provide between about −5 to about 15 degrees of leg break when operated between the deflated state and the inflated state with leg portion 76*b* configured in the raised position.

Break assist bladder 100 is configured to be operated between the deflated state and the inflated state in combination with positioning of the leg portion 76*b* between the lowered and raised positions to achieve leg break as suggested in FIGS. 14A, 14B, and 18A-18C. The combination of the break assist bladder 100 and moveable leg portion 76*b* is illustratively configured to provide a range of about 0 to about 35 degrees of leg break. In some embodiments, the combination may be configured to provide a range of about −5 to about 45 degrees of leg break. Each of the break assist bladder 100 and leg portion 76*b* are configured for operation and combination throughout their full individual ranges of motion to provide leg break to a patient in the lateral position.

Referring now to the illustrative embodiment as shown in FIGS. 19 and 20, the patient support system 10 includes an axilla support device 106 configured to provide support to a patient's axilla while in the lateral position. Pad 98 illustratively includes a tiered support surface 104 including a torso support surface 104*a* and leg support surface 104*b*. Pad 98 illustratively extends outward from torso deck 94*a* by an amount less than that which the leg support surface 104*b* extends from the leg deck 94*b* as shown in FIGS. 19 and 20.

Pad 98 at the torso support surface 104*a* has a height h as measured from frame 74 as shown in FIGS. 19 and 20. Pad 98 at leg support surface 104*b* has a height H as measured from the frame 74. Height H of the pad 98 at leg support surface 104*b* is illustratively greater than the height h of the pad 98 at the torso support surface 104*a* creating tiered support surface 104. Tiered support surface 104 permits a patient occupying the surgical patient support system 10 while lying in the lateral position to have her shoulder drop lower than if lying on a flat surface.

Axilla support device 106 includes axilla mounts 108 and axilla pad 110 as shown in FIG. 19. Axilla mounts 108 are embodied as rail clamps configured to selectively clamp onto support rails 80, 82 at a position between the head end 30 and foot end 34 as selected by the surgical team for support of the axilla pad 110. One of the axilla mounts 108 is configured to clamp onto each of the support rails 80, 82 to provide selectively positionable support to the axilla pad 110 for extension laterally across torso pad 98*a* above the torso deck 94*a*.

Each axilla mount 108 illustratively includes an axilla arm 112 extending therefrom to connect to the axilla pad 110 as shown in FIGS. 15 and 16. Axilla arms 112 illustratively include a flanged portion 112*a* configured for connection with axilla mounts 108 and an extension portion 112*b* extending perpendicular to the flanged portion. Opposite lateral ends of the axilla pad 110 are rotatably connected to each axilla arm 112 to minimize shear at the contact point with the patient. Axilla support device 106 is configured to provide selectively positionable support to a patient's axilla while reducing shear at the support interface.

Patient support system 10 includes a patient securing device 114 configured to secure in position a patient's lower body relative to the patient support top 18 as shown in FIGS. 21 and 22. Patient securing device 114 illustratively includes a cover 116 and straps 118, 120. Cover 116 is illustratively embodied as a mesh matrix loosely woven and permitting the patient's body to be seen through the cover 116 but in some embodiments may have any style, size, and construction including but not limited to woven, braided, layered, or other material arrangement suitable to secure the patient's body.

Straps 118, 120 are illustratively attached to the covering 116 as shown in FIGS. 21 and 22. The straps 118 and 120 are configured for selective attachment to the frame 74 to secure the covering 116 around the patient's lower body. In some embodiments, one or more of the straps 118, 120 may be separate from the covering 116 and are fastened to the frame 74 with the cover 116 disposed therebetween.

Straps 118, 120 include main strap 118 and secondary straps 120 as shown in FIGS. 21 and 22. Main strap 118 is configured to extend across a top end of covering 116 to secure the patient's lower body near the patient's hip as shown in FIGS. 21 and 22. In the illustrative embodiment as suggested in FIGS. 21 and 22, the main strap 118 is attached to both lateral sides 43, 45 of patient support top 18 with buckles 119 to permit tightening of the main strap 118 across the patient's hip. In some embodiments, main strap 118 is selectively attached to patient support top 18 with any suitable type of attachment for selectively securing the patient to patient support top 18, for example, with friction clamps. Main strap 118 is configured to bear the load of a patient's weight to secure the patient's lower body to patient support top 18.

Secondary straps 120 are illustratively configured to extend across central portions of the covering 116 to secure the patient's lower body respectively near the patient's knee and shin area as shown in FIGS. 21 and 22. In the illustrative embodiment, secondary straps 120 are attached to both lateral sides 43, 45 of patient support top 18 with buckles 122 to permit tightening of secondary straps 120 respectively across the patient's knee and shin area.

In some embodiments, secondary straps 120 are selectively attached to patient support top 18 with any suitable type of attachment for selectively securing the patient to patient support top 18, for example, with friction clamps. Secondary straps 120 are configured to bear the load of a patient's weight to secure the patient's lower body to patient support top 18. In the illustrative embodiment, secondary straps 120 are thinner than the main strap 118. In some embodiments, the patient securing device 114 includes any number of secondary straps 120 suitable to secure the patient's lower body to patient support top 18.

Patient support system 10 includes a head strap 81 for securing a patient's head to patient support tops 18, 42 as shown in FIGS. 23 and 24. Head strap 81 includes a strap body 81*a* and fasteners 81*b*, 81*c* as shown in FIG. 23. Head strap 81 is configured to wrap around the patients head and prone frame 47 and fasten to itself as suggested in FIG. 24. Head strap 81 is illustratively embodied for disposable use, but in some embodiments is washable and/or includes disposable coverings for contact with the patient.

Strap body 81*a* is illustratively formed of a suitable material for surgical environments and is configured to drape and flex to fit the patient's head and secure around prone frame 47. Strap body 81*a* has first side 83*a* having a least a portion thereof configured for contact with a patient's head and with frame 47, and a second side 83*b* opposite first side 83*a*. Strap body 81*a* extends from a first end 85*a* to a second end 85*b*. Strap body 81*a* is illustrative embodied as being formed of a single layer of material. In some embodiments, strap body 81*a* may include a plurality of material layers and may include various material types.

Fasteners 81*b* are illustratively disposed on first and second ends 85*a*, 85*b* of strap body 81*a* as shown in FIG. 23. One fastener 81*a* is illustratively disposed on first side 83*a* of strap body 81*a* and the other fastener 81*a* is disposed on second side 83*b* of strap body 81*a* as shown in FIG. 23. Fasteners 81*b* are illustratively embodied as complimentary hook and look fastener portions, specifically, blue nylon unbreakable loop (UBL) configured for selective non-permanent attachment to each other at various positions to accommodate various amounts of overlap between ends 85*a*, 85*b* of strap body 81*a*. In some embodiments, fasteners 81*a* include any suitable type of semi-permanent fasteners, for example, one or more snaps, ties, and/or buckles.

The present disclosure includes, among other things, description of dual column operating room tables that allows attachment of two independent patient support platforms positioned 90 degrees relative to each other. This allows for a patient to be transferred between a lateral position and a prone position without transferring the patient to a stretcher. Having the ability to use two independent patient support platforms or tops ensures that neither body position is compromised for the surgical procedure. In some embodiments, custom mounting brackets attach to a member (bow-tie) of known patient support platforms. In some embodiments, custom brackets may contain two mount hole patterns that are the same spacing and size as known brackets and are 90 degrees relative to each other. This allows any of the current patient positioning tops to be mounted to the bracket as well as a new lateral positioning platforms. Custom brackets are easy and intuitive to install, reduce the time required to transfer a patient from the lateral position to the prone position, reduce that amount of physical effort and strain required of staff to position and re-position a patient during a lateral to prone procedure, and make current and/or known spine frames more versatile.

The present disclosure includes, among other things, description of pin-less lift designs including a rotating hub which cooperates with tower base 12 to enable angular adjustment in 90 degree increments of one or two lift units. Such angular adjustment facilitates loading the frame from the side of the patient, and if necessary, rotating the frame above the patient prior to adjusting the "sandwich" height for a 180 degree flip.

The present disclosure includes, among other things, description of draw sheets having an H-pattern that allows staff to slide a patient while in the lateral position into contact with docked prone pads on a prone patient support arranged degrees relative to a lateral patient support. Before the lateral to prone flip, the patient needs to be fit snug to the prone pads and chest pad. The drawsheets have a slick bottom surface which allows the sheet to move easily across a surface with a patient on top of it, and also is easy for staff to pull with just two people. Straps and Velcro® (available from Velcro USA Inc. 406 Brown Avenue, Manchester, NH 03103) on the drawsheets allows the patient to be securely tightened to the prone frame before the flip. This creates a "cocooning" effect that adds security to the lateral to prone transfer. In some embodiments, the drawsheets are slick polymeric material cut into an H-pattern, with four Velcro® loop receptive straps to each arm of the H pattern. The H-pattern of the draw sheet allows it to fit around the prone supports and accommodate the various pads attached thereto while still being able to pull on each end of the draw sheet. This can draw the patient in so to gain contact with the prone and chest supports. The Velcro® straps allow the sheet to wrap around the prone top rails and securely fasten the patient to the patient support top to which the patient is being transferred. Such design provides security during lateral to prone flip and case of patient positioning, such as sliding and transferring, while in the lateral position.

The present disclosure includes, among other things, description of patient position nets, specifically lateral patient positioning nets. Such nets can reduce and/or eliminate the need for tape to secure a patient's legs while in the lateral position. Such lateral leg nets are fast to setup and make it easy for staff and/or caregivers to adjust the patient's position, for example, compared to taping methods. Such lateral nets illustratively include a single solid strap approximately 4 inches in width that is placed over a laterally positioned patient's hip and is secured to the table using a buckle and/or clamping apparatus. In some embodiments, extending from the solid strap is a mesh matrix that secures the upper and lower portions of the patient legs to the operating table. In some embodiments, mesh matrixes have at least four attachment points that are used to secure and cinch the matrix around the patient's legs and to the table. Such design provides time savings for the staff, reusability, enables re-adjusting and/or re-positioning of the patient, and is easy to setup while not requiring the staff to reach under the operating table to perform setup.

The present disclosure includes, among other things, description of axilla rolls with custom stepped pads capable of accommodate patients of different sizes, for use during surgery, for example, during lateral spinal fusion surgery. Such pads and devices correctly position the patient's spine while lying in the lateral position, as well as accommodate all patient sizes. In some embodiments, such device have a sliding pad that supports the axilla of the patient and leaves the shoulder of the patient to drop slightly lower than if they were on a flat lateral pad. In current practice, for a lateral decubitus positing setup, it is not uncommon for a towel or other roll to be placed under the patient's arm while lying in the lateral position to take pressure off the patient's shoulder and place it just below the patient's axilla. In some embodiments, the pads of the devices disclosed have a raised section as the lower body section, and a lowered section as the upper body section, and have a sliding axilla pad that keeps the patient's spine in line while also applying pressure in the desired areas. In some embodiments, such a raised section for the patient's lower torso and legs is raised several inches higher than the upper body section of the pad. In some embodiments, the pad is continuous and has a step formed therein between the raised and lowered sections. In some embodiments, such a sliding axilla pad is a cylindrical pad that is adjustable via two locking carriages that raid on table rails of the patient support.

A user can selectively unlock the carriages, position the sliding axilla pad in the desired location, and then lock the carriages. This allows any size patient to be accommodated by the lateral pad. In some embodiments, the roll is a mound-shaped pad that rides on a sled and is operated with the same locking and unlocking carriage system already described. Such arrangement allows for enhanced pressure management using fewer tools. Presently, surgeons must find towels and roll them up, or make due with whatever they have free in the operating room to take the pressure of the patient's shoulder and axilla. The devices of the present disclosure allow the patient to be located (positioned) onto the devices according to their hips, and then to allows adjustment of the axilla pad to the desired location. Such pad and sliding axilla pad combination allows the patient spine to be straight while lying in the lateral position. The single pad design allows the reduction of skin sheer when lowering the leg section of the table. Skin shear can be a problem on known tables due to multiple pads separating while remaining in contact with the patient's skin. A single pad design can help to reduce the skin shear experienced by patients.

The present disclosure includes, among other things, description of air bladders configured to spans the length of a lateral support pad for certain surgical procedures, for example, lateral spinal fusion surgery. Such air bladders can inflate under the patient's hips to create a bump in the surface of the padding and/or mattress. This bump would cause the patient to incur leg break which includes an angle created between the patient's spine and hips. This leg break can help the surgeon to gain access to the desired surgical site. This device can be incorporate with a lateral position pad. An exemplary air bladder is illustratively embodied as approximately 22 inches long and, when completely inflated, has a diameter in the range of about 4 inches to about 6 inches in diameter, resulting in approximately 5-10 degrees of patient leg break. The air bladder is illustratively inflated by an air feed, such as a powered air feed, but in some embodiments can be inflated by a hand pump. The bladder is configured to be inflated to a variety of pressure levels which would create different diameters and angles of patient leg break. Such design provides a way to create a small hip bump and leg break, avoiding use of items not intended for this purpose. A user can control the amount of leg break between the pressure levels of the bladder. Such air bladders can be combined with lowering of the leg section of the table to achieve greater leg break angles, including customized leg break angles. To create leg break, such air bladders can be used alone, in combination with lowering of the leg table section, or not used in favor of leg table section lowering.

Another illustrative embodiment of a surgical patient support system 1000 is shown in FIG. 25. Surgical patient support system 1000 is similar to surgical support 10 and the description and illustrations of surgical support 10 applies to surgical support 1000 except where it conflicts with the specific description and illustrations of surgical support 1000.

Surgical patient support system 1000 includes a tower base 1012, main brackets 1014, 1016, and patient support tops 1018, 1042 as shown in FIG. 25. Main brackets 1014, 1016 are configured to support patient support tops 1018, 1042 at about 90 degrees relative to each other to support various patient body positions. Surgical patient support system 1000 includes head end 30, a mid-section 32, foot end 34, and left 43 and right 45 lateral sides as shown in FIG.

25. In the illustrative embodiment, patient support top 1018 is configured to support a patient lying in a lateral position (or supine position) and patient support top 1042 is configured to support the patient lying in a prone position.

Tower base 1012 supports main brackets 1014, 1016 for controlled translatable movement along the vertical (i.e., raising, lowering and tilting when table 100 is in the orientation shown in FIG. 25) and rotational movement about an axis 15. Main brackets 1014, 1016 connect the patient support tops 1018, 1042 to the tower base 1012 respectively at the head end 30 and the foot end 34 of the support system 1000 as shown in FIG. 25 to provide adaptable support to a surgical patient. Each main bracket 1014, 1016 connects to a connection bar 1021 that is attached to the respective elevator tower 1028, 1029 of the tower base 1012 by a mounting post 41 for controlled rotation.

As best shown in FIG. 26, main brackets 1014, 1016 each illustratively include a pair of main rails 1020, 1022 attached to the connection bar 1021 and a prone bracket 1024 coupled to one of the main rails 1020, 1022. In the orientation shown in FIG. 26, the main rails 1020, 1022 illustratively extend vertically and attach to opposite ends of the connection bar 1021. Each main rail 1020, 1022 attaches to the connection bar 1021 by receiving a connection pin 1061 inserted through the connection bar 1021 and through an attachment hole 1062 of each main rail 1020, 1022.

The main rails 1020, 1022 each illustratively include a connection shelf 1050 for connection with the prone bracket 1024. Thus, bracket 1024 can be mounted to rail 1020 on one side of table 100 or to rail 1022 on the other side of table 1000. The connection shelves 1050 are each illustratively formed as a protrusion extending from the respective main rail 1020, 1022 and defining a first surface 1052 facing in an upward direction (in the orientation shown in FIG. 26) and a second surface 1054 facing in a direction opposite to the first surface 1052. The first and second surfaces 1052, 1054 each have an attachment hole 1056 defined therein to receive a connection pin 1061 for attachment of the prone bracket 1024 to shelves 1050 of the respective rail 1020, 1022 of bracket 1020.

The prone brackets 1024 of each main bracket 1014, 1016 are configured for connection to patient support top 1042. In the illustrative embodiment shown in FIG. 26, prone brackets 1024 are selectively coupled to one of the main rails 1020, 1022 and extend laterally therefrom (in the orientation as shown in FIG. 26). Each prone bracket 1024 illustratively includes a main body 1026 extending vertically (in the orientation as shown in FIG. 26) between opposite ends 1028, 1030, a pair of rail arms 1032, 1034 extending from the opposite ends 1028, 1030 for connection with one of the main rails 1020, 1022, and a pair of support legs 1036, 1038 that extend from the main body 1026 in a direction opposite from the rail arms 1032, 1034 towards a prone connection end 1044.

Rail arms 1032, 1034 illustratively connect with one of the main rails 1020, 1022 via connection pin 1061 as shown in FIG. 26. The rail arms 1032, 1034 illustratively extend from the main body 1026 parallel to each other and include a brace 1033 attached between the rail arms 1032, 1034. The rail arms 1032, 1034 are illustratively spaced apart from each other by a distance substantially equal to the distance between the first and second surfaces 1052, 1054 of the connection shelves 1050 to engage or abut at least one of the respective surface 1052, 1054 upon connection with the main bracket rails 1020, 1022. Each rail arm 1032, 1034 illustratively includes an attachment hole 1048 penetrating therethrough on an end positioned away from the main body 1026. A user can engage the rails arms 1032, 1034 with the surfaces 1052, 1054, respectively, and align the attachment holes 1048 of each rail arm 1032, 1034 with the attachment holes 1056 of the surfaces 1052, 1054 of the respective connection shelf 1050 to receive a connection pin 1061 inserted therethrough to connect the prone bracket 1024 to one of the main arms 1020, 1022 of bracket 1020.

Support legs 1036, 1038 illustratively extend from the main body 1026 and terminate at the respective connection ends 1044 as shown in FIG. 26. Each support leg 1036, 1038 illustratively includes a stem 1040 attached to the main body 1026 and extending in an inclined manner, mostly in the vertical direction (in the orientation shown in FIG. 26) and a branch 1041 attached to the stem 1040 and extending therefrom mostly in the horizontal direction (again, in the orientation shown in FIG. 26) to the connection end 1044. In the illustrative embodiment, the stems 1040 of each leg support 1036, 1038 of the same prone bracket 1024 illustratively extend from opposite ends 1028, 1030 of the main body 1026 in opposing directions. The connection ends 1044 illustratively define a connection space 1058 therebetween for receiving a prone pin tube 53 of the prone patient support top 1042.

Each branch 1041 of the support legs 1036, 1038 illustratively includes an attachment hole 1046 defined therein and penetrating therethrough in the vertical direction (in the orientation shown in FIG. 26). A user can align the prone pin tube 53 with the attachment holes 1046 and insert the connection pin 1061 therethrough to connect the prone patient support top 1042 to the prone bracket 1024. The prone patient support top 1042 is thus illustratively supported with a generally perpendicular orientation relative to patient support top 1018 to accommodate positioning of a patient's body between lateral and prone positions as described above.

In the illustrative embodiment of FIG. 26, main brackets 1014, 1016 each attach to a respective end of the patient support tops 1018, 1042. The main rails 1020, 1022 illustratively extend parallel and in spaced apart relation to each other from attachment with the connection bar 1021 to a connection end 1064. Main rails 1020, 1022 each illustratively include an attachment hole 1066 penetrating therethrough and extending between lateral sides 43, 45 for receiving a connection pin 1061 therethrough to attach the patient support 1018 with the main brackets 1014, 1016.

A connection slot 1068 is defined at the distal end of each main rail 1020, 1022 on an interior side 1070 thereof. The connection slots 1068 are illustratively embodied as recesses formed in the interior side 1070 and extending generally straight for a length from the connection end 1064. Attachment holes 1066 communicate with respective slots 1068. In the illustrative embodiment, the length of extension of connection slots 1068 is oriented generally vertically (in the orientation of the main brackets 1014, 1016 shown in FIG. 26) to allow ends of a pin tube 39 of the patient support 1018 to be received therein so as to be aligned with the attachment holes 1066 to receive the connection pin 1061 therethrough.

The connection slots 1068 receive the ends of the pin tube 39 when aligned with the attachment holes 1066 (as shown in FIG. 25). By arranging the connections slots 1068 to extend generally vertically (in the orientation as shown in FIGS. 25 and 26), the pin tube 39 is blocked against resting within the connection slots 1068 without a connection pin 1061 inserted through each of the attachment holes 1066 and the pin tube 1068 in at least some positions of the surgical support 1000, and preferably most positions of surgical support 1000, and more preferably all positions of surgical support 1000. For example, the connection slots 1068 are illustratively arranged at 5 degrees from vertical, but in some embodiments may be arranged with any angle from about −89 to about 89 degrees from vertical in the orientation as shown in FIG. 26. This arrangement can reduce the risk of the patient support 1018 falling due to misperception by a user that a connection pin 1061 is inserted through each of the attachment holes 1066 and the pin tube 39 by eliminating an unstable rest condition between the pin tube 39 and the main bracket 1014, 1016.

In the illustrative embodiment shown in FIG. 26, a distance $d_1$ is defined between the centerlines of the mounting post 41 and the connection pin 1061 extending through the attachment holes 1066 of the main bracket 1014, 1016 and a distance $d_2$ is defined between the centerlines of the mounting post 41 and the connection pin 1061 extending through the attachment holes 1046 of the prone bracket 1024. In the illustrative embodiment, the distance $d_1$ is less than the distance $d_2$ such that mistaken attachment of the patient support 1018 to the prone bracket 1024 (instead of to the connection end 1044 of the main rails 1020, 1022) causes interference between the patient support top 1018 and the base 1012, more specifically causes a frame 1074 of the patient support top 1018 to contact a cross bar 1075 of the base tower 1012 when the prone brackets 1024 are rotated between about the 5 o'clock and 7 o'clock positions relative to the axis 15, to discourage attachment of the patient support top 1018 with the prone bracket 1024.

In the illustrative embodiment as shown in FIG. 27, patient support top 1018 illustratively includes the frame 1074 and a platform 1076. Platform 1076 includes a deck 1094 and a pad 1098 that attaches to the deck 1094 with an attachment assembly 1072. The deck 1094 includes a torso deck **1094*a* and a leg deck 1094*b* that is pivotable about an axis 1025 between raised and lowered positions to create a leg break in a patient occupying the patient support top 1018 lying in the lateral position. The attachment assembly 1072 slidably attaches the pad 1098 to the deck 1094 to accommodate the movement of the leg deck 1094*b***.

The attachment assembly 1072 illustratively includes a pair of headed pegs 1078 and a corresponding pair of key hole-shaped peg slots 1080 defined in the leg deck **1094*b* for receiving the pegs 1078 therein for sliding attachment of the pad 1098 to the patient support top 1018. In the illustrative embodiment, the pegs 1078 include a stem 1082 extending from a bottom side 1083 of the pad 1098 and a head 1084 attached to the end of the stem 1082 for engagement within the peg slots 1080. The stem 1082 illustratively includes a width w defined perpendicularly to the extension direction of the stem 1082. The head 1084 is illustratively embodied as a partial sphere having a width W defined along the same direction as the width w of the stem 1082 that is greater than the width w of the stem 1082. The pegs 1078 are illustratively arranged in spaced apart relation to each other and are adapted for insertion within the peg slots 1080 to slidingly attach the pad 1098 with the patient support top 1018**.

The peg slots 1080 are illustratively defined in the moveable leg deck **1094*b*. The leg deck 1094*b* is selectively movable between raised and lowered positions to provide leg break to a patient lying on the patient support top 1018 in the lateral position. The peg slots 1080 illustratively receive the pegs 1078 therein and to permit sliding travel of the pegs 1078 along the peg slots 1080 to accommodate movement of the leg portion 1076*a*** between the raised and lowered positions.

The peg slots 1080 each illustratively are formed to have a key hole shape and penetrate through the leg deck **1094*b*. The peg slots 1080 each illustratively include a key opening 1086 and a key slit 1088 extending from the key opening 1086 towards the foot end 34. The key openings 1086 are illustratively sized to receive the head 1084 of a corresponding peg 1078 therethrough and the key slits 1088 are illustratively sized to permit the stem 1082 of the corresponding peg 1078 to slidingly travel along the extension direction of the key slit 1088 while preventing passage of the head 1084 therethrough. Thus, the diameters of openings 1086 are slightly larger than width W and the dimensions of slits 1088 in the lateral dimension of table top 1018** are slightly larger than width w but smaller than width W.

A user can insert the heads 1084 of the pegs 1078 into the corresponding peg slot 1080 (as indicated by dotted lines 1079 in FIG. 27) until the heads 1084 are positioned through the led deck **1094*a* and can slide the pad 1098 such that the stems 1082 enter the slits 1088. The attachment assembly 1072 is configured such that during movement of the leg deck 1094*b*, the stems 1082 illustratively can travel along the slits 1088 to accommodate the movement while the head 1084 prevents removal of the peg 1078 from the peg slot 1080. A user can move the pad 1098 such that the heads 1084 are aligned with the key openings 1086 and remove the heads 1084 from the respective key openings 1086 to detach the pad 1098 from the leg deck 1094*b*. The attachment assembly 1072 thus secures the leg region of pad 1098 onto deck section 1076*b* and provides sliding attachment between the pad 1098 and platform 1076 to accommodate movement of the leg portion 1076*b* between the raised and lowered positions. In the illustrative embodiment, the slits 1088 are sized long enough that the heads 1084 do not reach the key openings 1086 during the entire range of movement of the leg deck 1094*b***.

Although certain illustrative embodiments have been described in detail above, variations and modifications exist within the scope and spirit of this disclosure as described and as defined in the following claims.

The invention claimed is:

1. A surgical table comprising:

a table top configured to support a patient during surgery, the table top having an elongated frame extending longitudinally between a first end and a second end, a table base comprising a first lift column and a second lift column, the table top being supported by the table base for movement to a position situated between the first and second lift columns, the table base including a rotatable shaft coupled to the first lift column and rotatable about a longitudinal axis to rotate the table top about the longitudinal axis relative to the first and second lift columns, a rotor fixed to the rotatable shaft to rotate therewith about the longitudinal axis, and a support bracket coupled to the rotor, the support bracket including a bar and a slide assembly coupled to the bar, the first end of the elongated frame of the table top being coupled to the slide assembly to move therewith along the bar, the bar including a series of pin-receiving depressions provided along opposite sides of the bar, the slide assembly including a pair of handles, each handle of the pair of handles extending laterally outwardly away from a corresponding side of the bar, and the slide assembly including a pair of pins that each extend out of a respective handle and that are each spring biased toward a locking position, each pin being coupled to a respective handle of the pair of handles and movable from the respective locking position in which the respective pin is received in a corresponding pin-receiving depression to a respective unlocking position retracted out of the corresponding pin-receiving depression to permit the slide assembly to be repositioned along the bar, wherein the pair of pins move laterally toward the bar and toward each other when moving from the unlocking position to the locking position and wherein the pair of pins move laterally away from the bar and away from each other when moving from the locking position to the unlocking position.

2. The surgical table of claim 1, wherein the series of depressions comprise a series of cylindrically shaped holes.

3. The surgical table of claim 2, wherein the bar extends generally perpendicular to the longitudinal axis of the rotatable shaft of the table base in a first direction and each hole of the series cylindrically shaped holes extends generally perpendicular to the rotatable shaft of the table base in a second direction.

4. The surgical table of claim 1, wherein the bar extends radially outwardly from the rotatable shaft beyond an outer periphery of the rotor.

5. The surgical table of claim 1, wherein the bar includes a first end region adjacent to the rotatable shaft and a second end region distal from the rotatable shaft and wherein the bar includes a stop extending from the second end region to prevent the slide assembly from being slidable off of the bar.

6. The surgical table of claim 1, wherein the slide assembly includes a pair of flanges, each flange extending from a respective handle, and the first end of the elongated frame of the table top being coupled to the pair of flanges.

7. The surgical table of claim 6, wherein the first end of the elongated frame includes a laterally extending connection tube coupled to the pair of flanges.

8. The surgical table of claim 1, wherein the bar is lockable to the rotor to rotate about the longitudinal axis together with the rotor and the rotatable shaft and wherein the bar is unlockable from the rotor so as to be rotatable about the rotatable shaft relative to the rotor while the rotor and rotatable shaft are stationary.

9. The surgical table of claim 8, wherein the rotor comprises a flat, circular plate.

10. The surgical table of claim 8, wherein the bar is lockable to the rotor at a first position and a second position and wherein the first and second positions of the bar are spaced circumferentially about the longitudinal axis by about 90 degrees.

11. The surgical table of claim 1, further comprising a bar mount rotatably coupled to the rotatable shaft to rotate relative to the rotatable shaft and relative to the rotor, and wherein the bar of the support bracket is detachably coupled to the bar mount.

12. The surgical table of claim 11, wherein the bar mount is lockable to the rotor at a first position and a second position thereby to lock the bar to the rotor at the first and second positions of the bar mount.

13. The surgical table of claim 12, wherein the first and second positions of the bar are circumferentially spaced about the longitudinal axis by about 90 degrees.

14. The surgical table of claim 12, further comprising an engagement rod movably coupled to the bar mount and wherein the rotor includes first and second rod-receiving depressions that receive an end of the engagement rod to lock the bar mount at the first and second positions, respectively.

15. The surgical table of claim 14, wherein the rotor comprises a circular plate having a circular periphery and wherein the rod-receiving depressions are provided in the circular periphery.

16. The surgical table of claim 14, wherein the engagement rod is biased by a spring toward an engaged position in which the end of the engagement rod is received in one of the first and second rod-receiving depressions and wherein the engagement rod is manually movable to a disengaged position in which the end of the engagement rod is retracted out of the respective first and second rod-receiving depression.

17. The surgical table of claim 11, wherein the bar mount is formed to include a cradle and wherein the bar includes a cylindrical connection member that is received in the cradle when the bar is coupled to the bar mount.

18. The surgical table of claim 17, further comprising a slidable member attached to the bar, and wherein the slidable member includes a projection that is received in an opening formed in an end of the bar mount to lock the bar to the bar mount when the slidable member is in a locking position.

19. The surgical table of claim 18, wherein the slidable member is movable from the locking position to an unlocking position to retract the projection out of the opening formed in the end of the bar mount to permit the bar to be detached from the bar mount.

20. The surgical table of claim 19, wherein the slidable member is biased by a spring toward the locking position.

* * * * *